United States Patent [19]

Gregor

[11] Patent Number: 5,023,776
[45] Date of Patent: Jun. 11, 1991

[54] STORE QUEUE FOR A TIGHTLY COUPLED MULTIPLE PROCESSOR CONFIGURATION WITH TWO-LEVEL CACHE BUFFER STORAGE

[75] Inventor: Steven L. Gregor, Endicott, N.Y.

[73] Assignee: International Business Machines, Corp., Armonk, N.Y.

[21] Appl. No.: 159,016

[22] Filed: Feb. 22, 1988

[51] Int. Cl.[5] .............................................. G06F 13/00
[52] U.S. Cl. ................................ 364/200; 364/234.4; 364/243.41; 364/243.45; 364/244.3; 364/254.5; 364/243.44
[58] Field of Search ................. 364/200 MS File, 200, 364/900

[56] References Cited

U.S. PATENT DOCUMENTS

| | | |
|---|---|---|
| 4,136,386 | 1/1979 | Annunziata et al. ............... 364/200 |
| 4,167,779 | 9/1979 | Sullivan et al. ..................... 364/200 |
| 4,167,782 | 9/1979 | Joyce et al. .......................... 364/200 |
| 4,225,922 | 9/1980 | Porter .................................. 364/200 |
| 4,323,968 | 4/1982 | Capozzi ............................... 364/200 |
| 4,349,871 | 9/1982 | Lary .................................... 364/200 |
| 4,354,232 | 10/1982 | Ryan .................................... 364/200 |
| 4,425,615 | 1/1984 | Swenson et al. ..................... 364/200 |
| 4,442,487 | 4/1984 | Fletcher et al. ..................... 364/200 |
| 4,445,174 | 4/1984 | Fletcher .............................. 364/200 |
| 4,467,414 | 8/1984 | Akagi et al. ......................... 364/200 |
| 4,484,267 | 11/1984 | Fletcher .............................. 364/200 |
| 4,755,930 | 7/1988 | Wilson, Jr. et al. ................. 364/200 |
| 4,823,259 | 4/1989 | Aichelmann, Jr. et al. ......... 364/200 |

*Primary Examiner*—Gareth D. Shaw
*Assistant Examiner*—Paul Kulik

*Attorney, Agent, or Firm*—David S. Romney; John H. Bouchard

[57] ABSTRACT

A multiprocessor system includes a system of store queues and write buffers in a hierarchical first level and second level memory system including a first level store queue for storing instructions and/or data from a processor of the multiprocessor system prior to storage in a first level of cache, a second level store queue for storing the instructions and/or data from the first level store queue and a plurality of write buffers for storing the instructions and/or data from the second level store queue prior to storage in a second level of cache. The multiprocessor system includes hierarchical levels of caches, including a first level of cache associated with each processor, a single shared second level of cache shared by all the processors, and a third level of main memory connected to the shared second level cache. A first level store queue, associated with each processor, receives the data and/or instructions from its processor and stores the data and/or instructions in the first level of cache. A second level store queue, associated with each processor, receives the data and/or instructions from its first level store queue and temporarily stores the information therein. For sequential stores, the data and/or instructions are stored in corresponding second level write buffers. For non-sequential stores, the data and/or instructions bypass the corresponding second level write buffers and are stored directly in a final L2 cache write buffer. When stored in the second level writer buffers, access to the shared second level cache is requested.

15 Claims, 51 Drawing Sheets

FIG. 11

| PROCESSOR STORAGE STORE, TLB M | | | | | | | | | | | |
|---|---|---|---|---|---|---|---|---|---|---|---|
| PROCESSING UNIT | ⊢1 | ⊢2 | ⊢3 | ⊢4 | ⊢5 | ⊢6 | ⊢7 | ⊢8 | ⊢9 | ⊢10 | ⊢11⊣ |
| INSTRUCTION REG | ⊢⊣ | | | | | | | | | | |
| INSTRUCTION DECODE | ⊢—⊣ | | | | | | | | | | |
| ADDRESS ARITHMETIC | | ⊢—⊣ | | | | | | | | | |
| STORAGE ADDR REG | | | ⊢⊣ | | | | | | | | |
| E-UNIT INPUT REG | | | ⊢⊣ | | | | | | | | |
| L1 CACHE | | | | | | | | | | | |
| L1 CONTROL | | | STORE ⊢⊣ | | | | | | | | |
| TLB | | | ⊢—MISS | | | | | | | | |
| L1 CACHE DIRECTORY | | | ⊢—HIT/MISS | | | | | | | | |
| L1 STORE QUEUE | | | | ENQ BFR ⊢⊣ | | | | | | | |
| L1 CACHE | | | | STORE ⊢⊣ | | | | | | | |
| L1 CACHE DATA BUFFER | | | | STORE ⊢⊣ | | | | | | | |
| L1/L2 DATA BUSS | | | | | | | | | | | |
| L2 CACHE/BSU | | | | | | | | | | | |
| L2 CONTROL | | | | | | | | | | | |
| L2 CACHE DIRECTORY | | | | | | | | | | | |
| L1 STATUS | | | | | | | | | | | |
| L2 CACHE/BSU CONTROL | | | | | | | | | | | |
| L2 DATA STORE QUEUE | | | | | | | | | | | |
| L2 CACHE WRITE BUFFER | | | | | | | | | | | |
| L2 CACHE | | | | | | | | | | | |
| L2 CACHE READ BUFFER | | | | | | | | | | | |
| L1 TRANSFER REGISTER | | | | | | | | | | | |
| L2 INPAGE BUFFER | | | | | | | | | | | |
| L3 INTERFACE REGISTER | | | | | | | | | | | |
| L2/L3 DATA BUSS | | | | | | | | | | | |
| L3/L4 SUBSYSTEM | | | | | | | | | | | |
| MEMORY CONTROL REG IN | | | | | | | | | | | |
| MEMORY CONTROL | | | | | | | | | | | |
| ADDRESS/KEY | | | | | | | | | | | |
| L3 MEMORY CONTROL | | | | | | | | | | | |
| L3 MEMORY | | | | | | | | | | | |
| BUSY INDICATORS | | | | | | | | | | | |
| L1 CACHE DIRECTORY | | | ⊢—⊣ | | | | | | | | |
| L1 CACHE | | | | ⊢—⊣ | | | | | | | |
| L1/L2 ADDRESS BUSS | | | | | | | | | | | |
| L1/L2 DATA BUSS | | | | | | | | | | | |
| L2 CACHE DIRECTORY | | | | | | | | | | | |
| L1 STATUS | | | | | | | | | | | |
| L2 CACHE | | | | | | | | | | | |
| L3 MEMORY | | | | | | | | | | | |

FIG. 12

PROCESSING STORAGE STORE, TLB H, AE

| PROCESSING UNIT | 1 | 2 | 3 | 4 | 5 | 6 | 7 | 8 | 9 | 10 | 11 |
|---|---|---|---|---|---|---|---|---|---|---|---|
| INSTRUCTION REG | ⊢⊣ | | | | | | | | | | |
| INSTRUCTION DECODE | ⊢—⊣ | | | | | | | | | | |
| ADDRESS ARITHMETIC | | ⊢—⊣ | | | | | | | | | |
| STORAGE ADDR REG | | | ⊢⊣ | | | | | | | | |
| E-UNIT INPUT REG | | | ⊢⊣ | | | | | | | | |
| L1 CACHE | | | | | | | | | | | |
| L1 CONTROL | | | STORE | | | | | | | | |
| TLB | | | ⊢—⊣ HIT/ACCESS EXCEPTION | | | | | | | | |
| L1 CACHE DIRECTORY | | | ⊢—⊣ HIT/MISS | | | | | | | | |
| L1 STORE QUEUE | | | | ENQ BFR | | | | | | | |
| L1 CACHE | | | | | | | | | | | |
| L1 CACHE DATA BUFFER | | | | STORE | | | | | | | |
| L1/L2 DATA BUSS | | | | | | | | | | | |
| L2 CACHE/BSU | | | | | | | | | | | |
| L2 CONTROL | | | | | | | | | | | |
| L2 CACHE DIRECTORY | | | | | | | | | | | |
| L1 STATUS | | | | | | | | | | | |
| L2 CACHE/BSU CONTROL | | | | | | | | | | | |
| L2 DATA STORE QUEUE | | | | | | | | | | | |
| L2 CACHE WRITE BUFFER | | | | | | | | | | | |
| L2 CACHE | | | | | | | | | | | |
| L2 CACHE READ BUFFER | | | | | | | | | | | |
| L1 TRANSFER REGISTER | | | | | | | | | | | |
| L2 INPAGE BUFFER | | | | | | | | | | | |
| L3 INTERFACE REGISTER | | | | | | | | | | | |
| L2/L3 DATA BUSS | | | | | | | | | | | |
| L3/L4 SUBSYSTEM | | | | | | | | | | | |
| MEMORY CONTROL REG IN | | | | | | | | | | | |
| MEMORY CONTROL | | | | | | | | | | | |
| ADDRESS/KEY | | | | | | | | | | | |
| L3 MEMORY CONTROL | | | | | | | | | | | |
| L3 MEMORY | | | | | | | | | | | |
| BUSY INDICATORS | | | | | | | | | | | |
| L1 CACHE DIRECTORY | | | ⊢——⊣ | | | | | | | | |
| L1 CACHE | | | | ⊢——⊣ | | | | | | | |
| L1/L2 ADDRESS BUSS | | | | | | | | | | | |
| L1/L2 DATA BUSS | | | | | | | | | | | |
| L2 CACHE DIRECTORY | | | | | | | | | | | |
| L1 STATUS | | | | | | | | | | | |
| L2 CACHE | | | | | | | | | | | |
| L3 MEMORY | | | | | | | | | | | |

PROCESSOR STORAGE STORE, NS, TLB H, NO AE, L1 H OR
M, STG L1EP>L1TP OR L1/L2 INTFC BUSY, L2 BUSY                    FIG. 13
PROCESSING STORAGE STORE, TLB H, AE

| PROCESSING UNIT | 1 | 2 | 3 | 4 | | N.1 | N.2 | N.3 | N.4 | N.5 |
|---|---|---|---|---|---|---|---|---|---|---|
| INSTRUCTION REG | ⊢⊣ | | | | | | | | | |
| INSTRUCTION DECODE | ⊢—⊣ | | | | | | | | | |
| ADDRESS ARITHMETIC | | ⊢—⊣ | | | | | | | | |
| STORAGE ADDR REG | | | ⊢⊣ | | | | | | | |
| E-UNIT INPUT REG | | | ⊢⊣ | | | | | | | |
| L1 CACHE | | | | | | | | | | |
| L1 CONTROL | | | STORE ⊢⊣ | | | | | | | |
| TLB | | | ⊢—⊣ HIT | | | | | | | |
| L1 CACHE DIRECTORY | | | HIT/MISS ENQUEUE | | | SELECT ⊢—⊣ | | | | |
| L1 STORE QUEUE | | | ⊢⊣ WR IFF HIT | | | | | | | |
| L1 CACHE | | | STORE ⊢⊣ | | | | | | | |
| L1 CACHE DATA BUFFER | | | | | | TFR DW ⊢—⊣ | | | | |
| L1/L2 DATA BUSS | | | | | | | | | | |
| L2 CACHE/BSU | | | | | | CMD/ADDR& ENQUEUE | | | | |
| L2 CONTROL | | | | | | ⊢—⊣ | | | | |
| L2 CACHE DIRECTORY | | | | | | | | | | |
| L1 STATUS | | | | | | | | | | |
| L2 CACHE/BSU CONTROL | | | | | | | | | | |
| L2 DATA STORE QUEUE | | | | | | ENQ BFR ⊢—⊣ | ENQUEUE ⊢—⊣ | | | |
| L2 CACHE WRITE BUFFER | | | | | | | | | | |
| L2 CACHE | | | | | | | | | | |
| L2 CACHE READ BUFFER | | | | | | | | | | |
| L1 TRANSFER REGISTER | | | | | | | | | | |
| L2 INPAGE BUFFER | | | | | | | | | | |
| L3 INTERFACE REGISTER | | | | | | | | | | |
| L2/L3 DATA BUSS | | | | | | | | | | |
| L3/L4 SUBSYSTEM | | | | | | | | | | |
| MEMORY CONTROL REG IN | | | | | | | | | | |
| MEMORY CONTROL | | | | | | | | | | |
| ADDRESS/KEY | | | | | | | | | | |
| L3 MEMORY CONTROL | | | | | | | | | | |
| L3 MEMORY | | | | | | | | | | |
| BUSY INDICATORS | | | | | | | | | | |
| L1 CACHE DIRECTORY | | | ⊢—⊣ | | | | | | | |
| L1 CACHE | | | | ⊢—⊣ | | | | | | |
| L1/L2 ADDRESS BUSS | | | | | | ⊢—⊣ | | | | |
| L1/L2 DATA BUSS | | | | | | ⊢—⊣ | | | | |
| L2 CACHE DIRECTORY | | | | | | | | | | |
| L1 STATUS | | | | | | | | | | |
| L2 CACHE | | | | | | | | | | |
| L3 MEMORY | | | | | | | | | | |

FIG. 15

PROCESSOR STORAGE STORE, NS W/EOP, TLB H,
NO AE, L1 H OR M, STQ EMPTY, L1/L2 INTFC FEE, L2 H

| PROCESSING UNIT | +12 | +13 | +14 | +15 | +16 | +17 | +18 | +19 | +20 | +21 | +22 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |
| L1 CACHE | | | | | | | | | | | |
| L1 CONTROL | | | | | | | | | | | |
| TLB | | | | | | | | | | | |
| L1 CACHE DIRECTORY | | | | | | | | | | | |
| L1 STORE QUEUE | | | | | | | | | | | |
| L1 CACHE | | | | | | | | | | | |
| L1 CACHE DATA BUFFER | | | | | | | | | | | |
| L1/L2 DATA BUSS | | | | | | | | | | | |
| L2 CACHE/BSU | | | | | | | | | | | |
| L2 CONTROL | | | | | | | | | | | |
| L2 CACHE DIRECTORY | | | | | | | | | | | |
| L1 STATUS | | | | | | | | | | | |
| L2 CACHE/BSU CONTROL | | | | | | | | | | | |
| L2 DATA STORE QUEUE | | | | | | | | | | | |
| L2 CACHE WRITE BUFFER | | | | | | | | | | | |
| L2 CACHE | | | | | | | | | | | |
| L2 CACHE READ BUFFER | | | | | | | | | | | |
| L1 TRANSFER REGISTER | | | | | | | | | | | |
| L2 INPAGE BUFFER | | | | | | | | | | | |
| L3 INTERFACE REGISTER | | | | | | | | | | | |
| L2/L3 DATA BUSS | | | | | | | | | | | |
| L3/L4 SUBSYSTEM | | | | | | | | | | | |
| MEMORY CONTROL REG IN | | | | | | | | | | | |
| MEMORY CONTROL ADDRESS/KEY | | SET | R,C | | | | | | | | |
| L3 MEMORY CONTROL | | | | | | | | | | | |
| L3 MEMORY | | | | | | | | | | | |
| BUSY INDICATORS | | | | | | | | | | | |
| L1 CACHE DIRECTORY | | | | | | | | | | | |
| L1 CACHE | | | | | | | | | | | |
| L1/L2 ADDRESS BUSS | | | | | | | | | | | |
| L1/L2 DATA BUSS | | | | | | | | | | | |
| L2 CACHE DIRECTORY | | | | | | | | | | | |
| L1 STATUS | | | | | | | | | | | |
| L2 CACHE | | | | | | | | | | | |
| L3 MEMORY | | | | | | | | | | | |

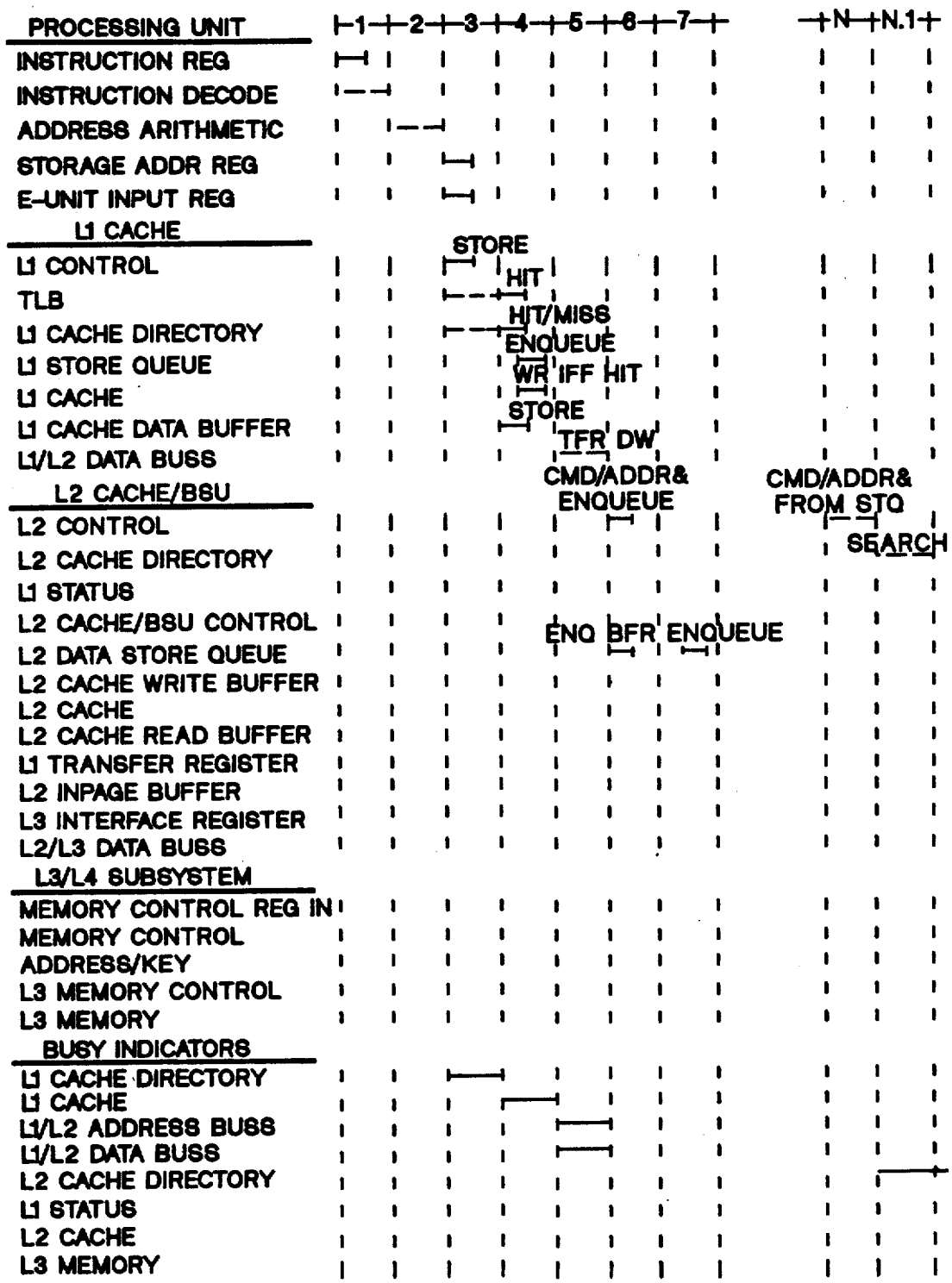

FIG. 17

PROCESSOR STORAGE STORE, NS W/EOP, TLB H, NO AE, L1 H
OR M, L1EP=L1TP, L1/L2 INTFC FREE, L2EP>L2DP, L2 H

| PROCESSING UNIT | +N.2 | +N.3 | +N.4 | +N.5 | +N.6 | +N.7 | +N.8 | +N.9 | +N.10 | +N.11 | +N.12 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |
| L1 CACHE | | | | | | | | | | | |
| L1 CONTROL | | | | | | | | | | | |
| TLB | | | | | | | | | | | |
| L1 CACHE DIRECTORY | | | DEQUEUE | | | | | | | | |
| L1 STORE QUEUE | | | ⊢⊣ | | | | | | | | |
| L1 CACHE | | | | | | | | | | | |
| L1 CACHE DATA BUFFER | | | | | | | | | | | |
| L1/L2 DATA BUSS | | | | | | | | | | | |
| L2 CACHE/BSU | | TFR L1 DEQ | | | | | | | | | |
| L2 CONTROL | HIT | ⊢--⊣ | | | | | | | | | |
| L2 CACHE DIRECTORY | ⊢⊣ | | | | | | | | | | |
| L1 STATUS | SEARCH | | | | | | | | | | |
| L2 CACHE/BSU CONTROL | | L2 SET | | | | | | | | | |
| L2 DATA STORE QUEUE | CMD | DEQUEUE | | | | | | | | | |
| L2 CACHE WRITE BUFFER | /ADR | ≤8 BYTES | | | | | | | | | |
| L2 CACHE | | ⊢⊣ WRITE PARTIAL L2 LINE | | | | | | | | | |
| L2 CACHE READ BUFFER | | | | | | | | | | | |
| L1 TRANSFER REGISTER | | | | | | | | | | | |
| L2 INPAGE BUFFER | | | | | | | | | | | |
| L3 INTERFACE REGISTER | | | | | | | | | | | |
| L2/L3 DATA BUSS | | | | | | | | | | | |
| L3/L4 SUBSYSTEM | L2 CMD/PORT ST-HIT | | | | | | | | | | |
| MEMORY CONTROL REG IN | ⊢⊣ ⊢⊣ | | | | | | | | | | |
| MEMORY CONTROL | | ACC CTL | SET R,C | | | | | | | | |
| ADDRESS/KEY | ⊢⊣ | ⊢⊣ | ⊢⊣ | | | | | | | | |
| L3 MEMORY CONTROL | SET C/ ADDR | READ R/C | | | | | | | | | |
| L3 MEMORY | | | | | | | | | | | |
| BUSY INDICATORS | | | | | | | | | | | |
| L1 CACHE DIRECTORY | | | | | | | | | | | |
| L1 CACHE | | | | | | | | | | | |
| L1/L2 ADDRESS BUSS | | | | | | | | | | | |
| L1/L2 DATA BUSS | | | | | | | | | | | |
| L2 CACHE DIRECTORY | ⊢――⊣ | | | | | | | | | | |
| L1 STATUS | ⊢―⊣ | | | | | | | | | | |
| L2 CACHE | ⊢―⊣ | | | | | | | | | | |
| L3 MEMORY | | | | | | | | | | | |

FIG. 19

PROCESSOR STORAGE STORE, NS W/EOP, TLB H, NO AE, L1 H
OR M, STQ EMPTY, L1/L2 INTFC FREE, L1 LI, L2 H

| PROCESSING UNIT | +12 | +13 | +14 | +15 | +16 | +17 | +18 | +19 | +20 | +21 | +22 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |
| L1 CACHE | | INV L1 REQ | | | | | | | | | |
| L1 CONTROL | | ⊢—⊣ | | | | | | | | | |
| TLB | | | INV L1 COPY | | | | | | | | |
| L1 CACHE DIRECTORY | | | ⊢—⊣ | | | | | | | | |
| L1 STORE QUEUE | | | | | | | | | | | |
| L1 CACHE | | | | | | | | | | | |
| L1 CACHE DATA BUFFER | | | | | | | | | | | |
| L1/L2 DATA BUSS | | | | | | | | | | | |
| L2 CACHE/BSU | TFR L1 L1 REQ | | | | | | | | | | |
| L2 CONTROL | ⊢—⊣ | | | | | | | | | | |
| L2 CACHE DIRECTORY | | | | | | | | | | | |
| L1 STATUS | | | | | | | | | | | |
| L2 CACHE/BSU CONTROL | | | | | | | | | | | |
| L2 DATA STORE QUEUE | | | | | | | | | | | |
| L2 CACHE WRITE BUFFER | | | | | | | | | | | |
| L2 CACHE | | | | | | | | | | | |
| L2 CACHE READ BUFFER | | | | | | | | | | | |
| L1 TRANSFER REGISTER | | | | | | | | | | | |
| L2 INPAGE BUFFER | | | | | | | | | | | |
| L3 INTERFACE REGISTER | | | | | | | | | | | |
| L2/L3 DATA BUSS | | | | | | | | | | | |
| L3/L4 SUBSYSTEM | | | | | | | | | | | |
| MEMORY CONTROL REG IN | | | | | | | | | | | |
| MEMORY CONTROL | | ⊢—⊣ SET R,C ⊢—⊣ | | | | | | | | | |
| ADDRESS/KEY | | | | | | | | | | | |
| L3 MEMORY CONTROL | | | | | | | | | | | |
| L3 MEMORY | | | | | | | | | | | |
| BUSY INDICATORS | | | | | | | | | | | |
| L1 CACHE DIRECTORY | ⊢—⊢—⊣ | | | | | | | | | | |
| L1 CACHE DIRECTORY | ⊢—⊢—⊣ | | | | | | | | | | |
| L1 CACHE | ⊢—⊣ | | | | | | | | | | |
| L1/L2 ADDRESS BUSS | ⊢—⊣ | | | | | | | | | | |
| L1/L2 DATA BUSS | | | | | | | | | | | |
| L2 CACHE DIRECTORY | | | | | | | | | | | |
| L1 STATUS | | | | | | | | | | | |
| L2 CACHE | | | | | | | | | | | |
| L3 MEMORY | | | | | | | | | | | |

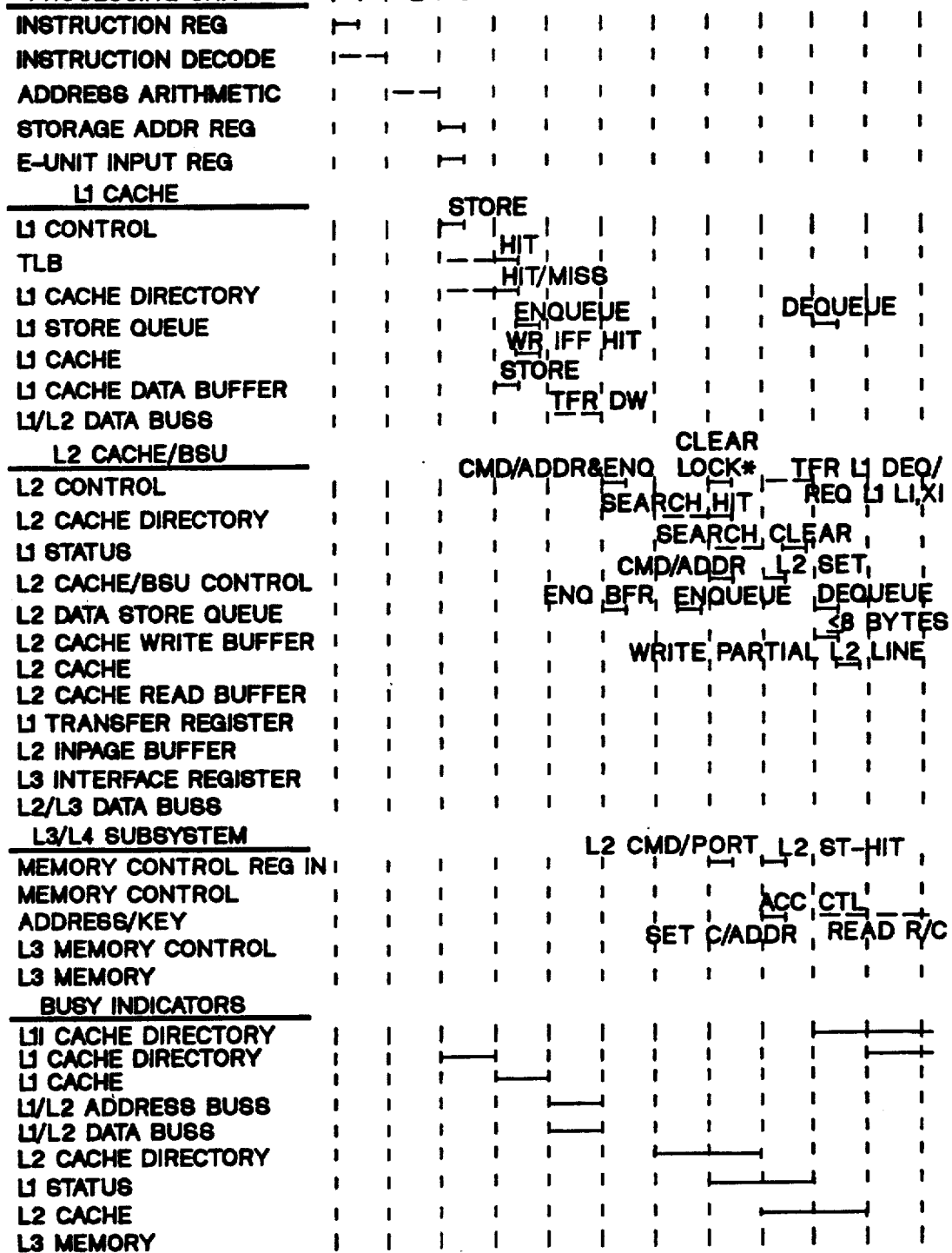

FIG. 21

PROCESSOR STORAGE STORE, NS W/EOP, TLB H, NO AE, L1 H
OR M, STQ EMPTY, L1/L2 INTFC FREE, L1 LI, L1 XI, L2 H

| PROCESSING UNIT | +12 | +13 | +14 | +15 | +16 | +17 | +18 | +19 | +20 | +21 | +22 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |
| L1 CACHE | | | | | | | | | | | |
| L1 CONTROL | | INV L1I REQ ⊢—⊣ | | | | | | | | | |
| TLB | | | | | | | | | | | |
| L1 CACHE DIRECTORY | | | INV L1I COPY ⊢—⊣ | | | | | | | | |
| L1 STORE QUEUE | | | | | | | | | | | |
| L1 CACHE | | | | | | | | | | | |
| L1 CACHE DATA BUFFER | | | | | | | | | | | |
| L1/L2 DATA BUSS | | | | | | | | | | | |
| L2 CACHE/BSU | | | | | | | | | | | |
| L2 CONTROL | TFR L1 LI,XI REQ ⊢—⊣ | | | | | | | | | | |
| L2 CACHE DIRECTORY | | | | | | | | | | | |
| L1 STATUS | | | | | | | | | | | |
| L2 CACHE/BSU CONTROL | | | | | | | | | | | |
| L2 DATA STORE QUEUE | | | | | | | | | | | |
| L2 CACHE WRITE BUFFER | | | | | | | | | | | |
| L2 CACHE | | | | | | | | | | | |
| L2 CACHE READ BUFFER | | | | | | | | | | | |
| L1 TRANSFER REGISTER | | | | | | | | | | | |
| L2 INPAGE BUFFER | | | | | | | | | | | |
| L3 INTERFACE REGISTER | | | | | | | | | | | |
| L2/L3 DATA BUSS | | | | | | | | | | | |
| L3/L4 SUBSYSTEM | | | | | | | | | | | |
| MEMORY CONTROL REG IN | | | | | | | | | | | |
| MEMORY CONTROL | | SET R,C ⊢—⊣ | | | | | | | | | |
| ADDRESS/KEY | ⊢—⊣ | ⊢—⊣ | | | | | | | | | |
| L3 MEMORY CONTROL | | | | | | | | | | | |
| L3 MEMORY | | | | | | | | | | | |
| BUSY INDICATORS | | | | | | | | | | | |
| L1I CACHE DIRECTORY | ⊢———⊣ | | | | | | | | | | |
| L1 CACHE DIRECTORY | ⊢———⊣ | | | | | | | | | | |
| L1 CACHE | ⊢—⊣ | | | | | | | | | | |
| L1/L2 ADDRESS BUSS | ⊢—⊣ | | | | | | | | | | |
| L1/L2 DATA BUSS | | | | | | | | | | | |
| L2 CACHE DIRECTORY | | | | | | | | | | | |
| L1 STATUS | | | | | | | | | | | |
| L2 CACHE | | | | | | | | | | | |
| L3 MEMORY | | | | | | | | | | | |

PROCESSOR STORAGE STORE, NS W/EOP, TLB H, NO AE,
L1 M, STQ EMPTY, L1/L2 INTFC FREE, L2 M, L2 ULR WO/L1 C

FIG. 22

| PROCESSING UNIT | 1 | 2 | 3 | 4 | 5 | 6 | 7 | 8 | 9 | 10 | 11 |
|---|---|---|---|---|---|---|---|---|---|---|---|
| INSTRUCTION REG | ⊢⊣ | | | | | | | | | | |
| INSTRUCTION DECODE | ⊢—⊣ | | | | | | | | | | |
| ADDRESS ARITHMETIC | | ⊢—⊣ | | | | | | | | | |
| STORAGE ADDR REG | | | ⊢⊣ | | | | | | | | |
| E-UNIT INPUT REG | | | ⊢⊣ | | | | | | | | |
| L1 CACHE | | | | | | | | | | | |
| L1 CONTROL | | | STORE ⊢—⊣ HIT | | | | | | | | |
| TLB | | | ⊢——⊣ MISS | | | | | | | | |
| L1 CACHE DIRECTORY | | | ⊢—⊣ ENQUEUE | | | | | | | | |
| L1 STORE QUEUE | | | | ⊢⊣ | | | | | | | |
| L1 CACHE | | | | STORE ⊢⊣ | | | | | | | |
| L1 CACHE DATA BUFFER | | | | ⊢⊣ TFR DW | | | | | | | |
| L1/L2 DATA BUSS | | | | | ⊢—⊣ | | | | | | |
| L2 CACHE/BSU | | | | CMD/ADDR&ENQ | | | SET FREEZE | | | | |
| L2 CONTROL | | | | | | | ⊢—⊣ | | | | |
| L2 CACHE DIRECTORY | | | | | | SEARCH MISS ⊢—⊣ | | | | | |
| L1 STATUS | | | | | | | SEARCH | | | | |
| L2 CACHE/BSU CONTROL | | | | | CMD/ADDR | | L2 MISS ⊢—⊣ | | | | |
| L2 DATA STORE QUEUE | | | | | ENQ BFR ⊢⊣ | ENQUEUE ⊢⊣ | | L3 ADDR | | | |
| L2 CACHE WRITE BUFFER | | | | | | | | | | | |
| L2 CACHE | | | | | | | | | | | |
| L2 CACHE READ BUFFER | | | | | | | | | | | |
| L1 TRANSFER REGISTER | | | | | | | | | | | |
| L2 INPAGE BUFFER | | | | | | | | | | | |
| L3 INTERFACE REGISTER | | | | | | | | | | | |
| L2/L3 DATA BUSS | | | | | | | | | | | |
| L3/L4 SUBSYSTEM | | | | | | L2 CMD/PORT | | L2 ST-MISS | | | |
| MEMORY CONTROL REG IN | | | | | | | PRIORITIZE | ACTIVATE | | | |
| MEMORY CONTROL | | | | | | L3 INPAGE/ADDR | | | | | |
| ADDRESS/KEY | | | | | | | | ⊢——+ | | | |
| L3 MEMORY CONTROL | | | | | | TFR L3 ADDR READ R/C | | | | | |
| L3 MEMORY | | | | | | | | | | | |
| BUSY INDICATORS | | | | | | | | | | | |
| L1 CACHE DIRECTORY | | | ⊢—⊣ | | | | | | | | |
| L1 CACHE | | | | ⊢—⊣ | | | | | | | |
| L1/L2 ADDRESS BUSS | | | | | ⊢⊣ | | | | | | |
| L1/L2 DATA BUSS | | | | | ⊢⊣ | | | | | | |
| L2 CACHE DIRECTORY | | | | | | ⊢—⊣ | | | | | |
| L1 STATUS | | | | | | | | ⊢—⊣ | | | |
| L2 CACHE | | | | | | | | ⊢—⊣ | | | |
| L3 MEMORY | | | | | | | | | | ⊢—+ | |

FIG. 23

PROCESSOR STORAGE STORE, NS W/EOP, TLB H, NO AE,
L1 M, STQ EMPTY, L1/L2 INTFC FREE, L2 M, L2 ULR WO/L1 C

| PROCESSING UNIT | +12 | +13 | +14 | +15 | +16 | +17 | +18 | +19 | +20 | +21 | +22 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |
| L1 CACHE | | | | | | | | | | | |
| L1 CONTROL | | | | | | | | | | | |
| TLB | | | | | | | | | | | |
| L1 CACHE DIRECTORY | | | | | | | | | | | |
| L1 STORE QUEUE | | | | | | | | | | | |
| L1 CACHE | | | | | | | | | | | |
| L1 CACHE DATA BUFFER | | | | | | | | | | | |
| L1/L2 DATA BUSS | | | | | | | | | | | |
| L2 CACHE/BSU | PEND INPAGE-NORM ST | | | | | | | | | | |
| L2 CONTROL | | | | | | | | | | | |
| L2 CACHE DIRECTORY | | | | | | | | | | | |
| L1 STATUS | INPAGE REQ | | | | | | | | QUA VLD | | |
| L2 CACHE/BSU CONTROL | | | | | | | | | | | |
| L2 DATA STORE QUEUE | | | | | | | | | | | |
| L2 CACHE WRITE BUFFER | | | | | | | | | | | |
| L2 CACHE | | | | | | | | | | | |
| L2 CACHE READ BUFFER | | | | | | | | | | | |
| L1 TRANSFER REGISTER | | | | | | | | | | | |
| L2 INPAGE BUFFER | | CMD/ADDR | | | | | | | | QWA | |
| L3 INTERFACE REGISTER | | L3 CMD/ADDR | | | | | | | | TFR QWB | |
| L2/L3 DATA BUSS | | | | | | | | | TFR QWA | | |
| L3/L4 SUBSYSTEM | | | | | | | | | | | |
| MEMORY CONTROL REG IN | | | | | | | | | | | |
| MEMORY CONTROL | | SET R | | | | | | | | | |
| ADDRESS/KEY | | | READ/ADDR | | | | | | | | |
| L3 MEMORY CONTROL | | | READ ACCESS | | | | | | | | |
| L3 MEMORY | | | | | | | | | | | |
| BUSY INDICATORS | | | | | | | | | | | |
| L1 CACHE DIRECTORY | | | | | | | | | | | |
| L1 CACHE | | | | | | | | | | | |
| L1/L2 ADDRESS BUSS | | | | | | | | | | | |
| L1/L2 DATA BUSS | | | | | | | | | | | |
| L2 CACHE DIRECTORY | | | | | | | | | | | |
| L1 STATUS | | | | | | | | | | | |
| L2 CACHE | | | | | | | | | | | |
| L3 MEMORY | | | | | | | | | | | |

FIG. 24

PROCESSOR STORAGE STORE, NS W/EOP, TLB H, NO AE,
L1 M, STQ EMPTY, L1/L2 INTFC FREE, L2 M, L2 ULR WO/L1 C

| PROCESSING UNIT | +23 | +24 | +25 | +26 | +27 | +28 | +29 | +30 | +31 | +32 | +33 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |
| L1 CACHE | | | | | | | | | | | |
| L1 CONTROL | | | | | | | | | | | |
| TLB | | | | | | | | | | | |
| L1 CACHE DIRECTORY | | | | | | | | | | | |
| L1 STORE QUEUE | | | | | | | | | | | |
| L1 CACHE | | | | | | | | | | | |
| L1 CACHE DATA BUFFER | | | | | | | | | | | |
| L1/L2 DATA BUSS | | | | | | | | CMD-COMPL INPAGE | | CLEAR FREEZE | |
| L2 CACHE/BSU | | | | | | | | | | | |
| L2 CONTROL | | | | | | | | | SEARCH | UPDATE SEARCH | |
| L2 CACHE DIRECTORY | | | | | | | | | | | |
| L1 STATUS | QWB VLD | QWC VLD | QWD VLD | QWE VLD | QWF VLD | QWG VLD | QWH VLD | | | | |
| L2 CACHE/BSU CONTROL | ⊢⊣ | ⊢⊣ | ⊢⊣ | ⊢⊣ | ⊢⊣ | ⊢⊣ | ⊢⊣ | | INPAGE/ ADDR | L2 UNMOD | |
| L2 DATA STORE QUEUE | | | | | | | | | | RD 32 | |
| L2 CACHE WRITE BUFFER | | | | | | | | | | | |
| L2 CACHE | | | | | | | | | | | |
| L2 CACHE READ BUFFER | | | | | | | | | | | |
| L1 TRANSFER REGISTER | QWA | QWB | QWC | QWD | QWE | QWF | QWG QWH | | | | |
| L2 INPAGE BUFFER | ⊢⊣ | ⊢⊣ | ⊢⊣ | ⊢⊣ | ⊢⊣ | ⊢⊣ | ⊢⊣ | | | | |
| L3 INTERFACE REGISTER | QWB | QWC | QWD | QWE | QWF | QWG | QWH | | CMPL INPQ/ PORT | L2 ST- UNMOD | |
| L2/L3 DATA BUSS | TFR QWC | TFR QWD | TFR QWE | TFR QWF | TFR QWG | TFR QWH | | | | | |
| L3/L4 SUBSYSTEM | | | | | | | | | | | |
| MEMORY CONTROL REG IN | | | | | | | L3 NOT BUSY | | | | |
| MEMORY CONTROL | | | | | | | | | | ⊢⊣ L2 SET | |
| ADDRESS/KEY | | | | | | | | | | | |
| L3 MEMORY CONTROL | | | | | | | | | | | |
| L3 MEMORY | | | | | | | | | | | |
| BUSY INDICATORS | | | | | | | | | | | |
| L1 CACHE DIRECTORY | | | | | | | | | | | |
| L1 CACHE | | | | | | | | | | | |
| L1/L2 ADDRESS BUSS | | | | | | | | | ⊢——┤ | | |
| L1/L2 DATA BUSS | | | | | | | | | ⊢———┤ | | |
| L2 CACHE DIRECTORY | | | | | | | | | ⊢——┤ | | |
| L1 STATUS | | | | | | | | | ⊢——┤ | | |
| L2 CACHE | ⊢————————————————————┤ | | | | | | | | | | |
| L3 MEMORY | | | | | | | | | | | |

FIG. 25

PROCESSOR STORAGE STORE, NS W/EOP, TLB H, NO AE,
L1 M, STQ EMPTY, L1/L2 INTFC FREE, L2 M, L2 ULR WO/L1 C

| PROCESSING UNIT | 34 | 35 | 36 | 37 | 38 | 39 | 40 | 41 | 42 | 43 | 44 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |
| L1 CACHE | | | | | | | | | | | |
| L1 CONTROL | | | | | | | | | | | |
| TLB | | | | | | | | | | | |
| L1 CACHE DIRECTORY | | | | | | | | | | | |
| L1 STORE QUEUE | | | | | | | | | | | |
| L1 CACHE | | | | | | | | | | | |
| L1 CACHE DATA BUFFER | | | | | | | | | | | |
| L1/L2 DATA BUSS | | | | | | | | | | | |
| L2 CACHE/BSU | | | | | | | | | | | |
| L2 CONTROL | | | | | | | | | | | |
| L2 CACHE DIRECTORY | | | | | | | | | | | |
| L1 STATUS | | | | | | | | | | | |
| L2 CACHE/BSU CONTROL | | | | | | | | | | | |
| L2 DATA STORE QUEUE | | | | | | | | | | | |
| L2 CACHE WRITE BUFFER | WR 32 | | | | | | | | | | |
| L2 CACHE | ⊢⊣ | ⊢⊣ | | | | | | | | | |
| L2 CACHE READ BUFFER | | WR 96 | | | | | | | | | |
| L1 TRANSFER REGISTER | | | | | | | | | | | |
| L2 INPAGE BUFFER | | | | | | | | | | | |
| L3 INTERFACE REGISTER | | | | | | | | | | | |
| L2/L3 DATA BUSS | | | | | | | | | | | |
| L3/L4 SUBSYSTEM | | | | | | | | | | | |
| MEMORY CONTROL REG IN | UPD MDIR | BSU EOP REQ | | | | | | | | | |
| MEMORY CONTROL | | | | | | | | | | | |
| ADDRESS/KEY | ⊢⊣ | ⊢⊣ MDIR | | | | | | | | | |
| L3 MEMORY CONTROL | UPD MDIR | UPDATE | | | | | | | | | |
| L3 MEMORY | | | | | | | | | | | |
| BUSY INDICATORS | | | | | | | | | | | |
| L1 CACHE DIRECTORY | | | | | | | | | | | |
| L1 CACHE | | | | | | | | | | | |
| L1/L2 ADDRESS BUSS | | | | | | | | | | | |
| L1/L2 DATA BUSS | | | | | | | | | | | |
| L2 CACHE DIRECTORY | | | | | | | | | | | |
| L1 STATUS | ⊢—⊣ | | | | | | | | | | |
| L2 CACHE | ⊢——⊣ | | | | | | | | | | |
| L3 MEMORY | | | | | | | | | | | |

FIG. 28

PROCESSOR STORAGE STORE, NS W/EOP, TLB H, NO AE,
L1 M, STQ EMPTY, L1/L2 INTFC FREE, L2 M, L2 MLR WO/L1 C

| PROCESSING UNIT | +23 | +24 | +25 | +26 | +27 | +28 | +29 | +30 | +31 | +32 | +33 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |
| L1 CACHE | | | | | | | | | | | |
| L1 CONTROL | | | | | | | | | | | |
| TLB | | | | | | | | | | | |
| L1 CACHE DIRECTORY | | | | | | | | | | | |
| L1 STORE QUEUE | | | | | | | | | | | |
| L1 CACHE | | | | | | | | | | | |
| L1 CACHE DATA BUFFER | | | | | | | | | | | |
| L1/L2 DATA BUSS | | | | | | | | | | | |
| L2 CACHE/BSU | | | | | | | | CMD-COMPL INPAGE | | CLEAR FREEZE | |
| L2 CONTROL | | | | | | | | | | SEARCH UPDATE | |
| L2 CACHE DIRECTORY | | | | | | | | | | SEARCH | |
| L1 STATUS | QWB VLD | QWC VLD | QWD VLD | QWE VLD | QWF VLD | QWG VLD | QWH VLD | | | | |
| L2 CACHE/BSU CONTROL | | | | | | | | | INPAGE/ADDR | L2 MOD | |
| L2 DATA STORE QUEUE | | | | | | | | | | | |
| L2 CACHE WRITE BUFFER | | | | | | | | | | | |
| L2 CACHE | | | | | | | | | | RD 32 | |
| L2 CACHE READ BUFFER | | | | | | | | | | | |
| L1 TRANSFER REGISTER | QWA | QWB | QWC | QWD | QWE | QWF | QWG | QWH | | | |
| L2 INPAGE BUFFER | | | | | | | | | | | |
| L3 INTERFACE REGISTER | QWB | QWC | QWD | QWE | QWF | QWG | QWH | | | CMPL INPQ/ | L2 ST-PORT MOD |
| L2/L3 DATA BUSS | TFR QWC | TFR QWD | TFR QWE | TFR QWF | TFR QWG | TFR QWH | | | | | |
| L3/L4 SUBSYSTEM | | | | | | | | | | | |
| MEMORY CONTROL REG IN | | | | | | | | L3 NOT BUSY | | | |
| MEMORY CONTROL | | | | | | | | | | | |
| ADDRESS/KEY | | | | | | | | | | OUTPAGE ADDR/L2 SET | |
| L3 MEMORY CONTROL | | | | | | | | | | | |
| L3 MEMORY | | | | | | | | | | | |
| BUSY INDICATORS | | | | | | | | | | | |
| L1 CACHE DIRECTORY | | | | | | | | | | | |
| L1 CACHE | | | | | | | | | | | |
| L1/L2 ADDRESS BUSS | | | | | | | | | | | |
| L1/L2 DATA BUSS | | | | | | | | | | ├──┤ | |
| L2 CACHE DIRECTORY | | | | | | | | ├────────┤ | | | |
| L1 STATUS | | | | | | | | | ├────┤ | | |
| L2 CACHE | | | | | | | | | | ├──┤ | |
| L3 MEMORY | | | | | | | | | | | |

FIG. 29

PROCESSOR STORAGE STORE, NS W/EOP, TLB H, NO AE,
L1 M, STQ EMPTY, L1/L2 INTFC FREE, L2 M, L2 MLR WO/L1 C

| PROCESSING UNIT | 34 | 35 | 36 | 37 | 38 | 39 | 40 | 41 | 42 | 43 | 44 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |

L1 CACHE

| L1 CONTROL | | | | | | | | | | | |
|---|---|---|---|---|---|---|---|---|---|---|---|
| TLB | | | | | | | | | | | |
| L1 CACHE DIRECTORY | | | | | | | | | | | |
| L1 STORE QUEUE | | | | | | | | | | | |
| L1 CACHE | | | | | | | | | | | |
| L1 CACHE DATA BUFFER | | | | | | | | | | | |
| L1/L2 DATA BUSS | | | | | | | | | | | |

L2 CACHE/BSU

| L2 CONTROL | | | | | | | | | | | |
|---|---|---|---|---|---|---|---|---|---|---|---|
| L2 CACHE DIRECTORY | | | | | | | | | | | |
| L1 STATUS | | | L3 OUTPAGE ADDR | | | | | | | | |
| L2 CACHE/BSU CONTROL | | | | | | | | | | | |
| L2 DATA STORE QUEUE | | | | | | | | | | | |
| L2 CACHE WRITE BUFFER | | RD96 | | WR 96 | | | | | | | |
| L2 CACHE | | | | | | | | | | | |
| L2 CACHE READ BUFFER | | | WR 32 | | | | | | | | |
| L1 TRANSFER REGISTER | | | | | OPB QW0 | OPB QW1 | OPB QW2 | OPB QW3 | OPB QW4 | OPB QW5 | OPB QW6 OPB QW7 |
| L2 INPAGE BUFFER | | | CMD/ADDR | | | | | | | | |
| L3 INTERFACE REGISTER | | | L3 CMD/ADDR | | | | | | | | |
| L2/L3 DATA BUSS | | | | | TFR QW0 | TFR QW1 | TFR QW2 | TFR QW3 | TFR QW4 | TFR QW5 | TFR QW6 TFR QW7 |

L3/L4 SUBSYSTEM

| MEMORY CONTROL REG IN | UPD MDIR REQ | | | | | | | | | | |
|---|---|---|---|---|---|---|---|---|---|---|---|
| MEMORY CONTROL ADDRESS/KEY | TFR ADDR | UPD MDIR | MDIR UPDATE | | QW0 | QW1 | QW2 | QW3 | QW4 | QW5 | QW6 |
| L3 MEMORY CONTROL | | | | | | | | | | | |
| L3 MEMORY | | | WRITE/ADDR | | WRITE ACCESS | | | | | | |

BUSY INDICATORS

| L1 CACHE DIRECTORY | | | | | | | | | | | |
|---|---|---|---|---|---|---|---|---|---|---|---|
| L1 CACHE | | | | | | | | | | | |
| L1/L2 ADDRESS BUSS | | | | | | | | | | | |
| L1/L2 DATA BUSS | | | | | | | | | | | |
| L2 CACHE DIRECTORY | |—| | | | | | | | | | |
| L1 STATUS | |——| | | | | | | | | | |
| L2 CACHE | |———| | | | | | | | | | |
| L3 MEMORY | |————————————————————| | | | | | | | | | |

| PROCESSOR STORAGE STORE, NS W/EOP, TLB H, NO AE, L1 M, STQ EMPTY, L1/L2 INTFC FREE, L2 M, L2 MLR WO/L1 C | | | | | | | | | | | | FIG. 30 |
|---|---|---|---|---|---|---|---|---|---|---|---|---|
| PROCESSING UNIT | +45 | +46 | +47 | +48 | +49 | +50 | +51 | +52 | +53 | +54 | +55 | |
| INSTRUCTION REG | | | | | | | | | | | | |
| INSTRUCTION DECODE | | | | | | | | | | | | |
| ADDRESS ARITHMETIC | | | | | | | | | | | | |
| STORAGE ADDR REG | | | | | | | | | | | | |
| E-UNIT INPUT REG | | | | | | | | | | | | |
| L1 CACHE | | | | | | | | | | | | |
| L1 CONTROL | | | | | | | | | | | | |
| TLB | | | | | | | | | | | | |
| L1 CACHE DIRECTORY | | | | | | | | | | | | |
| L1 STORE QUEUE | | | | | | | | | | | | |
| L1 CACHE | | | | | | | | | | | | |
| L1 CACHE DATA BUFFER | | | | | | | | | | | | |
| L1/L2 DATA BUSS | | | | | | | | | | | | |
| L2 CACHE/BSU | | | | | | | | | | | | |
| L2 CONTROL | | | | | | | | | | | | |
| L2 CACHE DIRECTORY | | | | | | | | | | | | |
| L1 STATUS | | | | | | | | | | | | |
| L2 CACHE/BSU CONTROL | | | | | | | | | | | | |
| L2 DATA STORE QUEUE | | | | | | | | | | | | |
| L2 CACHE WRITE BUFFER | | | | | | | | | | | | |
| L2 CACHE | | | | | | | | | | | | |
| L2 CACHE READ BUFFER | | | | | | | | | | | | |
| L1 TRANSFER REGISTER | | | | | | | | | | | | |
| L2 INPAGE BUFFER | | | | | | | | | | | | |
| L3 INTERFACE REGISTER | | | | | | | | | | | | |
| L2/L3 DATA BUSS | | | | | | | | | | | | |
| L3/L4 SUBSYSTEM | | | | | | | | | | | | |
| MEMORY CONTROL REG IN | BSU EOP | | | L3 NOT BUSY | | | | | | | | |
| MEMORY CONTROL | | | | | | | | | | | | |
| ADDRESS/KEY | QW7 | | | | | | | | | | | |
| L3 MEMORY CONTROL | | | | | | | | | | | | |
| L3 MEMORY | ←——————→ | | | | | | | | | | | |
| BUSY INDICATORS | | | | | | | | | | | | |
| L1 CACHE DIRECTORY | | | | | | | | | | | | |
| L1 CACHE | | | | | | | | | | | | |
| L1/L2 ADDRESS BUSS | | | | | | | | | | | | |
| L1/L2 DATA BUSS | | | | | | | | | | | | |
| L2 CACHE DIRECTORY | | | | | | | | | | | | |
| L1 STATUS | | | | | | | | | | | | |
| L2 CACHE | | | | | | | | | | | | |
| L3 MEMORY | ←——→ | | | | | | | | | | | |

FIG. 37

PROCESSOR STORAGE STORE, SO(64)/1 L2 LN, TLB H, NO AE,
L1 M, STO EMPTY, L1/L2 INTFC FREE, L2 M, L2 ULR WO/L1 C

| PROCESSING UNIT | +12 | +13 | +14 | +15 | +16 | +17 | +18 | +19 | +20 | +21 | +22 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |

L1 CACHE

| | | | | | | | | | | | |
|---|---|---|---|---|---|---|---|---|---|---|---|
| L1 CONTROL | | | | | | | | | | | |
| TLB | | | | | | | | | | | |
| L1 CACHE DIRECTORY | | | | | | | | | | | |
| L1 STORE QUEUE | | | | | | | | | | | |
| L1 CACHE | | | | | | | | | | | |
| L1 CACHE DATA BUFFER | | | | | | | | | | | |
| L1/L2 DATA BUSS | TFR DW7 PEND IMPAGE-NORM ST | | | | | | | | | | |

L2 CACHE/BSU

| | | | | | | | | | | | |
|---|---|---|---|---|---|---|---|---|---|---|---|
| L2 CONTROL | C/A 6 | C/A 7 W/EOP | | | | | | | | | |
| L2 CACHE DIRECTORY | | | | | | | | | | | |
| L1 STATUS | | REP/+8 | INPAGE REQ | | | | | | | | |
| L2 CACHE/BSU CONTROL | REP/+8 | REP/+8 | REP/+8 | | | | | | | OWO VLD | |
| L2 DATA STORE QUEUE | EQ5/ | EQ6/ | EQ7/ | | DEQ6 | DEQ7 | | | | | |
| L2 CACHE WRITE BUFFER | DQ2 | DQ3 | DQ4 | DEQ5 | | | | | | | |
| L2 CACHE | DW2 | DW3 | DW4 | DW5 | DW6 | DW7 | | | | | |
| L2 CACHE READ BUFFER | | | | | | | | | | | |
| L1 TRANSFER REGISTER | | | | | | | | | | | |
| L2 INPAGE BUFFER | | CMD/ADDR | | | | | | | | QWD | |
| L3 INTERFACE REGISTER | | L3 CMD/ADDR | | | | | | | TFR | QW0 QW1 | |
| L2/L3 DATA BUSS | | | | | | | | | | | TFR QW1 |

L3/L4 SUBSYSTEM

| | | | | | | | | | | | |
|---|---|---|---|---|---|---|---|---|---|---|---|
| MEMORY CONTROL REG IN | | | | | | | | | | | |
| MEMORY CONTROL ADDRESS/KEY | SET R | | | | | | | | | | |
| L3 MEMORY CONTROL | | READ/ADDR | | | | | | | | | |
| L3 MEMORY | | | | | READ ACCESS | | | | | | |

BUSY INDICATORS

| | | | | | | | | | | | |
|---|---|---|---|---|---|---|---|---|---|---|---|
| L1 CACHE DIRECTORY | | | | | | | | | | | |
| L1 CACHE | | | | | | | | | | | |
| L1/L2 ADDRESS BUSS | | | | | | | | | | | |
| L1/L2 DATA BUSS | | | | | | | | | | | |
| L2 CACHE DIRECTORY | | | | | | | | | | | |
| L1 STATUS | | | | | | | | | | | |
| L2 CACHE | | | | | | | | | | | |
| L3 MEMORY | | | | | | | | | | | |

FIG. 39

PROCESSOR STORAGE STORE, SQ(64)/1 L2 LN, TLB H, NO AE,
L1 M, STQ EMPTY, L1/L2 INTFC FREE, L2 M, L2 ULR WO/L1 C

| PROCESSING UNIT | +34 | +35 | +36 | +37 | +38 | +39 | +40 | +41 | +42 | +43 | +44 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |
| L1 CACHE | | | | | | | | | | | |
| L1 CONTROL | | | | | | | | | | | |
| TLB | | | | | | | | | | | |
| L1 CACHE DIRECTORY | | | | | | | | | | | |
| L1 STORE QUEUE | | | DEQ | WBQ | | | | | | | |
| L1 CACHE | | | | | | | | | | | |
| L1 CACHE DATA BUFFER | | | | | | | | | | | |
| L1/L2 DATA BUSS | | | | | | | | | | | |
| L2 CACHE/BSU | CLEAR 1HQ | TFR DEQ | | | | | | | | | |
| L2 CONTROL | SEARCH | UPDATE | | | | | | | | | |
| L2 CACHE DIRECTORY | | SEARCH | | | | | | | | | |
| L1 STATUS | ST WB/ | L2 SET | | | | | | | | | |
| L2 CACHE/BSU CONTROL | ADDR | | DEQ WBQ | | | | | | | | |
| L2 DATA STORE QUEUE | | | | | | | | | | | |
| L2 CACHE WRITE BUFFER | WR 32 | | WR32/ | WR96/ | | | | | | | |
| L2 CACHE | WR 96 | | WBQ | WBQ | | | | | | | |
| L2 CACHE READ BUFFER | | | | | | | | | | | |
| L1 TRANSFER REGISTER | | | | | | | | | | | |
| L2 INPAGE BUFFER | | | | | | | | | | | |
| L3 INTERFACE REGISTER | | | | | | | | | | | |
| L2/L3 DATA BUSS | BSU EOP | | | | | | | | | | |
| L3/L4 SUBSYSTEM | L2 CMD/PORT | | | | | | | | | | |
| MEMORY CONTROL REG IN | UPD | L2 ST-HIT | | | SET R,C | | | | | | |
| MEMORY CONTROL | MDIR REQ | | | | | | | | | | |
| ADDRESS/KEY | UPD | READ R/C | | | | | | | | | |
| L3 MEMORY CONTROL | MDIR | MDIR UPDATE | | | | | | | | | |
| L3 MEMORY | | SET C/ADDR | | | | | | | | | |
| BUSY INDICATORS | | | | | | | | | | | |
| L1 CACHE DIRECTORY | | | | | | | | | | | |
| L1 CACHE | | | | | | | | | | | |
| L1/L2 ADDRESS BUSS | | | | | | | | | | | |
| L1/L2 DATA BUSS | | | | | | | | | | | |
| L2 CACHE DIRECTORY | ―――― | | | | | | | | | | |
| L1 STATUS | ――――― | | | | | | | | | | |
| L2 CACHE | ―――――― | | | | | | | | | | |
| L3 MEMORY | | | | | | | | | | | |

FIG. 40

PROCESSOR STORAGE STORE, SQ(64)/1 L2 LN, TLB H, NO AE,
L1 M, STQ EMPTY, L1/L2 INTFC FREE, L2 M, L2 MLR WO/L1 C

| PROCESSING UNIT | ⊢1 | ⊢2 | ⊢3 | ⊢4 | ⊢5 | ⊢6 | ⊢7 | ⊢8 | ⊢9 | ⊢10 | ⊢11 |
|---|---|---|---|---|---|---|---|---|---|---|---|
| INSTRUCTION REG | ⊢ | | | | | | | | | | |
| INSTRUCTION DECODE | ⊢—⊣ | | UPD | UPD | UPD | UPD | UPD | UPD | UPD | | |
| ADDRESS ARITHMETIC | | | SFA | +8 | +8 | +8 | +8 | +8 | +8 | +8 | |
| | | | | SFA | SFA | SFA | SFA | SFA | SFA | SFA | EFA |
| STORAGE ADDR REG | | | | +8 | +16 | +24 | +32 | +40 | +48 | | |
| E-UNIT INPUT REG | | | | DW0 | DW1 | DW2 | DW3 | DW4 | DW5 | DW6 | DW7 |

L1 CACHE

| | | | | STORE | STORE | STORE | STORE | | STORE | | |
|---|---|---|---|---|---|---|---|---|---|---|---|
| L1 CONTROL | | | | STORE | STORE | STORE | STORE | | | | |
| TLB | | | | HIT | HIT | HIT | HIT | HIT | HIT | HIT | HIT |
| | | | | MISS | MISS | MISS | MISS | MISS | MISS | MISS | MISS |
| L1 CACHE DIRECTORY | | | | ENQ0 | ENQ1 | ENQ2 | ENQ3 | | ENQ5 | | ENQ7 |
| L1 STORE QUEUE | | | | | | | ENQ4 | | ENQ6 | | |
| L1 CACHE | | | | STORE | STORE | STORE | STORE | STORE | STORE | STORE | |
| L1 CACHE DATA BUFFER | | | | | TFR | TFR | TFR | TFR | TFR | TFR | STORE |
| L1/L2 DATA BUSS | | | | | DW0 | DW1 | DW2 | DW3 | DW4 | DW5 | TFR DW6 |

L2 CACHE/BSU

| | | | | | C/A 0 | C/A1 | C/A2 | C/A3 | C/A4 | | |
|---|---|---|---|---|---|---|---|---|---|---|---|
| L2 CONTROL | | | | | SEARCH | MISS | SET | | | C/A5 | |
| L2 CACHE DIRECTORY | | | | | | SEARCH | HO | | | | |
| L1 STATUS | | | | | | | L2 MISS | L3 ADDR | | | |
| | | | | | ID WB/ADDR | REP/+8 | REP/+8 | | | | |
| L2 CACHE/BSU CONTROL | | | | | | | REP/+8 | EO4/DQ1 | | | |
| L2 DATA STORE QUEUE | | | | | EMQ0 | | | DW1 | | | |
| L2 CACHE WRITE BUFFER | | | | EMQ BFR | EMQ1 | EMQ2 | | DW0 | | | |
| L2 CACHE | | | | | | | | | | | |
| L2 CACHE READ BUFFER | | | | | | | | EO3/DQ0 | | | |
| L1 TRANSFER REGISTER | | | | | | | | | | | |
| L2 INPAGE BUFFER | | | | | | | | | | | |
| L3 INTERFACE REGISTER | | | | | | | | | | | |
| L2/L3 DATA BUSS | | | | | | | | | | | |

L3/L4 SUBSYSTEM

| | | | | | L2 CMD/PORT | L2 ST-MISS | | | | |
|---|---|---|---|---|---|---|---|---|---|---|---|
| MEMORY CONTROL REG IN | | | | | PRIORITIZE | ACTIVATE | | | | | |
| MEMORY CONTROL | | | | | L3 INPAGE/ADDR | READ R/C | | | | | |
| ADDRESS/KEY | | | | | | TFR L3 | | | | | |
| L3 MEMORY CONTROL | | | | | | ADDR | | | | | |
| L3 MEMORY | | | | | | | | | | | |

BUSY INDICATORS

| L1 CACHE DIRECTORY | | | | ⊢—⊢—⊢—⊢—⊢—⊢—⊢—⊣ |
| L1 CACHE | | | | ⊢—⊢—⊢—⊢—⊢—⊢—⊢—⊣ |
| L1/L2 ADDRESS BUSS | | | | ⊢—⊢—⊢—⊢—⊢—⊢—⊢— |
| L1/L2 DATA BUSS | | | | ⊢—⊢—⊢—⊢—⊢—⊢— |
| L2 CACHE DIRECTORY | | | | ⊢—⊢— |
| L1 STATUS | | | | ⊢—⊣ |
| L2 CACHE | | | | ⊢— |
| L3 MEMORY | | | | |

FIG. 42

PROCESSOR STORAGE STORE, SO(64)/1 L2 LN, TLB H, NO AE,
L1 M, STQ EMPTY, L1/L2 INTFC FREE, L2 M, L2 MLR WO/L1 C

| PROCESSING UNIT | +23 | +24 | +25 | +26 | +27 | +28 | +29 | +30 | +31 | +32 | +33 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |
| L1 CACHE | | | | | | | | | | | |
| L1 CONTROL | | | | | | | | | | | |
| TLB | | | | | | | | | | | |
| L1 CACHE DIRECTORY | | | | | | | | | | | |
| L1 STORE QUEUE | | | | | | | | | | | |
| L1 CACHE | | | | | | | | | | | |
| L1 CACHE DATA BUFFER | | | | | | | | | | | |
| L1/L2 DATA BUSS | | | | | | CMD-COMPL INPAGE | | CLEAR FREEZE | | | |
| L2 CACHE/BSU | | | | | | | | | | | |
| L2 CONTROL | | | | | | | | | SEARCH UPDATE | SEARCH | |
| L2 CACHE DIRECTORY | | | | | | | | | | L2 | |
| L1 STATUS | OW1 VLD | OW2 VLD | OW3 VLD | OW4 VLD | OW5 VLD | OW6 VLD | OW7 VLD | | | MOD | |
| L2 CACHE/BSU CONTROL | | | | | | | | INPAGE/ ADDR | | | |
| L2 DATA STORE QUEUE | | | | | | | | | | RD 32 | |
| L2 CACHE WRITE BUFFER | | | | | | | | | | | |
| L2 CACHE | | | | | | | | | | | |
| L2 CACHE READ BUFFER | | | | | | | | | | | |
| L1 TRANSFER REGISTER | OW0 | OW1 | OW2 | OW3 | OW4 | OW5 | OW6 | OW7 | | | |
| L2 INPAGE BUFFER | | | | | | | | | | | |
| L3 INTERFACE REGISTER | | OW1 | OW2 | OW3 | OW4 | OW5 | OW6 | OW7 | CMPL INPG/ PORT | L2 ST-MOD | |
| L2/L3 DATA BUSS | | TFR | TFR | TFR | TFR | TFR | TFR | | | | |
| L3/L4 SUBSYSTEM | OW2 | OW3 | OW4 | OW5 | OW6 | OW7 | | | | | |
| MEMORY CONTROL REG IN | | | | | | | | | | | |
| MEMORY CONTROL | | | | | | L3 NOT BUSY | | | | | |
| ADDRESS/KEY | | | | | | | | | OUTPAGE ADDR / L2 SET | | |
| L3 MEMORY CONTROL | | | | | | | | | | | |
| L3 MEMORY | | | | | | | | | | | |
| BUSY INDICATORS | | | | | | | | | | | |
| L1 CACHE DIRECTORY | | | | | | | | | | | |
| L1 CACHE | | | | | | | | | | | |
| L1/L2 ADDRESS BUSS | | | | | | | | | | | |
| L1/L2 DATA BUSS | | | | | | | | | | | |
| L2 CACHE DIRECTORY | | | | | | | | | | | |
| L1 STATUS | | | | | | | | | | | |
| L2 CACHE | | | | | | | | | | | |
| L3 MEMORY | | | | | | | | | | | |

FIG. 43

PROCESSOR STORAGE STORE, SQ(64)/1 L2 LN, TLB H, NO AE, L1 M, STQ EMPTY, L1/L2 INTFC FREE, L2 M, L2 MLR WO/L1 C

| PROCESSING UNIT | +34 | +35 | +36 | +37 | +38 | +39 | +40 | +41 | +42 | +43 | +44 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |

L1 CACHE

| | | | | | | | | | | | |
|---|---|---|---|---|---|---|---|---|---|---|---|
| L1 CONTROL | | | | | | | | | | | |
| TLB | | | | | | | | | | | |
| L1 CACHE DIRECTORY | | | | | DEQ | WB0 | | | | | |
| L1 STORE QUEUE | | | | | | | | | | | |
| L1 CACHE | | | | | | | | | | | |
| L1 CACHE DATA BUFFER | | | | | | | | | | | |
| L1/L2 DATA BUSS | SEQ COMPL RTNE | | | | | | | | | | |

L2 CACHE/BSU

| | | | | | | | | | | | |
|---|---|---|---|---|---|---|---|---|---|---|---|
| L2 CONTROL | | | CLEAR | L1O | | | | | | | |
| L2 CACHE DIRECTORY | | SEARCH | | TFR | DEQ | | | | | | |
| L1 STATUS | | SEARCH | UPDATE | | | | | | | | |
| L2 CACHE/BSU CONTROL | | L2 | | L2 SET | | | | | | | |
| L2 DATA STORE QUEUE | | PTPG ADDR | ST WB/ ADDR | | DEQ | WBQ | | | | | |
| L2 CACHE WRITE BUFFER | RD96 | | WR 96 | | | WR96/ WB0 | | | | | |
| L2 CACHE | | | WR 32 | WR32/ WB0 | | | | | | | |
| L2 CACHE READ BUFFER | | | | | | | | | | | |
| L1 TRANSFER REGISTER | | | | | | | | | | | |
| L2 INPAGE BUFFER | | CMD/ ADDR | | OPB OW0 | OPB OW1 | OPB OW2 | OPB OW3 | OPB OW4 | OPB OW5 | OPB OW6 | OPB OW7 |
| L3 INTERFACE REGISTER | | L3 CMD/ADDR | | TFR OW0 | TFR OW1 | TFR OW2 | TFR OW3 | TFR OW4 | TFR OW5 | TFR OW6 | TFR OW7 |
| L2/L3 DATA BUSS | | | | | | | | | | | |

L3/L4 SUBSYSTEM

| | | | | | | | | | | | |
|---|---|---|---|---|---|---|---|---|---|---|---|
| MEMORY CONTROL REG IN | L2 CMD/PORT | UPD MDIR | REQ | L2 ST-HIT | | | | | | | |
| MEMORY CONTROL | | | MDIR UPDATE | SET CADDR | READ R/C | | SET R,C | | | | |
| ADDRESS/KEY | TFR ADDR | UPD MDIR | | | OW0 | OW1 | OW2 | OW3 | OW4 | OW5 | OW6 |
| L3 MEMORY CONTROL | | | WRITE/ ADDR | | WRITE ACCESS | | | | | | |
| L3 MEMORY | | | | | | | | | | | |

BUSY INDICATORS

| | | | | | | | | | | | |
|---|---|---|---|---|---|---|---|---|---|---|---|
| L1 CACHE DIRECTORY | | | | | | | | | | | |
| L1 CACHE | | | | | | | | | | | |
| L1/L2 ADDRESS BUSS | | | | | | | | | | | |
| L1/L2 DATA BUSS | | | | | | | | | | | |
| L2 CACHE DIRECTORY | +---+---+---+---+ | | | | | | | | | | |
| L1 STATUS | +---+---+---+---+---+ | | | | | | | | | | |
| L2 CACHE | +---+---+---+---+---+---+ | | | | | | | | | | |
| L3 MEMORY | +---+---+---+---+---+---+---+ | | | | | | | | | | |

FIG. 44

PROCESSOR STORAGE STORE, SO(84)/1 L2 LN, TLB H, NO AE, L1 M, STQ EMPTY, L1/L2 INTFC FREE, L2 M, L2 MLR WO/L1 C

| PROCESSING UNIT | 45 | 46 | 47 | 48 | 49 | 50 | 51 | 52 | 53 | 54 | 55 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |
| L1 CACHE | | | | | | | | | | | |
| L1 CONTROL | | | | | | | | | | | |
| TLB | | | | | | | | | | | |
| L1 CACHE DIRECTORY | | | | | | | | | | | |
| L1 STORE QUEUE | | | | | | | | | | | |
| L1 CACHE | | | | | | | | | | | |
| L1 CACHE DATA BUFFER | | | | | | | | | | | |
| L1/L2 DATA BUSS | | | | | | | | | | | |
| L2 CACHE/BSU | | | | | | | | | | | |
| L2 CONTROL | | | | | | | | | | | |
| L2 CACHE DIRECTORY | | | | | | | | | | | |
| L1 STATUS | | | | | | | | | | | |
| L2 CACHE/BSU CONTROL | | | | | | | | | | | |
| L2 DATA STORE QUEUE | | | | | | | | | | | |
| L2 CACHE WRITE BUFFER | | | | | | | | | | | |
| L2 CACHE | | | | | | | | | | | |
| L2 CACHE READ BUFFER | | | | | | | | | | | |
| L1 TRANSFER REGISTER | | | | | | | | | | | |
| L2 INPAGE BUFFER | | | | | | | | | | | |
| L3 INTERFACE REGISTER | | | | | | | | | | | |
| L2/L3 DATA BUSS | | | | | | | | | | | |
| L3/L4 SUBSYSTEM | | BSU EOP | | | L3 NOT BUSY | | | | | | |
| MEMORY CONTROL REG IN | | ⊢⊣ | | | ⊢⊣ | | | | | | |
| MEMORY CONTROL | | | | | | | | | | | |
| ADDRESS/KEY | QW7 | | | | | | | | | | |
| L3 MEMORY CONTROL | ⊢⊣ | | | | | | | | | | |
| L3 MEMORY | ⊢――――――⊣ | | | | | | | | | | |
| BUSY INDICATORS | | | | | | | | | | | |
| L1 CACHE DIRECTORY | | | | | | | | | | | |
| L1 CACHE | | | | | | | | | | | |
| L1/L2 ADDRESS BUSS | | | | | | | | | | | |
| L1/L2 DATA BUSS | | | | | | | | | | | |
| L2 CACHE DIRECTORY | | | | | | | | | | | |
| L1 STATUS | | | | | | | | | | | |
| L2 CACHE | | | | | | | | | | | |
| L3 MEMORY | ⊢―⊣ | | | | | | | | | | |

FIG. 46

PROCESSOR STORAGE STORE, SQ(64)/2 L2 LN, TLB H, NO AE, STQ EMPTY, L1/L2 INTFC FREE, LN1: L2 M, L2 ULR WO/L1 C, LN2: L2 H

| | 12 | 13 | 14 | 15 | 16 | 17 | 18 | 19 | 20 | 21 | 22 |
|---|---|---|---|---|---|---|---|---|---|---|---|
| PROCESSING UNIT | | | | | | | | | | | |
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |
| L1 CACHE | | | | | | | | | | | |
| L1 CONTROL | | | | | | | | | | | |
| TLB | | | | | | | | | | | |
| L1 CACHE DIRECTORY | | | | | | | | | | | |
| L1 STORE QUEUE | | | | | | | | | | | |
| L1 CACHE | | | | | | | | | | | |
| L1 CACHE DATA BUFFER | TFR 13 | | | | | | | | | | |
| L1/L2 DATA BUSS | | | | | | | | | | | |
| L2 CACHE/BSU | | | | | | | | | | | |
| L2 CONTROL | PEND INPAGE-NORM ST | | | | | | | | | | |
| | C/A 12 | C/A 13 W/EOP | | | | | | | | | |
| L2 CACHE DIRECTORY | | | | | | | | | | | |
| L1 STATUS | INPEND REQ | | | | | | | QW6 VLD | | | |
| L2 CACHE/BSU CONTROL | ENQ 11 ENQ 12 | | | | | | | | | | |
| L2 DATA STORE QUEUE | | ENQ 13 | | | | | | | | | |
| L2 CACHE WRITE BUFFER | DWOE DWOF | | | | | | | | | | |
| L2 CACHE | | | | | | | | | | | |
| L2 CACHE READ BUFFER | | | | | | | | | | | |
| L1 TRANSFER REGISTER | | | | | | | | | | | |
| L2 INPAGE BUFFER | CM/ADDR | | | | | | | QW6 | | | |
| L3 INTERFACE REGISTER | L3 CM/ADDR | | | | | | TFR QW6 | | | | |
| L2/L3 DATA BUSS | | | | | | | | TFR QW7 | | | |
| L3/L4 SUBSYSTEM | | | | | | | | | | | |
| MEMORY CONTROL REG IN | | | | | | | | | | | |
| MEMORY CONTROL | SET R | | | | | | | | | | |
| ADDRESS/KEY | READ/ADDR | | | | | | | | | | |
| L3 MEMORY CONTROL | READ ACCESS | | | | | | | | | | |
| L3 MEMORY | | | | | | | | | | | |
| BUSY INDICATORS | | | | | | | | | | | |
| L1 CACHE DIRECTORY | | | | | | | | | | | |
| L1 CACHE | | | | | | | | | | | |
| L1/L2 ADDRESS BUSS | | | | | | | | | | | |
| L1/L2 DATA BUSS | | | | | | | | | | | |
| L2 CACHE DIRECTORY | | | | | | | | | | | |
| L1 STATUS | | | | | | | | | | | |
| L2 CACHE | | | | | | | | | | | |
| L3 MEMORY | | | | | | | | | | | |

PROCESSOR STORAGE STORE, 8084 1/2 L2 LN, TLB H, BO AE,
STQ EMPTY, L1/L2 INTFC FREE, LN1: L2 M, L2 ULR WO/L1 C,   FIG. 49
LN2: L2 H

| PROCESSING UNIT | +45 | +46 | +47 | +48 | +49 | +50 | +51 | +52 | +53 | +54 | +55 |
|---|---|---|---|---|---|---|---|---|---|---|---|
| INSTRUCTION REG | | | | | | | | | | | |
| INSTRUCTION DECODE | | | | | | | | | | | |
| ADDRESS ARITHMETIC | | | | | | | | | | | |
| STORAGE ADDR REG | | | | | | | | | | | |
| E-UNIT INPUT REG | | | | | | | | | | | |
| L1 CACHE | | | | | | | | | | | |
| L1 CONTROL | | | | | | | | | | | |
| TLB | | | | | | | | | | | |
| L1 CACHE DIRECTORY | | | | | | | | | | | |
| L1 STORE QUEUE | | | | | | | | | | | |
| L1 CACHE | | | | | | | | | | | |
| L1 CACHE DATA BUFFER | | | | | | | | | | | |
| L1/L2 DATA BUSS | | | | | | | | | | | |
| L2 CACHE/BSU | | | | | | | | | | | |
| L2 CONTROL | | | | | | | | | | | |
| L2 CACHE DIRECTORY | | | | | | | | | | | |
| L1 STATUS | | | | | | | | | | | |
| L2 CACHE/BSU CONTROL | | | | | | | | | | | |
| L2 DATA STORE QUEUE | | | | | | | | | | | |
| L2 CACHE WRITE BUFFER | WR98/WB1 | | | | | | | | | | |
| L2 CACHE | | | | | | | | | | | |
| L2 CACHE READ BUFFER | | | | | | | | | | | |
| L1 TRANSFER REGISTER | | | | | | | | | | | |
| L2 INPAGE BUFFER | | | | | | | | | | | |
| L3 INTERFACE REGISTER | | | | | | | | | | | |
| L2/L3 DATA BUSS | | | | | | | | | | | |
| L3/L4 SUBSYSTEM | | | | | | | | | | | |
| MEMORY CONTROL REG IN | | | | | | | | | | | |
| MEMORY CONTROL | | SET R,C | | | | | | | | | |
| ADDRESS/KEY | | | | | | | | | | | |
| L3 MEMORY CONTROL | | | | | | | | | | | |
| L3 MEMORY | | | | | | | | | | | |
| BUSY INDICATORS | | | | | | | | | | | |
| L1 CACHE DIRECTORY | | | | | | | | | | | |
| L1 CACHE | | | | | | | | | | | |
| L1/L2 ADDRESS BUSS | | | | | | | | | | | |
| L1/L2 DATA BUSS | | | | | | | | | | | |
| L2 CACHE DIRECTORY | | | | | | | | | | | |
| L1 STATUS | | | | | | | | | | | |
| L2 CACHE | |⎯⎯| | | | | | | | | |
| L3 MEMORY | | | | | | | | | | | |

STORE QUEUE FOR A TIGHTLY COUPLED MULTIPLE PROCESSOR CONFIGURATION WITH TWO-LEVEL CACHE BUFFER STORAGE

BACKGROUND OF THE INVENTION

The subject matter of this invention pertains to computing systems, and more particularly, to a store queue in a first level of memory hierarchy and a store queue and write buffers in a second level of cache memory hierarchy of a multiprocessor computer system for queuing data intended for storage in the second level of cache memory hierarchy.

Computing systems include multiprocessor systems. Multiprocessor systems comprise a plurality of processors, each of which may at some point in time require access to main memory. This requirement may arise simultaneously with respect to two or more of the processors in the multiprocessing system. Such systems may comprise intermediate level caches for temporarily storing instructions and data. For example, U.S. Pat. Nos. 4,445,174 and 4,442,487 disclose multiprocessor systems including intermediate first level cache storage (L1 cache) and intermediate second level cache storage (L2 cache). These patents do not specifically disclose a system configuration which comprises an L1 cache for each processor of the multiprocessor system, an L2 cache connected to and shared by the individual L1 caches of each processor, and a main memory, designated L3, connected solely to the shared L2 cache. In such a configuration, if data and/or instructions, stored in an L1 cache of one processor of the multiprocessor system, should be moved for storage into the shared L2 cache, and ultimately into L3, and if the shared L2 cache is busy storing data and/or instructions associated with another of the processors of the multiprocessor system, the L1 cache of the one processor must wait until the shared L2 cache is no longer busy before it may begin its storage operations. Therefore, a queuing system is needed, for connection between the individual L1 caches of each processor and the shared L2 cache, to queue the data and/or instructions from the L1 cache of the one processor prior to storage in the shared L2 cache so that the one processor may begin another operation. In such a queuing system, when a first set of data and/or instructions are stored in the queue, the queue itself may be full; therefore, when the one processor intends to store a second set of data and/or instructions in the queue, as well as in its L1 cache, since the queue is full, the one processor cannot begin another operation until the queue is no longer full. Therefore, it is desirable that the queue be designed in stages, in a pipelined manner, such that the second set of data and-/or instructions may be queued along with the first set of data and/or instructions. In this manner, multiple sets of data and/or instructions, intended for storage in an L1 cache, may be queued for ultimate storage in the shared L2 cache, thereby permitting continued operation of the one processor associated with the L1 cache.

In addition, when data is modified by one processor of a multiprocessor configuration, which includes a plurality of processors, a single main memory, and intermediate level caches L1 and L2, if the corresponding un-modified data is stored in the processor's cache, the modified data must be re-stored in the processor's cache. The modified data must be re-stored in its cache before the other processors may "see" the modified data. Therefore, some method of policing the visibility of the modified data vis-a-vis the other processors in the multiprocessor configuration is required. Furthermore, an apparatus is needed to maintain accurate control over access to main memory and the caches. In this application, the apparatus for policing the visibility of the modified data vis-a-vis other processors and for maintaining control over access to the main memory and the caches is termed a "Storage Subsystem".

SUMMARY OF THE INVENTION

Accordingly, it is an object of the present invention to introduce a novel storage subsystem for a computer system including a system of novel store queues for queuing data intended for storage in an L1 cache and for queuing data intended for storage in a shared L2 cache of a Storage Subsystem.

It is a further object of the present invention to introduce a novel storage subsystem including a system of write buffers to be used in conjunction with the novel store queues for increasing the capacity of the store queues so that the various processors of the multiprocessor system may not be inhibited in their operation when attempting a store operation to the shared L2 cache and to main memory.

In accordance with this and other objects of the present invention, as shown in FIG. 6 of the drawings, a storage subsystem includes a system of store queues. A store queue is associated with a level one L1 cache and a store queue is associated with a level two L2 cache of a multiprocessor system. The multiprocessor system includes at least first and second processors, each processor having its own L1 cache. The L1 cache of each processor is connected to its own first store queue for queuing data prior to storage in the L1 cache. In addition, the two processors share a second level of cache, an L2 cache. The L2 cache is connected to its own second store queue as well. The L2 cache is connected to main memory, considered an L3 level of memory hierarchy. Further, a system of write buffers connect the second store queue to the L2 cache. When data is intended for storage in L1 cache, it is first queued in its first store queue simultaneously with storage in L1 cache. Once stored in L1 cache, the data must be stored in L2 cache; but, prior to storage in L2 cache, the data is first queued in the second store queue of the L2 cache. When stored in the second store queue, the data may be further stored in one of the write buffers which interconnect the second store queue to the L2 cache. Ultimately, the data is stored in a final L2 cache write buffer prior to actual storage in the L2 cache. The data "may be" stored in one of the write buffers since data and/or instructions associated with "sequential stores (SS)" are stored in the write buffers prior to actual storage in the final L2 cache write buffer, but data and/or instructions associated with "non-sequential stores (NS)" are not stored in the write buffers, rather, they bypass the write buffers and are stored directly into the final L2 cache write buffer from the second store queue. When access to the L2 cache is obtained, via arbitration, the data stored in the final L2 cache write buffer is stored in L2 cache. Once the data is stored in L2 cache, subsequent cross-invalidation requests, originating from the L2 cache, invalidate other corresponding entries of the data in the L1 caches. As a result of this use of store queues at the L1 cache, the store queue at the L2 cache level, and the write buffers interconnected between the L2 store queue and the L2 cache, one processor is not inhibited in its execution of various instructions even though the L2 cache is busy with a store operation associated with another of the processors in the multiprocessor system. Performance of the computer system of this invention is maximized and interference between processors at the L2 cache level is minimized.

Further scope of applicability of the present invention will become apparent from the detailed description presented hereinafter. It should be understood, however, that the detailed description and the specific examples, while representing a preferred embodiment of the invention, are given by way of illustration only, since various charges and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 11 through 49 illustrate time line diagrams corresponding to the store routines associated with the triadic computer system of FIG. 2.

DESCRIPTION OF THE PREFERRED EMBODIMENT

Figure 1:
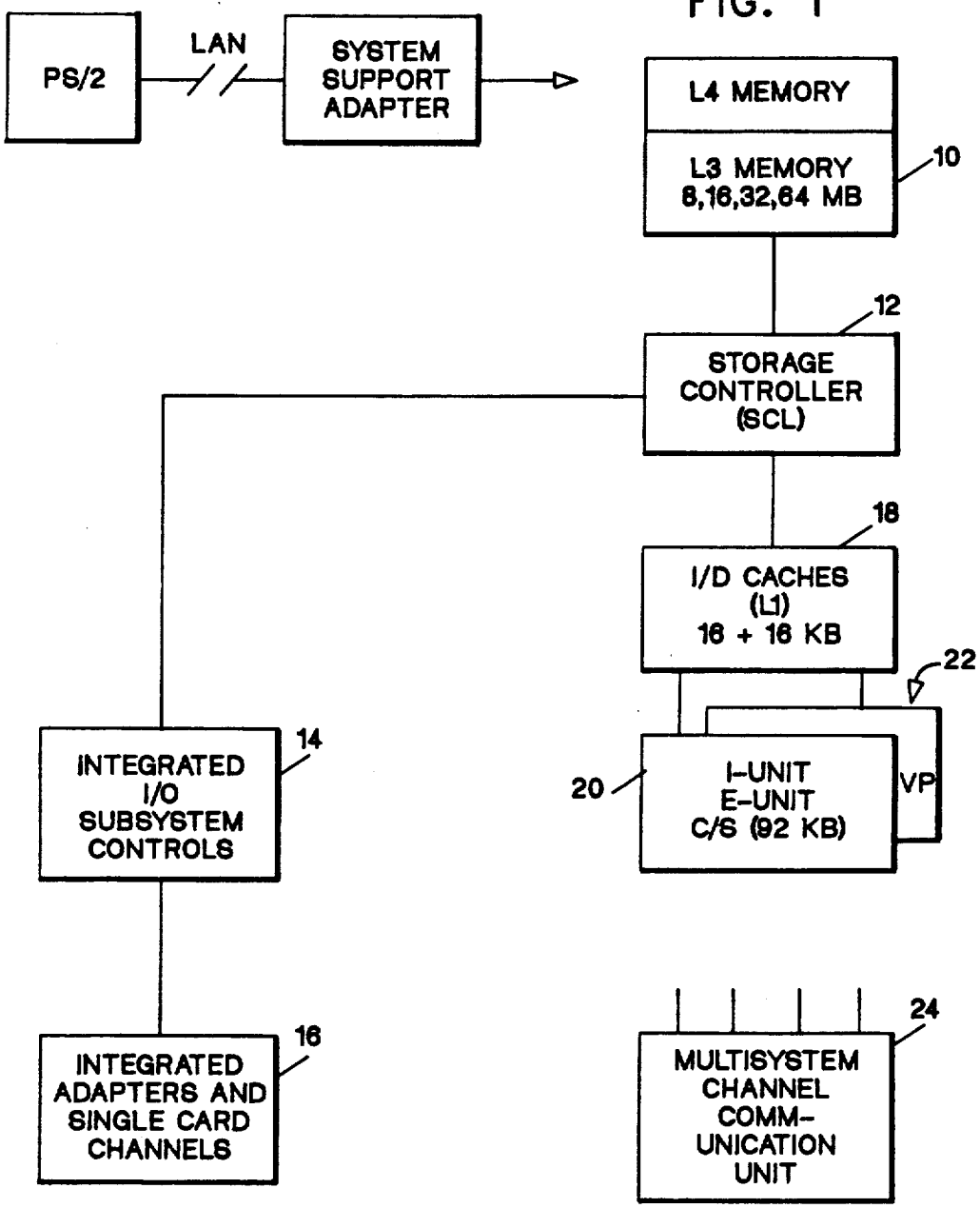
FIG. 1 illustrates a uniprocessor computer system.

Referring to FIG. 1, a uniprocessor computer system of the present invention is illustrated.

In FIG. 1, the uniprocessor system comprises an L3 memory 10 connected to a storage controller (SCL) 12. On one end, the storage controller 12 is connected to an integrated I/O subsystem controls 14, the controls 14 being connected to integrated adapters and single card channels 16. On the other end, the storage controller 12 is connected to I/D caches (L1) 18, which comprise an instruction cache, and a data cache, collectively termed the "L1" cache. The I/D caches 18 are connected to an instruction unit (I-unit), Execution unit (E-unit), control store 20 and to a vector processor (VP) 22. The vector processor 22 is described in a previously copending patent application assigned to the same assignee, entitled "High Performance Parallel Vector Processor" which was issued Nov. 28, 1989 as U.S. Pat. No. 4,884,190, the disclosure of which is incorporated by reference into the specification of this application. The uniprocessor system of FIG. 1 also comprises the multisystem channel communication unit 24.

The memory 10 comprises 2 "intelligent" memory cards, each memory card including a level three (L3) memory portion and an extended (L4) memory portion. The cards are "intelligent" due to the existence of certain specific features: error checking and correction, extended error checking and correction (ECC) refresh address registers and counters, and bit spare capability. The interface to the L3 memory 10 is 8-bytes wide. Memory sizes are 8, 16, 32, and 64 megabytes. The L3 memory is connected to a storage controller (SCL) 12.

The storage controller 12 comprises three bus arbiters arbitrating for access to the L3 memory 10, to the I/O subsystem controls 14, and to the I/D caches 18. The storage controller further includes a directory which is responsible for searching the instruction and data caches 18, otherwise termed the L1 cache, for data. If the data is located in the L1 caches 18, but the data is obsolete, the storage controller 12 invalidates the obsolete data in the L1 caches 18 thereby allowing the I/O subsystem controls 14 to update the data in the L3 memory 10. Thereafter, instruction and execution units 20 must obtain the updated data from the L3 memory 10. The storage controller 12 further includes a plurality of buffers for buffering data being input to L3 memory 10 from the I/O subsystem controls 11 and for buffering data being input to L3 memory 10 from instruction/execution units 20. The buffer associated with the instruction/execution units 20 is a 256 byte line buffer which allows the building of entries 8 bytes at a time for certain types of instructions, such as sequential operations. This line buffer, when full, will cause a block transfer of data to L3 memory to occur. Therefore, memory operations are reduced from a number of individual store operations to a much smaller number of line transfers.

The instruction cache/data cache 18 are each 16 K byte caches. The interface to the storage controller 12 is 8 bytes wide; thus, an inpage operation from the storage controller 12 takes 8 data transfer cycles. The data cache 18 is a "store through" cache, which means that data from the instruction/execution units 20 are stored in L3 memory and, if the corresponding obsolete data is not present in the L1 caches 18, the data is not brought into and stored in the L1 caches. To assist this operation, a "store buffer" is present with the L1 data cache 18 which is capable of buffering up to 8 store operations.

The vector processor 22 is connected to the data cache 18. It shares the dataflow of the instruction/execution unit 20 into the storage controller 12, but the vector processor 22 will not, while it is operating, permit the instruction/execution unit 20 to make accesses into the storage controller 12 for the fetching of data.

The integrated I/O subsystem 14 is connected to the storage controller 12 via an 8-byte bus. The subsystem 14 comprises three 64-byte buffers used to synchronize data coming from the integrated I/O subsystem 14 with the storage controller 12. That is, the instruction/execution unit 20 and the I/O subsystem 14 operate on different clocks, the synchronization of the two clocks being achieved by the three 64-byte buffer structure.

The multisystem channel communication unit 24 is a 4-port channel to channel adapter, packaged externally to the system.

Figure 2:
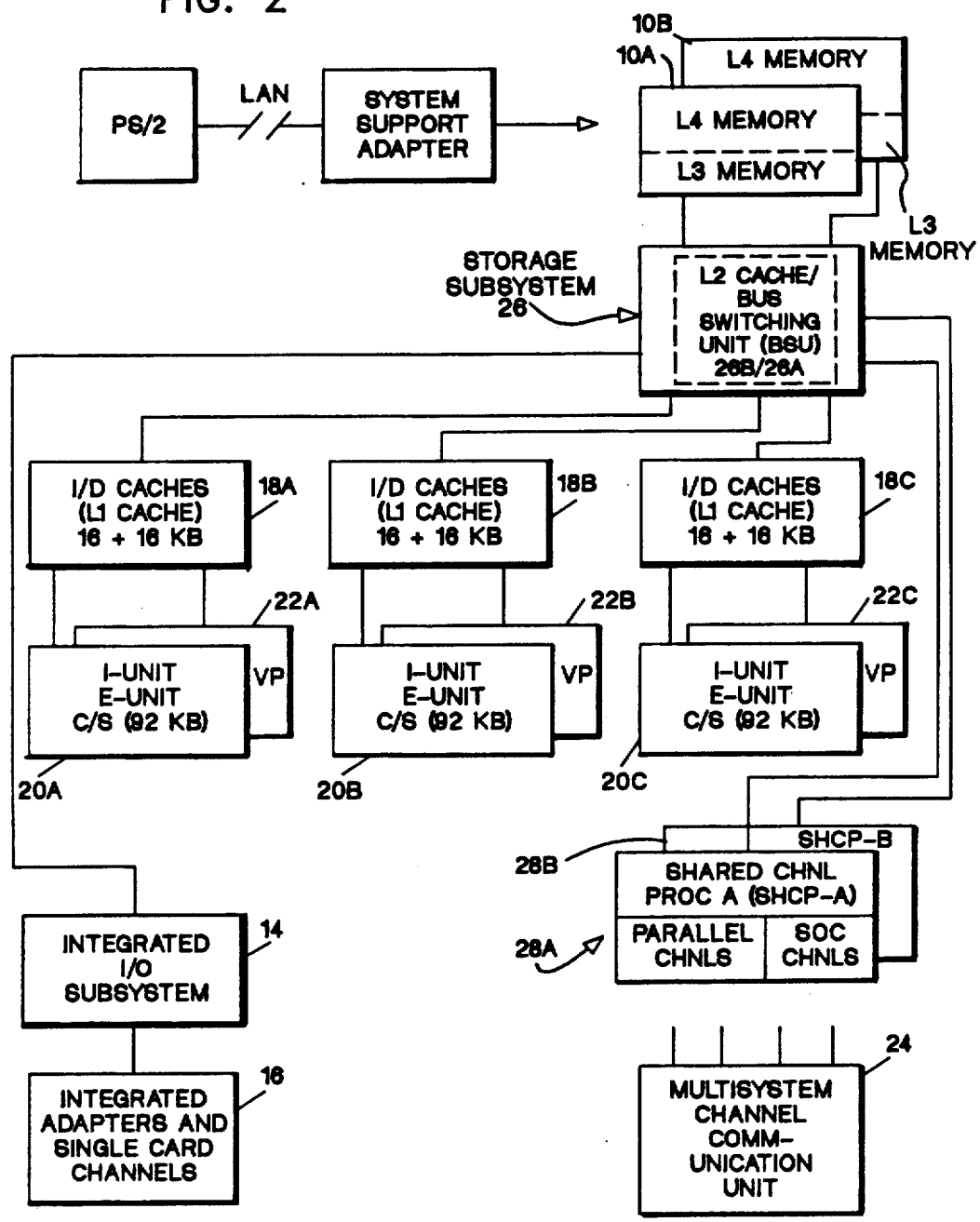
FIG. 2 illustrates a triadic computer system.

Referring to FIG. 2, a triadic (multiprocessor) system is illustrated.

In FIG. 2, a Storage Subsystem 26 is connected to the ports of a pair of L3 memories 10a/10b. The Storage Subsystem 26 includes a bus switching unit (BSU) 26a and an L2 cache 26b. The Storage Subsystem 26 will be set forth in more detail in FIG. 5. The BSU 26a is connected to the integrated I/O subsystem 14, to shared channel processor A (SHCP-A) 28a, to shared channel processor B (SHCP-B) 28b, and to three processors: a first processor including instruction/data caches 18a and instruction/execution units/control store 20a, a second processor including instruction/data caches 18b and instruction/execution units/control store 20b, and a third processor including instruction/data caches 18c and instruction/execution units/control store 20c. Each of the instruction/data caches 18a, 18b, 18c are termed "L1" caches. The cache in the the Storage Subsystem 26 is termed the L2 cache 26b, and the main memory 10a/10b is termed the L3 memory.

The Storage Subsystem 26 connects together the three processors 18a/20a, 18b/20b, and 18c/20c, the two L3 memory ports 10a/10b, the two shared channel processors 28, and an integrated I/O subsystem 14. The Storage Subsystem 26 comprise circuits which decide the priority for requests to be handled, such as requests from each of the three processors to L3 memory, or requests from the I/O subsystem 14 or shared channel processors, circuits which operate the interfaces, and circuits to access the L2 cache 26b. The L2 cache 26b is a "store in" cache, meaning that operations which access the L2 cache, to modify data, must also modify data resident in the L2 cache (the only exception to this rule is that, if the operation originates from the I/O subsystem 14, and if the data is resident only in L3 memory 10a/10b and not in L2 cache 26a, the data is modified only in L3 memory, not in L2 cache).

The interface between the Storage Subsystem 26 and L3 memories 10a/10b comprises two 16-byte ports in lieu of the single 8-byte port in FIG. 1. However, the memory 10 of FIG. 1 is identical to the memory cards 10a/10b of FIG. 2. The two memory cards 10a/10b of FIG. 2 are accessed in parallel.

The shared channel processor 28 is connected to the Storage Subsystem 26 via two ports, each port being an 8-byte interface. The shared channel processor 28 is operated at a frequency which is independent of the BSU 26, the clocks within the BSU being synchronized with the clocks in the shared channel processor 28 in a manner which is similar to the clock synchronization between the storage controller 12 and the integrated I/O subsystem 14 of FIG. 1.

A functional description of the operation of the uniprocessor computer system of FIG. 1 will be set forth in the following paragraphs with reference to FIG. 1.

Normally, instructions are resident in the instruction cache (L1 cache) 18, waiting to be executed. The instruction/execution unit 20 searches a directory disposed within the L1 cache 18 to determine if the typical instruction is stored therein. If the instruction is not stored in the L1 cache 18, the instruction/execution unit 20 will generate a storage request to the storage controller 12. The address of the instruction, or the cache line containing the instruction will be provided to the storage controller 12. The storage controller 12 will arbitrate for access to the bus connected to the L3 memory 10. Eventually, the request from the instruction/execution unit 20 will be passed to the L3 memory 10, the request comprising a command indicating a line in L3 memory is to be fetched for transfer to the instruction-/execution unit 20. The L3 memory will latch the request, decode it, select the location in the memory card wherein the instruction is stored, and, after a few cycles of delay, the instruction will be delivered to the storage controller 12 from the L3 memory in 8-byte increments. The instruction is then transmitted from the storage controller 12 to the instruction cache (L1 cache) 18, wherein it is temporarily stored. The instruction is retransmitted from the instruction cache 18 to the instruction buffer within the instruction/execution unit 20. The instruction is decoded via a decoder within the instruction unit 20. Quite often, an operand is needed in order to execute the instruction, the operand being resident in memory 10. The instruction/execution unit 20 searches the directory in the data cache 18; if the operand is not found in the directory of the data cache 18, another storage access is issued by the instruction/execution unit 20 to access the L3 memory 10, exactly in the manner described above with respect to the instruction cache miss. The operand is stored in the data cache, the instruction/execution unit 20 searching the data cache 18 for the operand. If the instruction requires the use of microcode, the instruction/execution unit 20 makes use of the microcode resident on the instruction execution unit 20 card. If an input/output (I/O) operation need be performed, the instruction/execution unit 20 decodes an I/O instruction, resident in the instruction cache 18. Information is stored in an auxiliary portion of L3 memory 10, which is sectioned off from instruction execution. At that point, the instruction/execution unit 20 informs the integrated I/O subsystem 14 that such information is stored in L3 memory, the subsystem 14 processors accessing the L3 memory 10 to fetch the information.

A functional description of the operation of the multiprocessor computer system of FIG. 2 will be set forth in the following paragraphs with reference to FIG. 2.

In FIG. 2, assume that a particular instruction/execution unit, one of 20a, 20b, or 20c, requires an instruction and searches its own L1 cache, one of 18a, 18b, or 18c for the desired instruction. Assume further that the desired instruction is not resident in the L1 cache. The particular instruction execution unit will then request access to the Storage Subsystem 26 in order to search the L2 cache 26b disposed therein. The Storage Subsystem 26 contains an arbiter which receives requests from each of the instruction/execution units 20a, 20b, 20c, from the shared channel processor 28 and from the integrated I/O subsystem 14. When the particular instruction/execution unit (one of 20a-20c) is granted access to the Storage Subsystem 26 to search the L2 cache 26b, the particular instruction/execution unit searches the directory of the L2 cache 26b disposed within the Storage Subsystem 26 for the desired instruction. Assume that the desired instruction is found in the L2 cache 26b. In that case, the desired instruction is returned to the particular instruction/execution unit. If the desired instruction is not located within the L2 cache, as indicated by its directory, a request is made to the L3 memory, one of 10a or 10b, for the desired instruction. If the desired instruction is located in the L3 memory, it is immediately transmitted to the Storage Subsystem 26, 16 bytes at a time, and is bypassed to the particular instruction/execution unit (one of 20a-20c) while simultaneously being stored in the L2 cache 26b in the Storage Subsystem 26. Additional functions resident within the Storage Subsystem 26 relate to rules for storage consistency in a multiprocessor system. For example, when a particular instruction/execution unit 20c (otherwise termed "processor" 20c) modifies data, that data must be made visible to all other instruction-/execution units, or "processors", 20a, 20b in the complex. If processor 20c modifies data presently stored in its L1 cache 18c, a search for that particular data is made in the L2 cache directory 26j of the Storage Subsystem 26. If found, the particular data in L2 cache is modified to reflect the modification in the L1 cache 18c. When this is done, the other processors 20a and 20b are permitted to see the modified, correct data now resident in the L2 cache 26a in order to permit such other processors to modify their corresponding data resident in their L1 caches 18a and 18b. The subject processor 20c cannot re-access the particular data in L1 cache until the other processors 20a and 20b have had a chance to modify their corresponding data accordingly. The term "cross-interrogation" refers to checking other processor's L1 caches for copies of data modified by the store request; cross-interrogation is used to eliminate such copies; other L1 caches are not updated with new data when store occurs.

Figure 3:
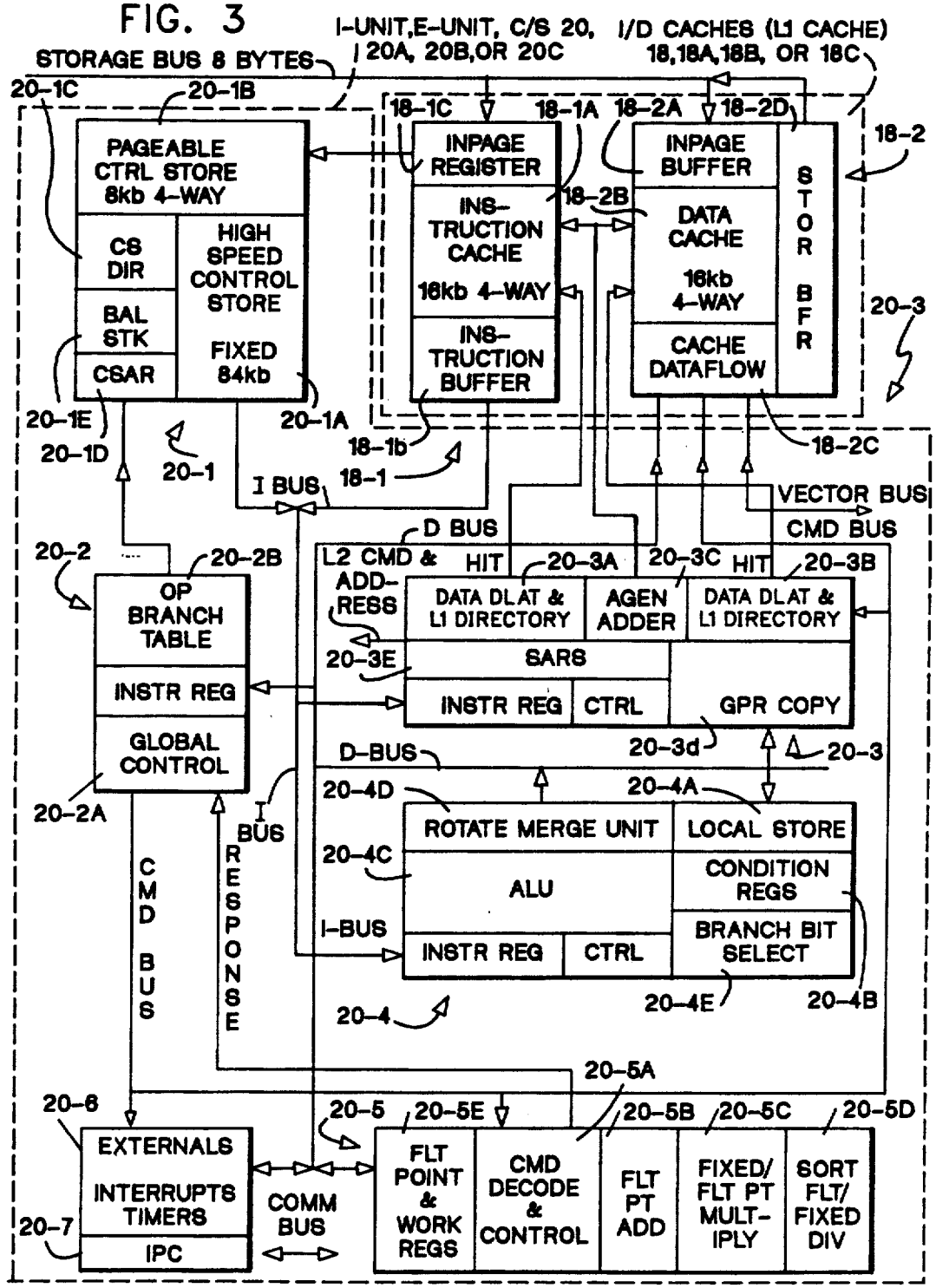
FIG. 3 illustrates a detailed construction of the I/D Caches (L1 cache), the I-unit, E-unit, and Control Store (C/S) illustrated in FIGS. 1 and 2.

Referring to FIG. 3, a detailed construction of each instruction/execution unit (20 in FIG. 1 or one of 20a–20c in FIG. 2) and its corresponding L1 cache (18 in FIG. 1 or one of 18a–18c in FIG. 2) is illustrated.

In FIG. 1, and in FIG. 2, the instruction/execution unit 20, 20a, 20b, and 20c is disposed in a block labelled "I-unit E-unit C/S (92KB)". This block may be termed the "processor", the "instruction processing unit", or, as indicated above, the "instruction/execution unit". For the sake of simplicity in the description provided below, the block 20, 20a–20c will be called the "processor". In addition, the "I/D caches (L1)" will be called the "L1 cache". FIG. 3 provides a detailed construction for the processor (20, 20a, 20b, or 20c) and for the L1 cache (18, 18a, 18b, or 18c).

In FIG. 3, a processor (one of 20, 20a–20c) comprises the following elements. A control store subsystem 20-1 comprises a high speed fixed control store 20-1a of 84 k bytes, a pagable area (8 k byte, 2 k word, 4-way associative pagable area) 20-1b, a directory 20-1c for the pagable control store 20-1b, a control store address register (CSAR) 20-1d, and an 8-element branch and link (BAL STK) facility 20-1e. Machine state controls 20-2 include the global controls 20-2a for the processor, an op branch table 20-2b connected to the CSAR via the control store origin address bus and used to generate the initial address for microcoded instructions. An address generation unit 20-3 comprises 3 chips, a first being an instruction cache DLAT and L1 directory 20-3a, a second being a data cache DLAT and L1 directory 20-3b, and a third being an address generation chip 20-3c connected to the L1 cache 18, 18a–18c via the address bus. The instruction DLAT and L1 directory 20-3a is connected to the instruction cache portion of the L1 cache via four "hit" lines which indicate that the requested instruction will be found in the instruction cache portion 18-1a of the L1 cache. Likewise, four "hit" lines connect the data DLAT and L1 directory 20-3b indicating that the requested data will be found in the data cache 18-2b portion of the L1 cache. The address generation unit 20-3 contains copies of the 16 general purpose registers used to generate addresses (see the GPR COPY 20-3d) and includes three storage address registers (SARS) 20-3e, used to provide addresses to the microcode for instruction execution. A fixed point instruction execution unit 20-4 is connected to the data cache 18-2 via the data bus (D-bus) and contains a local store stack (local store) 20-4a which contains the 16 general purpose registers mentioned above and a number of working registers used exclusively by the microcode; condition registers 20-4b which contain the results of a number of arithmetic and shift type operations and contain the results of a 370 condition code; a four-byte arithmetic logic unit (ALU) 20-4c; an 8-byte rotate merge unit 20-4d; a branch bit select hardware 20-4e which allow the selection of bits from various registers which determine the direction of a branch operation, the bits being selected from general purpose registers, working registers, and the condition registers. A floating point processor 20-5 includes floating point registers and four microcode working registers 20-5e, a command decode and control function 20-5a, a floating point adder 20-5b, a fixed point and floating point multiply array 20-5c, and a square-root and divide facility 20-5d. The floating point processor 20-5 is disclosed in a previously copending patent application assigned to the same assignee entitled "Dynamic Multiple Instruction Stream Multiple Data Multiple Pipeline Apparatus for Floating Point Single Instruction Stream Single Data Architectures", filed on Sept. 30, 1987 and issued Apr. 10, 1990 as U.S. Pat. No. 4,916,652, the disclosure of which is incorporated by reference into the specification of this application. The ALU 20-4c contains an adder, the adder being disclosed in a previously copending patent application assigned to the same assignee entitled "A High Performance Parallel Binary Byte Adder" filed June 26, 1987 and issued Apr. 3, 1990 as U.S. Pat. No. 4,914,617, the disclosure of which is incorporated by reference into the specification of this application. An externals chip 20-6 includes timers and interrupt structure, the interrupts being provided from the I/O subsystem 14, and others. An interprocessor communication facility (IPC) 20-7 is connected to the storage subsystem via a communication bus, thereby allowing the processors to pass messages to each other and providing access to the time of day clock.

In FIG. 3, the L1 cache (one of 18, 18a, 18b, or 18c) comprises the following elements. An instruction cache 18-1 comprises a 16 k byte/4-way cache 18-1a, a 16-byte instruction buffer 18-1b at the output thereof, and an 8-byte inpage register 18-1c at the input from storage. The storage bus, connected to the instruction cache 18-1 is eight bytes wide, being connected to the inpage register 18-1c. The inpage register 18-1c is connected to the control store subsystem 20-1 and provides data to the subsystem in the event of a pagable control store miss and new data must be brought into the control store. A data cache 18-2 comprises an inpage buffer 18-2a also connected to the storage bus; a data cache 18-2b which is a 16 k byte/4-way cache; a cache dataflow 18-2c which comprises a series of input and output registers and connected to the processor via an 8-byte data bus (D-bus) and to the vector processor (22a–22c) via an 8-byte "vector bus"; an 8-element store buffer (STOR BFR) 18-2d.

A description of the functional operation of a processor and L1 cache shown in FIG. 3 will be provided in the following paragraphs with reference to FIG. 3 of the drawings.

Assume that an instruction to be executed is located in the instruction cache 18-1a. The instruction is fetched from the instruction cache 18-1a and is stored in the instruction buffer 18-1b (every attempt is made to keep the instruction buffer full at all times). The instruction is fetched from the instruction buffer 18-1b and is stored in the instruction registers of the address generation chip 20-3, the fixed point execution unit 20-4, and the machine state controls 20-2, at which point, the instruction decoding begins. Operands are fetched from the GPR COPY 20-3d in the address generation unit 20-3 if an operand is required (normally, GPR COPY is accessed if operands are required for the base and index registers for an RX instruction). In the next cycle, the address generation process begins. The base and index register contents are added to a displacement field from the instruction, and the effective address is generated and sent to the data cache 18-2 and/or the instruction cache 18-1. In this example, an operand is sought. Therefore, the effective address will be sent to the data cache 18-2. The address is also sent to the data DLAT and L1 directory chip 20-3b (since, in this example, an operand is sought). Access to the cache and the directories will begin in the third cycle. The DLAT 20-3b will determine if the address is translatable from an effective address to an absolute address. Assuming that this translation has been previously performed, we will have recorded the translation. The translated address is compared with the output of the cache directory 20-3b. Assuming that the data has previously been fetched into the cache 18-2b, the directory output and the DLAT output are compared; if they compare equal, one of the four "hit" lines are generated from the data DLAT and directory 20-3b. The hit lines are connected to the data cache 18-2b; a generated "hit" line will indicate which of the four associativity classes contains the data that we wish to retrieve. On the next cycle, the data cache 18-2b output is gated through a fetch alignment shifter, in the cache dataflow 18-2c, is shifted appropriately, is transmitted along the D-BUS to the fixed point execution unit 20-4, and is latched into the ALU 20-4c. This will be the access of operand 2 of an RX type of instruction. In parallel with this shifting process, operand 1 is accessed from the general purpose registers in local store 20-4a. As a result, two operands are latched in the input of the ALU 20-4c, if necessary. In the fifth cycle, the ALU 20-4c will process (add, subtract, divide, etc) the two operands accordingly, as dictated by the instruction opcode. The output of the ALU 20-4c is latched and the condition registers 20-4b are latched, at the end of the fifth cycle, to indicate an overflow or zero condition. In the sixth cycle, the output of the ALU 20-4c is written back into the local store 20-4a and into the GPR copy 20-3d of the address generation unit 20-3 in order to keep the GPR copy 20-3d in sync with the content of the local store 20-4a. When the decode cycle of this instruction is complete, the decode cycle of the next instruction may begin, so that there will be up to six instructions in either decoding or execution at any one time. Certain instruction require the use of microcode to complete execution. Therefore, during the decode cycle, the op-branch table 20-2b is searched, using the opcode from the instruction as an address, the op-branch table providing the beginning address of the microcode routine needed to execute the instruction. These instructions, as well as others, require more than 1 cycle to execute. Therefore, instruction decoding is suspended while the op-branch table is being searched. In the case of microcode, the I-BUS is utilized to provide microinstructions to the decoding hardware. The instruction cache 18-1a is shut-off, the control store 20-1a is turned-on, and the microinstructions are passed over the I-BUS. For floating point instructions, decoding proceeds as previously described, except that, during the address generation cycle, a command is sent to the floating point unit 20-5 to indicate and identify the proper operation to perform. In an RX floating point instruction, for example, an operand is fetched from the data cache 18-2b, as described above, and the operand is transmitted to the floating point processor 20-5 in lieu of the fixed point processor 20-4. Execution of the floating point instruction is commenced. When complete, the results of the execution are returned to the fixed point execution unit 20-4, the "results" being condition code, and any interrupt conditions, such as overflow.

The following description represents an alternate functional description of the system set forth in FIG. 3 of the drawings.

In FIG. 3, the first stage of the pipeline is termed instruction decode. The instruction is decoded. In the case of an RX instruction, where one operand is in memory, the base and index register contents must be obtained from the GPR COPY 20-3d. A displacement field is added to the base and index registers. At the beginning of the next cycle, the addition of the base, index, and displacement fields is completed, to yield an effective address. The effective address is sent to the DLAT and Directory chips 20-3a/20-3b. The high order portion of the effective address must be translated, but the low order portion is not translated and is sent to the cache 18-1a/18-2b. In the third cycle, the cache begins an access operation, using the bits it has obtained. The DLAT directories are searched, using a virtual address to obtain an absolute address. This absolute address is compared with the absolute address kept in the cache directory. If this compare is successful, the "hit" line is generated and sent to the cache chip 18-1a/18-2b. Meanwhile, the cache chip has accessed all four associativity classes and latches an output accordingly. In the fourth cycle, one of the four "slots" or associativity classes are chosen, the data is aligned, and is sent across the data bus to the fixed or floating point processor 20-4, 20-5. Therefore, at the end of the fourth cycle, one operand is latched in the ALU 20-4c input. Meanwhile, in the processor, other instructions are being executed. The GPR COPY 20-3d and the local store 20-4a are accessed to obtain the other operand. At this point, both operands are latched at the input of the ALU 20-4c. One cycle is taken to do the computation, set the condition registers, and finally write the result in the general purpose registers in the GPR COPY 20-3d. The result may be needed, for example, for address computation purposes. Thus, the result would be input to the AGEN ADDER 20-3c. During the execution of certain instruction, no access to the caches 18-1a/18-2b is needed. Therefore, when instruction decode is complete, the results are passed directly to the execution unit without further delay (in terms of access to the caches). Therefore, as soon as an instruction is decoded and passed to the address generation chip 20-3, another instruction is decoded.

Figure 4:
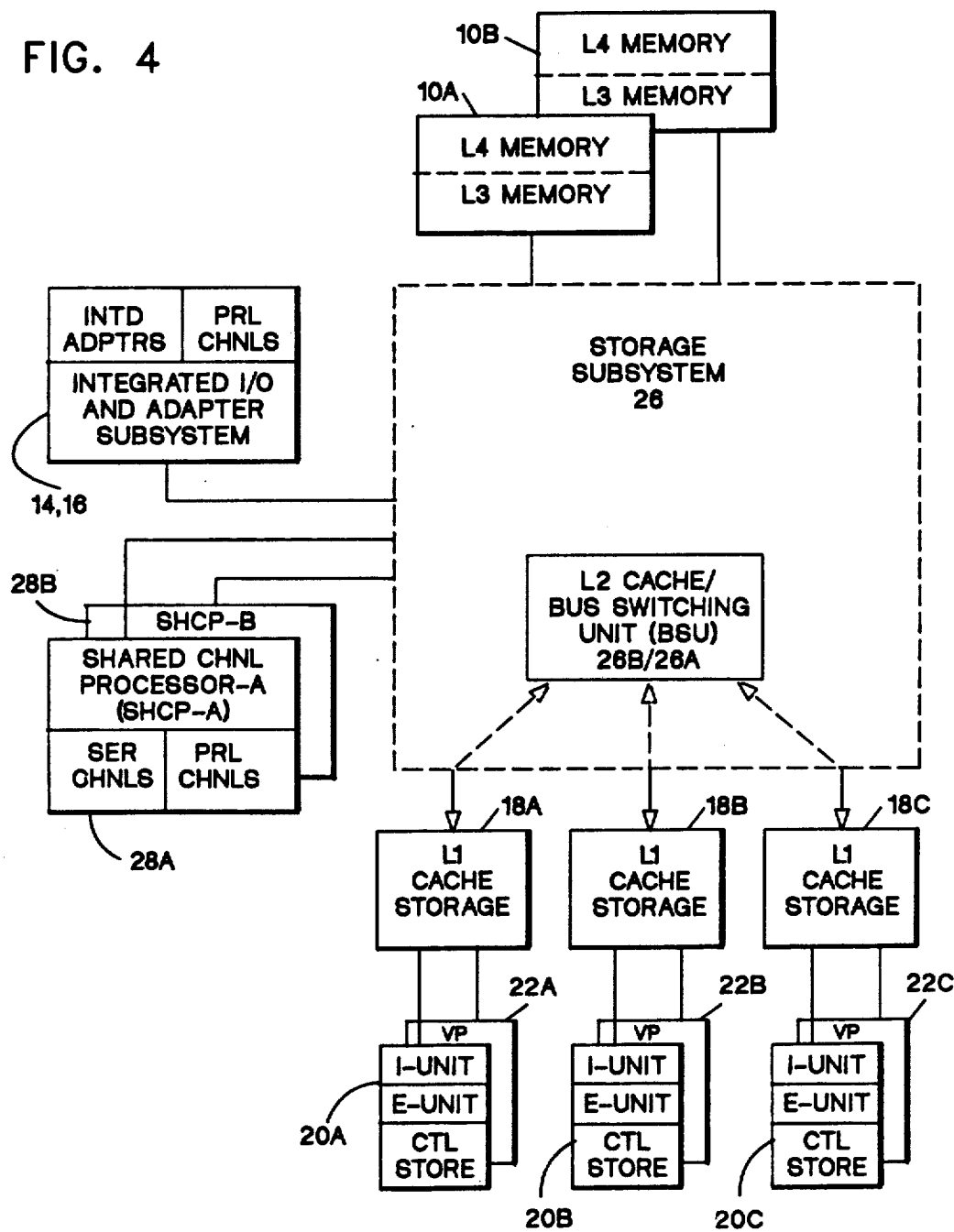
FIG. 4 represents another diagram of the triadic computer system of FIG. 2.

Referring to FIG. 4, another diagram of the data processing system of FIG. 2 is illustrated.

In FIG. 4, the data processing system is a multiprocessor system and includes a storage subsystem 26; a first L1 cache storage 18a, a second L1 cache storage 18b; a third L1 cache storage 18c; a first processing unit 20a, including an instruction unit, an execution unit, and a control store, connected to the first L1 cache storage 18a; a first vector processing unit 22a connected to the first L1 cache storage 18a; a second processing unit 20b, including a instruction unit, an execution unit, a control store, connected to the second L1 cache storage 18b; a second vector processing unit 22b connected to the second L1 cache storage 18b; a third processing unit 20c, including an instruction unit, an execution unit, a control store, connected to the third L1 cache storage 18c; and a third vector processing unit 22c connected to the third L1 cache storage 18c. A shared channel processor A 28a and a shared channel processor B 28b are jointly connected to the storage subsystem 26, and an integrated adapter subsystem 14,16 is also connected to the storage subsystem 26.

Figure 5:
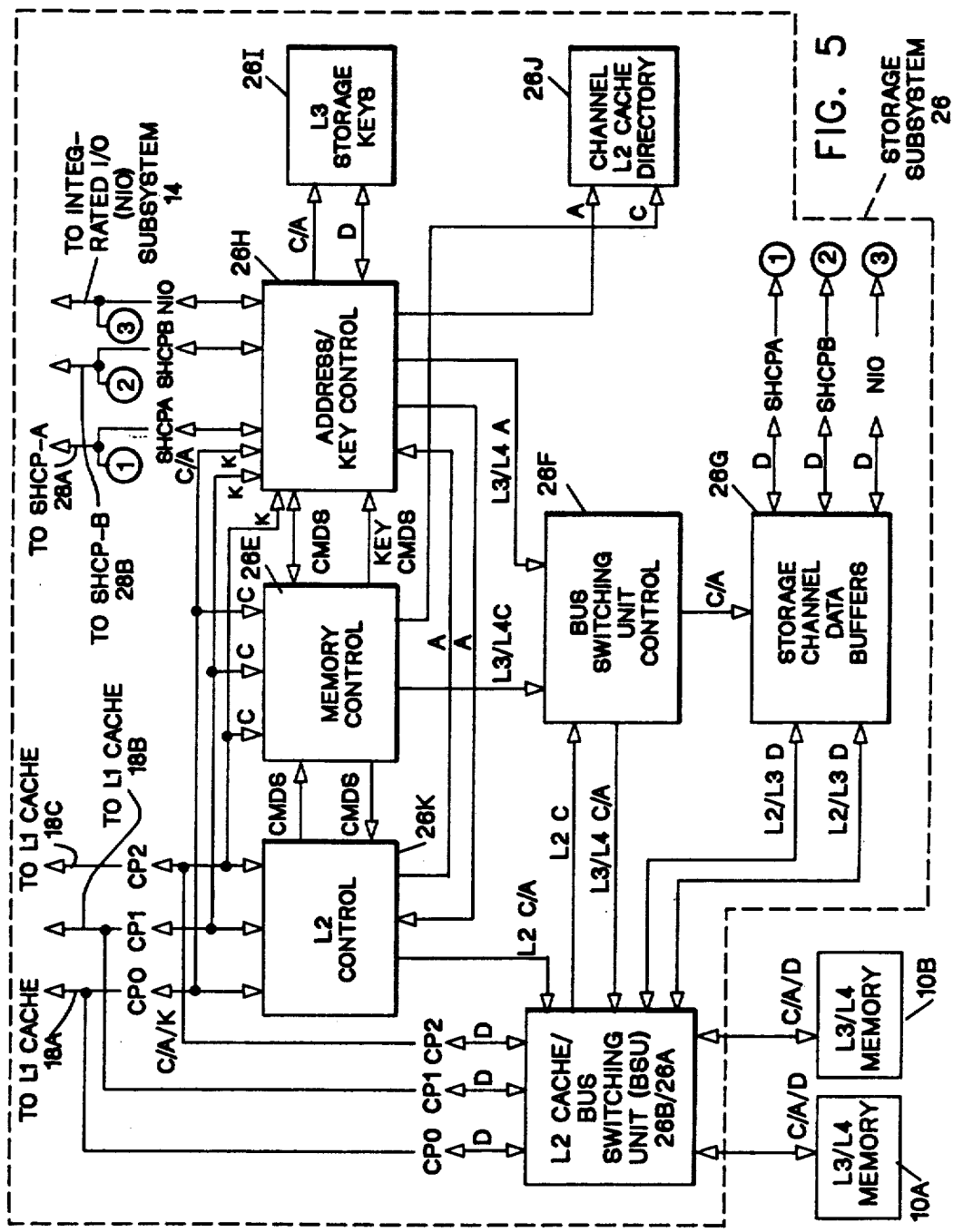
FIG. 5 illustrates a detailed construction of the storage subsystem of FIG. 4.

Referring to FIG. 5, the storage subsystem 26 of FIGS. 2 and 4 is illustrated.

In FIG. 5, the storage subsystem 26 includes an L2 control 26k, an L2 cache/bus switching unit 26b/26a, an L3/L4 memory 10a and an L3/L4 memory 10b connected to the L2 cache/bus switching unit 26b/26a, a memory control 26e connected to the L2 control 26k, a bus switching unit control 25f connected to the L2 cache/bus switching unit 26b/26a and to the memory control 26e, storage channel data buffers 26g connected to the bus switching unit control 26f and to the L2 cache/bus switching unit 26b/26a, an address/key control 26h connected to the memory control 26e and to the L2 control 26k, L3 storage keys 26i connected to the address/key control 26h, and a channel L2 cache directory 26j connected to the memory control 26e and to the address key control 26h. The L2 control 26k includes an arbitration unit in the BSU portion of the storage subsystem 26, termed the "L2 cache priority". As noted later, the L2 cache priority decides if a request to store information in L2 cache 26b should be granted.

The storage subsystem maintains storage consistency among up to three central processing units through use of a shared, serially reusable L2 cache storage with separate store queues for each processor, and to support channel devices, up to three channel interfaces are supported, with two parallel paths into L3/L4 storage. The function of the storage subsystem is broken into several major units. Two of these units are considered master controllers in that they grant access to the critical resources, namely, the L2 cache and L3/L4 memory ports. The remaining units are considered subordinate to L2 control and memory control.

L2 Control 26K

L2 control provides the primary interface for the central processors to access the lower levels of the storage hierarchy, L2 cache, L3, and L4 memory. L2 control maintains a unique command/address interface with each processor in the configuration. Across this interface, each processor sends fetch requests from the L1 cache when an L1 cache miss occurs for a processor fetch request. All processor store requests are transferred to the L2 control across this interface as well. L2 control maintains request queues for each of the processors at the L2 cache level. An L2 cache priority circuit selects one request from among the pending requests for service on any given cycle. The L2 cache directory exists in L2 control and is used to determine if the selected request can complete by accessing data in L2 cache. If so, the request completes and is discarded. If the request cannot complete due to an L2 cache directory miss, the request remains pending in L2 control and a request is sent to memory control to cause an inpage for the desired data from L3 storage. L2 control is responsible for maintaining storage consistency throughout the configuration, keeping track of the L1 cache contents in L2 status arrays. When necessary, requests for L1 cache copy invalidation are sent to the necessary processors across their respective command-/address interfaces.

Memory Control 26E

Memory control is the unit responsible for allocating access to the L3/L4 storage ports. Two independent ports exist, each containing half of the storage contents. Memory control queues all channel requests, up to a maximum of seven, as well as processor L2 cache miss requests, up to one per processor. From this queue of requests, memory control selects a request per memory port on which to operate. For the processor requests, this is the major function performed. For channels, however, memory control also controls access to the storage key arrays and the channel L2 cache directory. When memory control is given a channel request from address/key, it must first determine if the desired data exist in L2 cache by searching an L2 cache directory copy labeled the channel L2 cache directory. Additionally, memory control determines if the access is allowed by comparing the storage key associated with the request against the storage key in the storage key arrays. If no protection exceptions are found, memory control allows the request to contend for L3 access. When selected by L3 priority, the request is directed to L2 control if a channel L2 cache directory search has resulted in a hit, or to the L3 port if the search resulted in an L2 cache directory miss.

Address/Key Control 26H

Address/key control has two primary functions. First, it is the command/address interface for the external channel devices, supporting three separate channel interfaces. It accepts storage requests from the channel devices, converting them to the storage subsystem clock rate, and queues them in internal buffers. It also forwards the requests to memory control. Address/key returns the status of all channel operations to the channel subsystem as well. The other function is to support the storage key arrays and reference/change (R/C) bits arrays. The key arrays support the storage keys required by the S/370 architecture. Memory control is the primary controller for granting access to these arrays. Address/key controls granting access to the R/C arrays which are used by processor L2 cache accesses to update the reference and change bits of the storage key arrays. Multiple copies of the R/C bits exist and must be merged on request by address/key.

Bus Switching Unit (BSU) Control 26F

BSU control represents the primary controller for the L2 cache/BSU data flow and storage channel data buffers (SCDB) data flow. It is the focal point for the L2 control and memory control requests to move data throughout the storage subsystem. BSU control manages the data buses capable of moving information to/-from the L2 cache, L3/L4 ports, and SCDBs.

L2 Cache/Bus Switching Unit 26B/26A Data Flow

The L2 cache data arrays reside here. Each central processor has an eight-byte bidirectional data interface into the L2 cache data flow unit. This supports data movement from processor to L2 cache or L3/L4 storage as well as from L2 cache or L3/L4 storage to the processor. Two 16-byte interfaces, one to each L3/L4 port, are also supported in this unit. Last, two 32-byte interfaces to the storage channel data buffers are maintained here. These interfaces support data movement between the SCDBs and the L2 cache or L3/L4 storage.

Storage Channel Data Buffers 26G

To support the three channel storage interfaces, the storage channel data buffer maintains a set of buffers for each independent channel data interface. This supports movement of data from the channel devices to L2 cache or L3/L4 storage, and back again. The channel data buffer controls are split, some coming from the channel interface itself, some from the storage subsystem (BSU control). The storage channel data buffer unit also supports the memory buffer for allowing L3/L4 memory-to-memory transfers requested by the central processors.

In FIG. 5, the L2 cache/bus switching unit 26b/26a generates three output signals: cp0, cp1, and cp2. The L2 control 26k also generates three output signals: cp0, cp1, and cp2. The cp0 output signal of the L2 cache/bus switching unit 26b/26a and the cp0 output signal of the L2 control 26k jointly comprise the output signal from storage subsystem 26 of FIG. 1 energizing the first L1 cache storage 18a. Similarly, the cp1 output signals from L2 cache/bus switching unit 26b/26a and L2 control 26k jointly comprise the output signal from storage subsystem 26 of FIG. 1 energizing the second L1 cache storage 18b and the cp2 output signals from the L2 cache/Bus Switching Unit 26b/26a and L2 control 26k jointly comprise the output signal from storage subsystem 26 of FIG. 1 energizing the third L1 cache storage 18c.

In FIG. 5, the storage channel data buffers 26g generate three output signals: shcpa, shcpb, and nio, where shcpa refers to shared channel processor A 28a, shcpb refers to shared channel processor B 28b, and nio refers to the integrated I/O and adapter subsystem 14/16. Similarly, the address/key control 26h generates the three output signals shcpa, shcpb, and nio. The shcpa output signal from the storage channel data buffers 26g in conjunction with the shcpa output signal from the address/key control 26h jointly comprise the output signal generated from the storage subsystem 26 of FIG. 1 to the shared channel processor A 28a. The shcpb output signal from the storage channel data buffers 26g in conjunction with the shcpb output signal from the address/key control 26h jointly comprise the output signal generated from the storage subsystem 26 of FIG. 1 to the shared channel processor B 28b. The nio output signal from the storage channel data buffers 26g in conjunction with the nio output signal from the address/key control 26h jointly comprise the output signal generated from the storage subsystem 26 of FIG. 1 to the integrated adapter subsystem 14/16.

Figures 6, 6A:
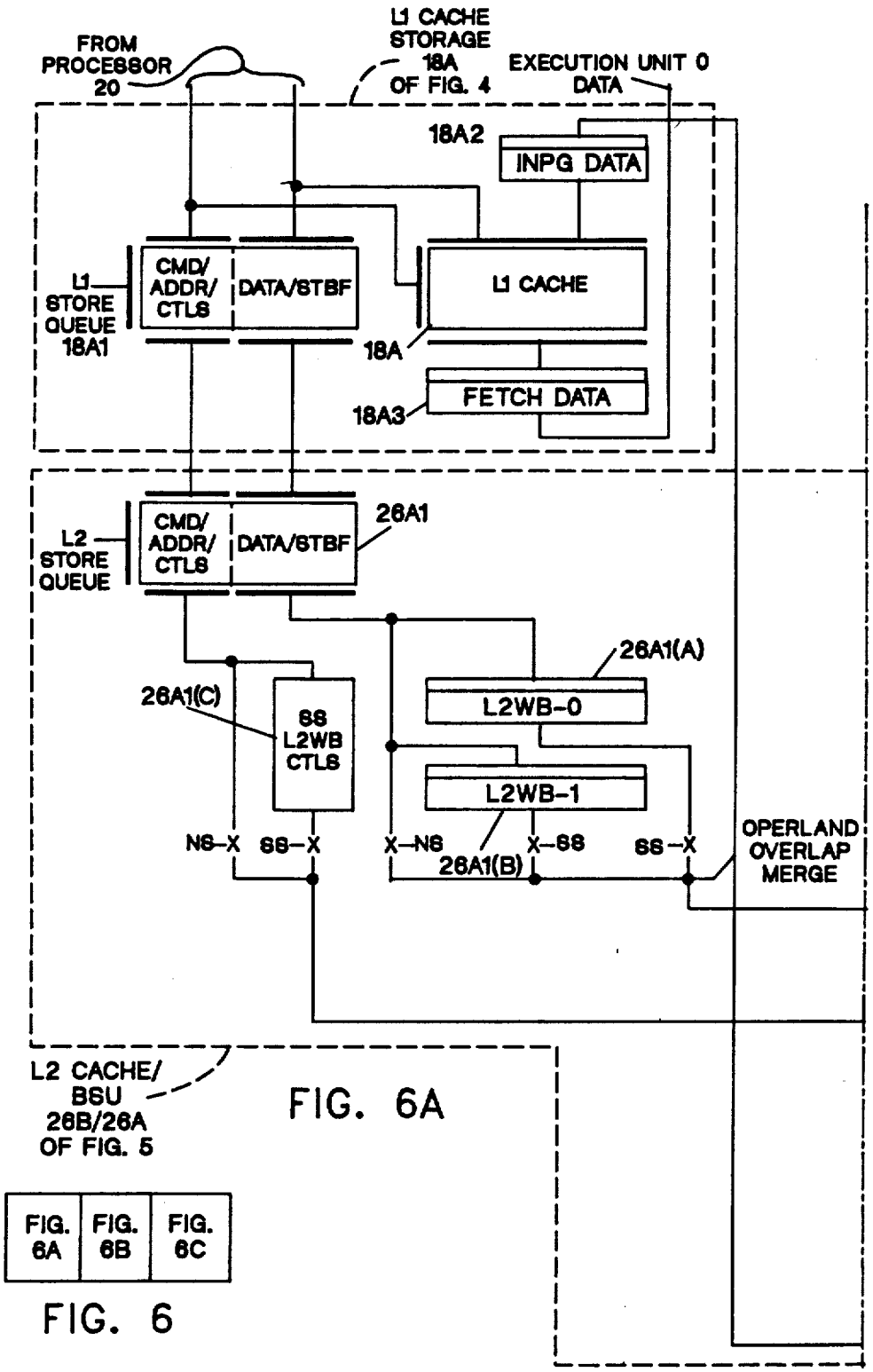
FIG. 6, which comprises
FIGS. 6a through 6c, illustrates a detailed construction of a portion of the L2 cache/Bus Switching Unit of FIG. 5 in accordance with the present invention.
Figure 6B:
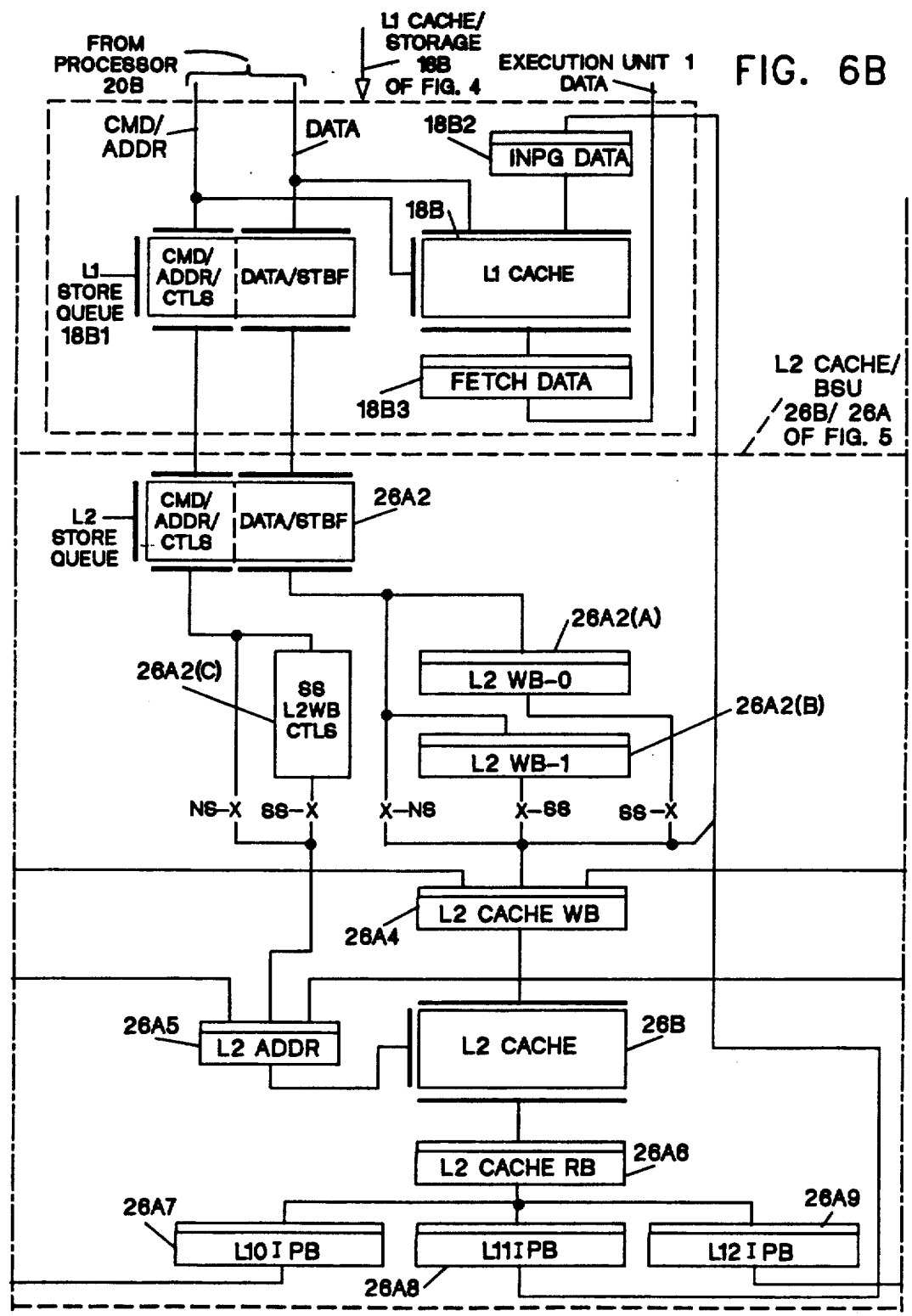
Figure 6C:
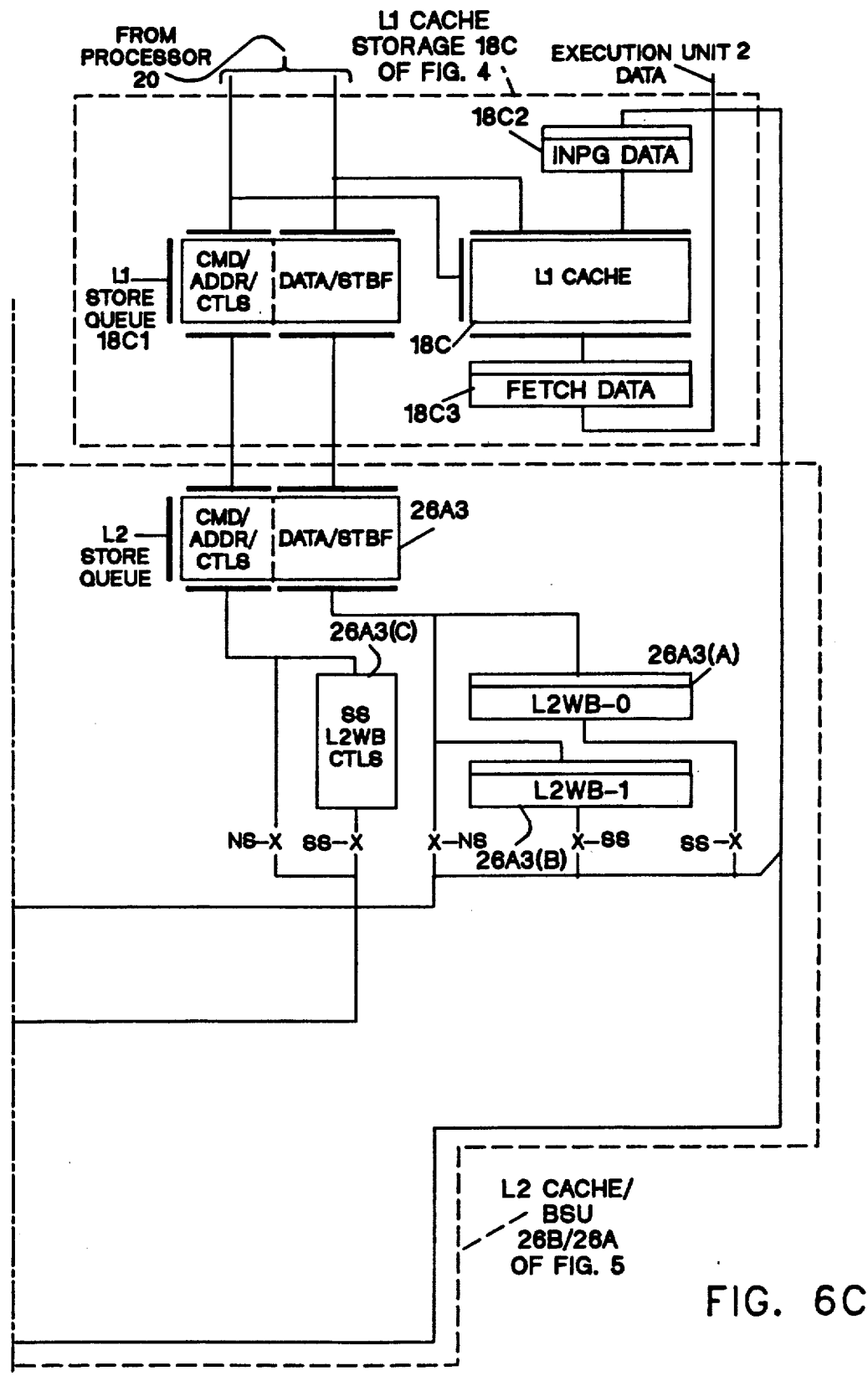

Referring to FIG. 6, a detailed construction of a portion of the L2 cache/BSU 26b/26a of FIG. 5 is illustrated, this portion of the L2 cache/BSU 26b/26a including an L2 store queue arrangement in association with the L2 cache. Further, in FIG. 6, a detailed construction of the L1 cache storage 18a, 18b, 18c of FIG. 4 is illustrated, the L1 cache storage including an L1 store queue arrangement in association with the L1 cache.

In FIG. 6, the L1 cache storage 18a of FIG. 4 comprises the L1 cache 18a connected to an L1 store queue 18a1. The L1 cache is connected, at its input, to an inpage data register (INPG DATA) 18a2, and is connected, at its output, to a fetch data (FETCH DATA) register 18a3. The L1 cache storage 18b of FIG. 4 comprises the L1 cache 18b connected to an L1 store queue 18b1. The L1 cache is connected, at its input, to an inpage data register (INPG DATA) 18b2, and is connected, at its output, to a fetch data (FETCH DATA) register 18b3. The L1 cache storage 18c of FIG. 4 comprises the L1 cache 18c connected to an L1 store queue 18c1. The L1 cache is connected, at its input, to an inpage data register (INPG DATA) 18c2, and is connected, at its output, to a fetch data (FETCH DATA) register 18c3. The L1 store queue 18a 1 is connected to an L2 store queue 26a1. Similarly, the L1 store queue 18b1 is connected to an L2 store queue 26a2; and the L1 store queue 18c1 is connected to an L2 store queue 26a3. Therefore, each L1 store queue is uniquely associated with a specific processor of the multiprocessor configuration. Each L1 store queue is also uniquely associated with an L2 store queue. Therefore, each L2 store queue is uniquely associated with a specific processor of the multiprocessor configuration. Each L2 store queue has certain write buffers connected to the output thereof. For example, L2 store queue 26a1 is connected, at its output, to a L2 write buffer 0 (L2WB-0) 26a1(a) and to a L2 write buffer 1 (L2WB-1) 26a1(b). The L2 store queue 26a1 is also connected, at its output, to a storage subsystem L2 write buffer controls (SS L2WB CTLS) 26a1(c). L2 store queue 26a2 is connected, at its output, to a L2 write buffer 0 (L2WB-0) 26a2(a) and to a L2 write buffer 1 (L2WB-1) 26a2(b). The L2 store queue 26a2 is also connected, at its output, to a storage subsystem L2 write buffer controls (SS L2WB CTLS) 26a2(c). L2 store queue 26a3 is connected, at its output, to a L2 write buffer 0 (L2WB-0) 26a3(a) and to a L2 write buffer 1 (L2WB-1) 26a3(b). The L2 store queue 26a3 is also connected, at its output, to a storage subsystem L2 write buffer controls (SS L2WB CTLS) 26a3(c). The aforementioned write buffers and L2 store queues are all connected, at their outputs, to an L2 cache write buffer L2 CACHE WB) 26a4, the L2 cache write buffer 26a4 being connected, at its output, to the L2 cache 26b. The aforementioned L2 write buffer controls (L2WB CTLS) are each connected, at their outputs, to an L2 address register (L2 ADDR) 26a5 which addresses the L2 cache. The L2 cache 26b is connected, at its output, to an L2 cache read buffer (L2 CACHE RB) 26a6, which is further connected, at its output, to a L1 0 inpage buffer (L10IPB) 26a7, to a L1 1 inpage buffer (L11IPB) 26a8, and to a L1 2 inpage buffer (L12IPB) 26a9. Inpage buffer 26a7 is connected to the aforementioned inpage data register 18a2; inpage buffer 26a8 is connected to the aforementioned inpage data register 18b2, and inpage buffer 26a9 is connected to the aforementioned inpage data register 18c2.

By way of background, the L1 store queues 18a1, 18b1, 18c1 and the L2 store queues 26a1, 26a2, 26a3 shown in FIG. 6 are designed to support the S/370 and 370-XA instruction set, maximizing performance for a given processor while minimizing interference between processors at the highest level common storage, the L2 cache 26a buffer storage. The store queue organization is structured as a two-level queue, assuming the attributes of the two-level cache storage. Each processor possesses its own store queue. At the L1 cache level, the L1 store queue controls will administer the enqueue of requests and maintains some storage consistency. At the L2 cache level, the L2 control 26k of FIG. 5 will administer the dequeue of requests and maintains global storage consistency between cache levels and processors. The store requests are divided into categories which allow the most efficient processing of storage at the shared L2 cache level. This store queue design maintains retriability of the instruction set while allowing instruction execution to proceed even when stores for the instructions have not completed to the highest level of common storage, the L2 cache buffer storage. This allows for improved machine performance by permitting the stores of one instruction to overlap with the pipeline execution stages of succeeding instructions, limited only by architectural consistency rules. The store queue design avoids the necessity to pretest instructions which may suffer from page faults in a virtual storage environment by delaying storing results to the highest level of common storage until the true end of the instruction. Also, an efficient mechanism for the machine to recover from such situations using only processor microcode is supported.

The 370-XA instruction set is divided into several types which process operands residing in real storage. These instructions can be split into two categories based on the length of the results stored to real storage: non-sequential stores (NS) and sequential stores (SS). The NS type consists primarily of the instructions whose operand lengths are implied by the instruction operation code. Their result length is from one to eight bytes and they typically require a single store access to real storage. A special case is one where the starting address of the resultant storage field plus the length of the operand yields a result which crosses a doubleword boundary, requiring two store accesses to store the appropriate bytes into each doubleword. The SS type consists of the instructions whose operand lengths are explicitly noted within the text of the instruction or in general registers used by the instruction. Also, such instructions as store multiple may be classified this way. Their result length ranges from one to 256 bytes, requiring multiple store accesses. Results can be stored a single byte at a time, or in groups of bytes, up to eight per request. Special consideration is given to other types of instructions, requiring additional processing modes. Certain instructions require the ability to store multiple results to non-contiguous locations in real storage. A mode of operation allowing multiple NS types per instruction is supported for this type of instruction. Instructions that use explicit lengths for their operands may actually store only one to eight bytes. These store requests are converted in the storage subsystem to NS types for performance reasons which will be made clear later. In some situations, the ability to support a mixed mode of store queue operations is required. SS types, followed by NS types within the same instruction support these instruction requirements. The other requirement to support the store request handling in the storage subsystem is that an end-of-operation (EOP) indicator be associated with each store request: '0'b implies no EOP, '1'b implies this is the last store in the instruction. The EOP indicator marks the successful completion of the 370-XA instruction and its associated store requests. Multiple requests to store data, during the execution of a single instruction, into the common level of storage, the L2 cache buffer storage, are not allowed unless an end of operation (EOP) indication has been received, indicating the end of the execution of that particular instruction. If the EOP indication has not been received, the data may be stored in the L1 store queue, the L2 store queue, and the L2 write buffers; however, the data may not be stored in the L2 cache unless the EOP indication has been received, signalling the end of execution of the particular instruction. When EOP indication is received, the store from the L2 write buffers to the L2 cache may begin. This supports the philosophy that an instruction must successfully complete before it is allowed to modify storage. This does not preclude the modification of the requesting processor's L1 cache, however. A special mode of operation is supported for this store request status indicator as well. In the level of interrupt processing where 370-XA instructions are not actually being executed, all store requests are forced to contain the EOP indication to allow efficient processing of microcode interrupt routines.

A functional description of the L1 and L2 store queue design of the present invention will be set forth in the following paragraph with particular reference to FIG. 6 of the drawings, with ancillary reference to the block of FIG. 5 labelled "L2 cache/Bus Switching Unit (BSU) 26b/26a" which is shown connected on one end to L1 caches 18a, 18b, 18c, and, on the other end, to L3/L4 (main) memory 10a/10b, and with general reference to FIGS. 1–3 of the drawings.

A processor, one of 20a, 20b, or 20c of FIG. 2, issues a processor store request to the L1 cache function, one of 18a, 18b, or 18c of FIG. 2. The command type (NS or SS, EOP), starting field address, one to eight bytes of data, and a field length are presented simultaneously to the L1 cache function. The starting field address consists of program address bits 1:31, identifying the first byte of the field in storage. The field length indicates the number of bytes to be modified starting at that address, one to eight. If the storage field modified by the request should cross a doubleword boundary, it is interpreted as two requests by L1 cache, each requiring a cache access and store queue enqueue. Sequential stores are comprised of a number of such store requests with the sequencing under control of the execution unit. Referring to FIG. 2, the L1 cache function 18 receives the information. The storage address, presented by the processor 20, is translated to an absolute address, via the data DLAT and L1 directory 20-3a, 20-3b of FIG. 2, and the low-order bits of the absolute address and the field length from the absolute address are used to generate store byte flags (STBF). The store byte flags identify the bytes to be stored within the doubleword, the bytes being identified by absolute address bits 1:28. The L1 cache directory, 20-3a, 20-3b of FIG. 2, is searched to determine if the data exists in the L1 cache. Next, the L1 cache function 18 makes an entry on the L1 store queue. If processor 20a is making the store request, L1 cache 18a makes an entry on the L1 store queue 18a1 of FIG. 6, enqueuing the absolute address, command type, data, and store byte flags in L1 store queue 18a1. In parallel with this action, if the requested data exists in the L1 cache 18a (an L1 cache 18a hit), this data in L1 cache 18a is updated according to the absolute address and store byte flags. If all prior stores have been transferred to the L2 cache 26b function, and the interface to L2 cache 26b is available, the store request, enqueued in L1 store queue 18a1, is transferred to the L2 cache function, i.e., to the L2 store queue 26a1, 26a2, or 26a3 and to their respective write buffers. The L2 cache function receives the following information: the doubleword absolute address, the command type, the data, and the store byte flags. This information is enqueued onto the L2 store queue, in this example, this information is stored in the L2 store queue 26a1. The next step is to store this information, from the L2 store queue 26a1, into the L2 cache 26b. As shown in FIG. 6, for data and/or instructions which are part of a sequential store (SS) operation, these instructions are stored into L2 cache 26b via the L2 write buffers, that is, via the L2 WB-0 26a1(a), L2 cache WB 26a4 or via L2 WB-1 26a1(b), L2 cache WB 26a4. Note that non-sequential store (NS) operations do not utilize L2WB-0 or L2WB-1 when storing information from the L2 store queue into L2 cache 26b; rather, they are stored directly into the L2 cache WB 26a4 from the L2 store queue 26a1, 26a2, 26a3. If all preceding stores for this processor have been serviced and other conditions are satisfied, the request enters L2 cache priority in L2 control 26k (i.e., L2 cache priority is an arbitration unit in the BSU portion of the storage subsystem 26 which decides if the request to store this information in L2 cache 26b should be granted at this time). When the request is granted, the absolute address, obtained from the data DLAT and L1 directory 20-3a, 20-3b of FIG. 2, is used to search the L2 cache directory 26J of FIG. 5. If the corresponding data is found in L2 cache 26a, the data is stored to L2 cache 26a of FIG. 6 under the control of the store byte flags. L1 status arrays, reflecting the contents of each processors' L1 caches 18a, 18b, 18c, are interrogated and the appropriate L1 cross-invalidation requests are sent to the L1 caches 18a–18c, in order to invalidate the corresponding obsolete data stored in one or more the L1 caches 18a–18c, in order to maintain storage consistency. Once the data is stored in L2 cache 26, the corresponding data entry, stored in the L1 store queue 18a1, the L2 store queue 26a1, and L2 write buffers is then dequeued (erased or removed) from both the L1 and L2 store queues 18a1 and 26a1 and L2 write buffers.

Figure 7:
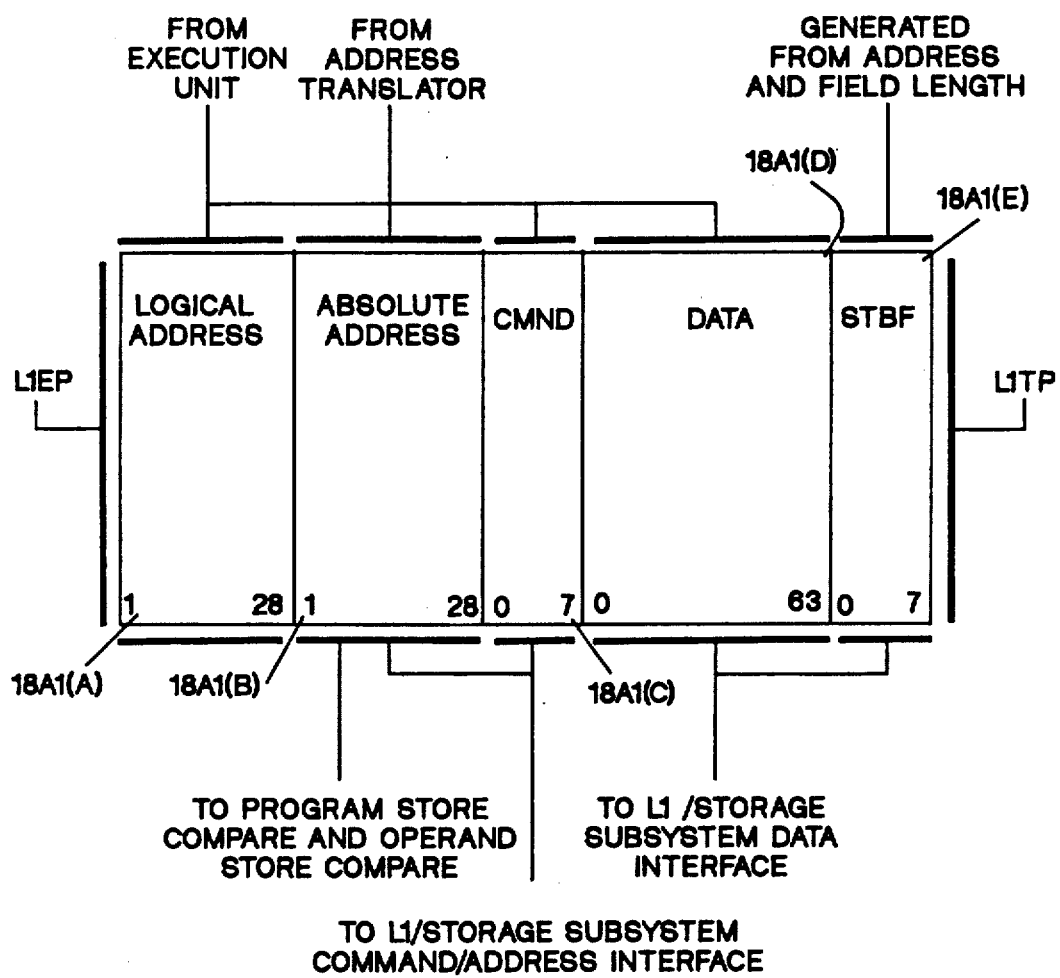
FIG. 7 illustrates a construction of the L1 store queue of FIG. 6.

Referring to FIG. 7, a construction of the contents of the L1 store queue 18a1, 18b1, and 18c1, of FIG. 6, is illustrated.

In FIG. 7, the L1 store queue 18a1, 18b1, and 18c1, each comprise a logical address portion 18a1(a), an absolute address portion 18a1(b), a command field 18a1(c), a data field 18a1(d), and a store byte flag (STBF) field 18a1(e).

In FIG. 6, each processor or execution unit 20a-20c in the configuration of FIG. 2 maintains its own L1 store queue totally independent of the other processors. Each L1 store queue 18a1–18c1 of FIGS. 6 and 7 can be considered a one dimensional array. It is a first-in, first-out, cyclic queue in regards to requests for transfer to the L2 store queue. The contents of the L1 store queue 18a1–18c1 comprise five primary fields. The first, the logical address 18a1(a), is not necessarily required. It can be maintained to allow detection of stores into the instruction stream within the same processor, labeled program store compare. The absolute address can be used for this purpose, however. The second field contains the absolute address 18a1(b). This address represents the address of the doubleword of the data in the store queue entry. It is the address resulting from dynamic address translation performed prior to enqueuing the store request. This address is used to update the L1 and L2 cache buffers. It is also used as the address for succeeding instructions' attempts to fetch results enqueued on the L1 store queue, but not yet stored into L2 cache, labeled operand store compare. The command field 18a1(c) contains the sequential store bit: '0'b if a non-sequential store request, '1'b if sequential store request. The other bit is the EOP bit. It delimits instruction boundaries within the store queue. The next field, the data field 18a1(d), contains up to eight bytes of data, aligned according to the logical address bits 29:31. As an example, if four bytes are to be stored starting at byte position 1, then bytes 1:4 contain the resultant four bytes to store to memory in this field. The final field, the Store Byte Flag (STBF) field 18a1(e), indicates which bytes are to be written to storage within the enqueued doubleword. From the previous example, store byte flags 1:4 would be ones, while 0 and 5:7 would be zeros.

In a multiple processor configuration, if a processor attempts to fetch data enqueued on the L1 store queue, one of two actions results. First, if the fetch request results in an L1 cache hit, all "conceptually completed" store queue entry absolute addresses are compared to the doubleword boundary against the doubleword absolute address of the fetch request. Should one or more equal compares be found, the fetch is held pending the dequeue of the last matched queue entry to L2 cache. This prevents the requesting processor from seeing the data before the other processors in the configuration. Second, if the fetch request results in an L1 cache miss, all "conceptually completed" store queue entry absolute addresses are compared to the L1 cache line boundary against the L1 cache line absolute address of the fetch request. Should one or more equal compares be found, the fetch is held pending the dequeue of the last matched queue entry to L2 cache. This guarantees storage consistency between the L1 and L2 caches.

Still referring to FIG. 7, four "pointers" will be discussed: the L1EP pointer, the L1TP pointer, as shown in FIG. 7; the L1IP pointer and the L1DP pointer, not shown in the drawings. An entry is placed onto the L1 store queue each time a store request is presented to L1 cache, provided the logical address can successfully be translated and no access exceptions occur and regardless of the L1 cache hit/miss status. Just prior to enqueue, the L1 store queue enqueue pointer (L1EP) is incremented to point to the next available entry in the queue. Enqueue is permitted provided the L1 store queue is not full. Store queue full is predicted, accounting for the pipeline stages from the instruction register to the L1 cache, to prevent store queue overflow. Enqueue is controlled by the execution unit store requests. An L1 store queue transfer pointer (L1TP) is implemented to support bidirectional command/address and data interfaces with the L2 cache. Normally, both interfaces are available, and when a store request is placed onto the L1 store queue, it is also transferred to the L2 store queue. Under certain situations, the transfer of the store request to L2 must be delayed, perhaps due to data transfers from L2 cache to L1 cache for an L1 cache fetch miss. This allows the execution unit to continue after requesting the store without requiring that the request has been successfully transferred to L2. The L1TP is incremented each time a request is transferred to L2. An instruction boundary pointer (L1IP) is required to delimit 370-XA instruction boundaries. Each time an EOP indication is received, the L1EP is copied into the L1IP. The L1IP is used to mark "conceptually completed" stores in the L1 store queue. These are complete from the viewpoint of the execution unit, as the 370-XA instruction has completed, even though they may not yet be reflected in L2 cache, the common level of storage in the configuration. This pointer marks the boundary for the entries checked for program store compare and operand store compare. Last, the L1 dequeue pointer (L1DP) identifies the most recent entry removed from the store queue. It actually points to an invalid L1 store queue entry, marking the last available entry for enqueue. L1 store queue entries are dequeued only by signal from the L2 store queue controls whenever the corresponding entry is removed from the L2 store queue. This pointer is used along with the L1EP to identify store queue full and empty conditions, controlling the execution unit as necessary.

Figure 8:
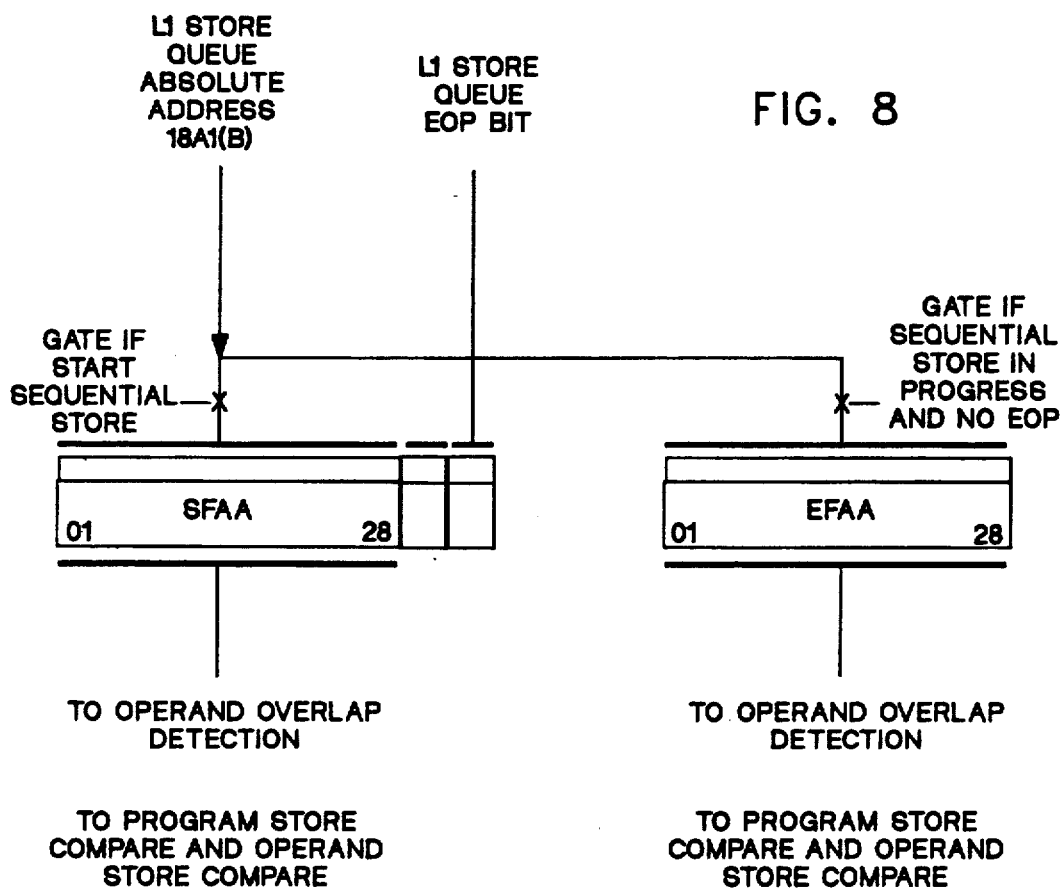
FIG. 8 illustrates the L1 field address registers connected to the L1 store queue of FIGS. 6 and 7.

Referring to FIG. 8, two field address registers are connected to an output of the L1 store queue of FIG. 7, and in particular, to the absolute address portion 18a1(b) of the output of the L1 store queue 18a1-18c1 of FIG. 7. These field address registers are termed the Starting Field Absolute Address (SFAA) field address register and the Ending Field Absolute Address (EFAA) field address register.

In FIG. 8, to support sequential store processing, two additional address registers, called field address registers, are required for comparison purposes: the SFAA and the EFAA field address registers. Consider that a 370-XA instruction may modify up to 256 bytes of storage with single-byte store requests. Given that each request presented to the L1 store queue 18a1-18c1 requires a unique entry, 256 entries would be required to contain the entire instruction to support the retry philosophy. To avoid this situation, when a sequential store is started in the L2 cache 26a, each entry associated with the same instruction is dequeued and its address is loaded into the appropriate field address register of FIG. 8, either the SFAA or the EFAA. This allows the limits of the storage field, modified by the sequential store, to be maintained for comparison purposes in a minimal amount of hardware, at the L1 cache or L1 store queue level. These registers are used to support "program store compare" and "operand store compare". The following sub-paragraphs describe the program store compare and the operand store compare concept:

Operand Store Compare

As required by the conceptual sequence within a processor, if an instruction stores a result to a location in storage and a subsequent instruction fetches an operand from that same location the operand fetch must see the updated contents of the storage location. The comparison is required on an absolute address basis. With the queuing of store requests, it is required that the operand fetch be delayed until the store is actually completed at the L2 cache and made apparent to all processors in the configuration. For the uniprocessor, the restriction that the store complete to L2 cache before allowing the fetch to continue is waived as there exists no other processor to be made cognizant of the change to storage. It is not required that channels be made aware of the processor stores in any prescribed sequence as channels execute asynchronously with the processor. In this case, enqueuing on the L1 store queue, and updating the L1 operand cache if the data exist there, is sufficient to mark completion of the store. However, if the data are not in L1 cache at the time of the store, the fetch request with operand store compare must wait for the store to complete to L2 cache before allowing the inpage to L1 cache to guarantee data consistency in all levels of the cache storage hierarchy.

Program Store Compare

Within a processor, two cases of program store compare exist: the first involves an operand store to memory followed by an instruction fetch from the same location (store-then-fetch); the second involves prefetching an instruction into the instruction buffers and subsequently storing into that memory location prior to execution of the prefetched instruction (fetch-then-store). As required by the conceptual sequence within a processor, if an instruction stores a result to a location in storage and a subsequent instruction fetch is made from that same location, the instruction fetch must see the updated contents of the storage location. The comparison is required on a logical address basis. With the queuing of store requests, it is required that the instruction fetch be delayed until the store is actually completed at the L2 cache and made apparent to all processors in the configuration. For the second case, the address of each operand store executed within a processor is compared against any prefetched instructions in the instruction stream and, if equal, the appropriate instructions are invalidated. The source of the prefetched instructions, the L1 instruction cache line, is not actually invalidated until the operand store occurs in L2 cache. At that time, L2 cache control requests invalidation of the L1 instruction cache line. There can be no relaxation of the rules for the uniprocessor as the program instructions reside in a physically separate L1 cache than the program operands, and stores are made to the L1 operand cache only. As such, the store-then-fetch case requires that the L2 cache contain the most recent data stored by the processor prior to the inpage to the L1 instruction cache.

The field address registers (SFAA and EFAA) of FIG. 8 are also used for operand overlap detection within the same storage-storage 370-XA instruction. The concept of operand overlap is described in the following paragraph:

Operand Overlap

Within the storage-to-storage instructions, where both operands exist in storage, it is possible for the operands to overlap. Detection of this condition is required on a logical address basis. The memory system hardware actually detects this overlap on an absolute address basis. The destination field in storage is actually being built in the L1 store queue, and L1 cache if L1 cache directory hit, and in the L2 cache write buffers, not in the L2 cache itself. When operand overlap occurs, the L1 cache store queue data and the old L1 line data from L2 cache are merged on inpage to L1 cache. In the case of destructive overlap, the fetches for the overlapped portion are not necessarily fetched from storage. Hence, the actual updating of L2 cache is postponed until end-of-operation for the instruction.

When operand overlap is detected on a fetch access, no problem exists provided the data is stored in L1 cache when the stores modify the contents of L1 cache in parallel with enqueuing at the L1 cache level. If an L1 cache miss occurs on a fetch with operand overlap, the L1 store queue is emptied (L2 processes all entries in the L1 store queue related to this instruction) prior to allowing the fetch request transfer to L2 cache. This guarantees that L2 has the most recent data for the instruction in its L2 write buffers. The L1 cache miss can then be handled in L2 cache, merging the contents of the L2 write buffers and L2 cache line to give the most recent data to L1 cache.

Figure 9:
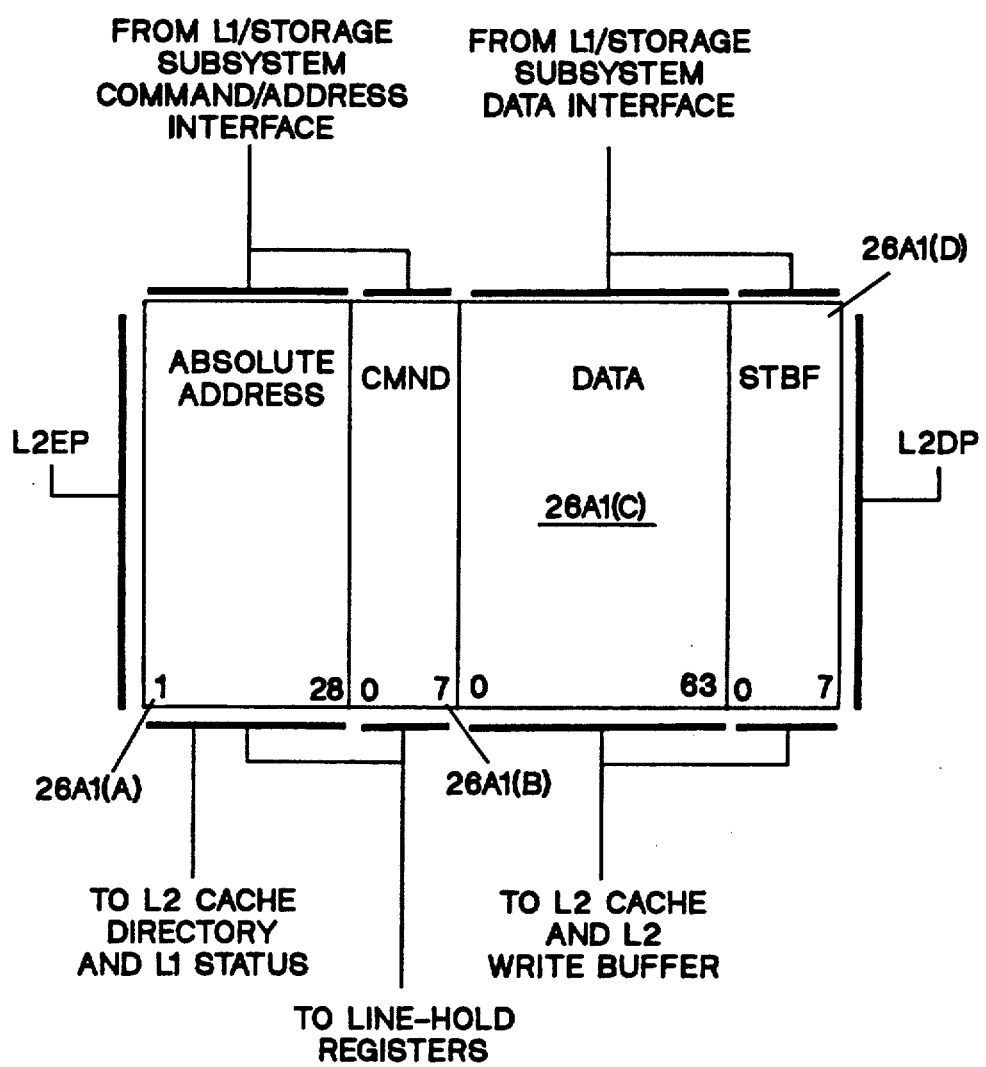
FIG. 9 illustrates the L2 store queue of FIG. 6.

Referring to FIG. 9, the contents of the L2 store queue 26a1, 26a2, and 26a3 of FIG. 6 is illustrated.

In FIG. 9, the contents of the L2 store queue consist of four primary fields. The first field contains the absolute address 26a1(a). This address represents the address of the doubleword of the data in the store queue entry. It is the absolute address transferred with the request from the L1 store queue. This address is used to update the L2 cache and L2 write buffers. It is also used as the address for interrogating the L1 status arrays which maintain a record of the data in each L1 cache for each processor in the configuration. The command (CMND) field 26a1(b) contains the sequential store bit: '0'b if a non-sequential store request, '1'b if sequential store request. The other bit is the EOP bit. It delimits instruction boundaries within the store queue. The next field, the DATA field 26a1(c), contains up to eight bytes of data, transferred as loaded into the L1 store queue. The final field, the store byte flag (STBF) field 26a1(d), indicates which bytes are to be written to storage within the enqueued doubleword, as in the L1 store queue.

Each processor 20a, 20b, 20c of FIGS. 2 and 4, maintains its own L2 store queue 26a1, 26a2, 26a3, respectively, totally independent of the other processors. The storage subsystem manages the L2 store queues 26a1-26a3 and L2 write buffers (see FIG. 6) for each processor. The L2 write buffers may be seen in FIG. 6 as L2 write buffer 0 (L2WB-0) 26a1(a) and L2 write buffer 1 (L2WB-1) 26a1(b) associated with processor 20a and L2 cache write buffer (L2 cache WB 26a4. Similarly, L2WB-0 26a2(a) and L2WB-1 26a2(b) are associated with processor 20b, and L2WB-0 26a3(a) and L2WB-1 26a3(b) are associated with processor 20c.

Generally speaking, the L2 store queue is comprised of two major parts: (1) the first part is the L2 store queue one-dimensional array 26a1-26a3; it is a first-in, first-out, cyclic queue in regards to dequeuing requests to L2 cache 26a or to the L2 write buffers itemized above from FIG. 6; its structure is identical to the L1 store queue; however, the entry pointers are slightly different; and (2) the second part is the set of L2 write buffers 26a1(a)/26a1(b), 26a2(a)/26a2(b), 26a3(a)/26a3(b), and 26a4 of FIG. 6 used for sequential store processing for each processor in the configuration.

In FIG. 9, an entry is placed onto the L2 store queue each time a store request is transferred across the L1 cache/storage subsystem interface from the requesting processor. Just prior to enqueue, the L2 store queue enqueue pointer (L2EP) is incremented to point to the next available entry in the queue. Enqueue is always allowed as L1 prevents store queue overflow, provided the L1 store queue and L2 store queue support the same number of entries. A completed pointer (L2CP) is required to delimit serviceable stores within the L2 store queue. Each time an EOP indication is received, the L2EP is copied into the L2CP. Also, for sequential store processing, each time a sequential store request is enqueued, the L2CP is incremented. The L2CP is used to mark serviceable stores in the L2 store queue. These are store requests that can be written into L2 cache in the case of non-sequential stores and store requests that can be moved into the L2 write buffers in the case of sequential stores. Last, the L2 dequeue pointer (L2DP) identifies the most recent entry removed from the L2 store queue. It actually points to an invalid L2 store queue entry, marking the last available entry for enqueue. L2 store queue entries are dequeued whenever they are written into L2 cache 26a (NS) or moved into the L2 write buffers (SS).

Figure 10:
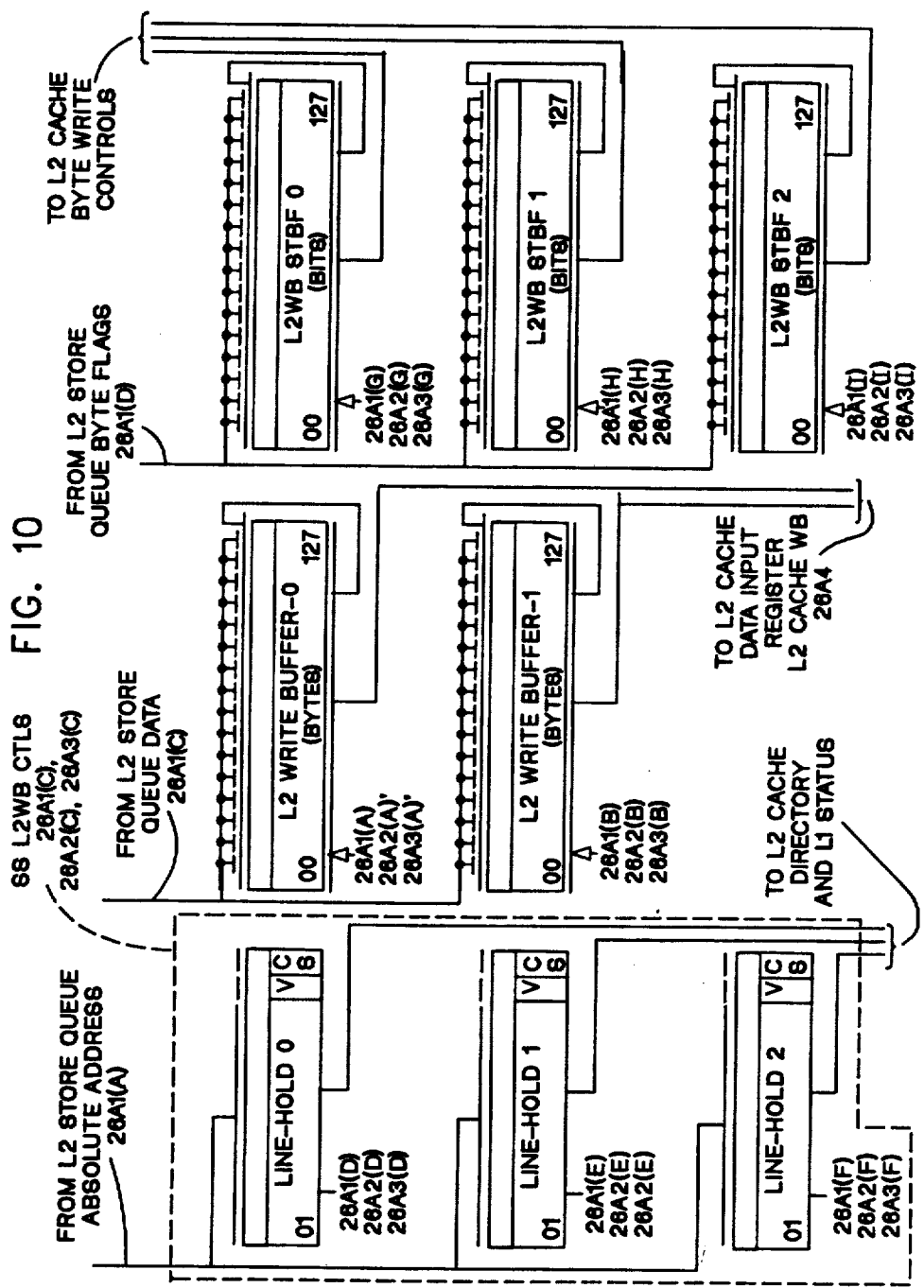
FIG. 10 illustrates the L2 line-hold registers and write buffers connected to the L2 store queue of FIGS. 6 and 9.
Figure 14:
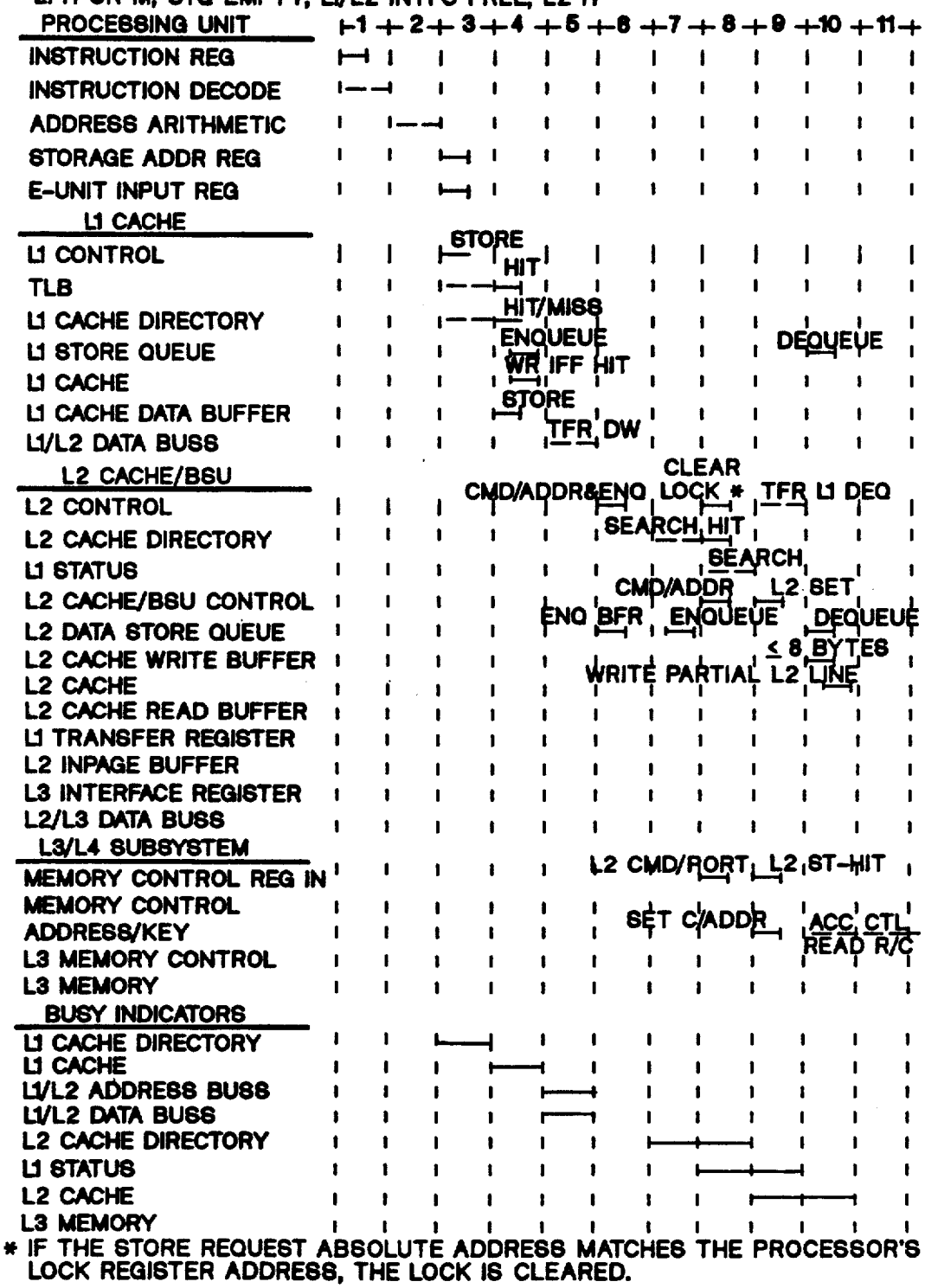
Figure 18:
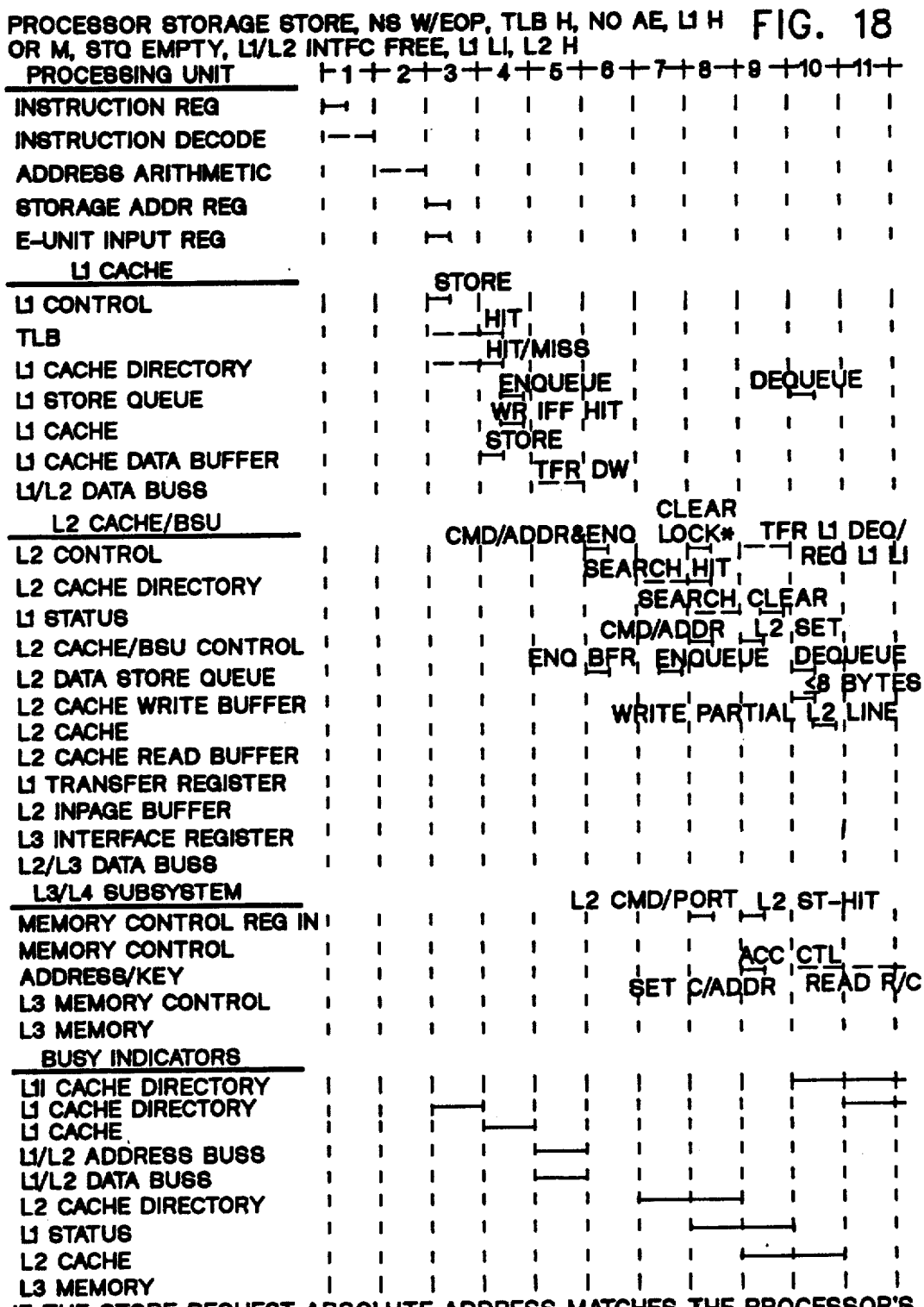
Figure 26:
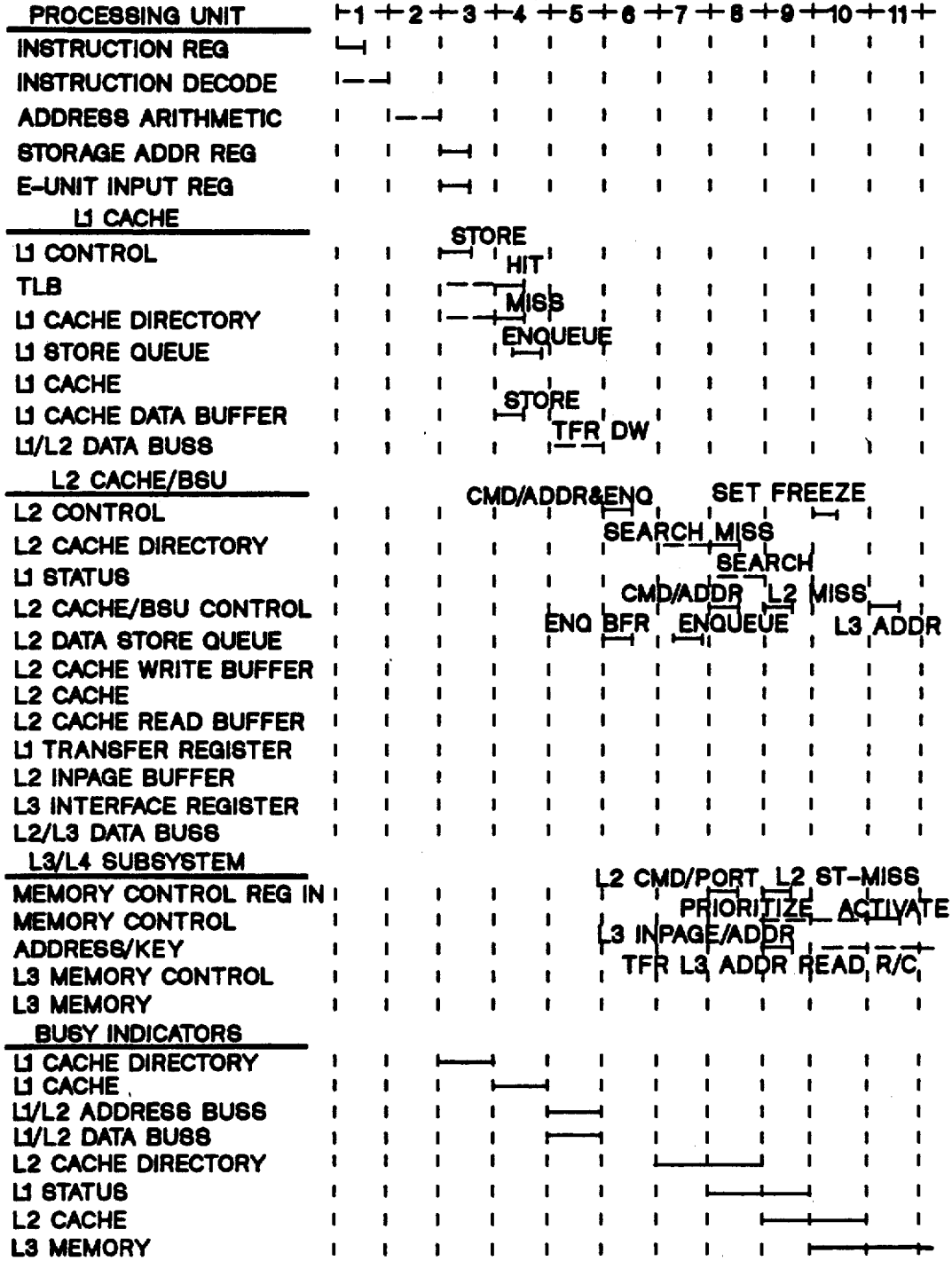
Figure 27:
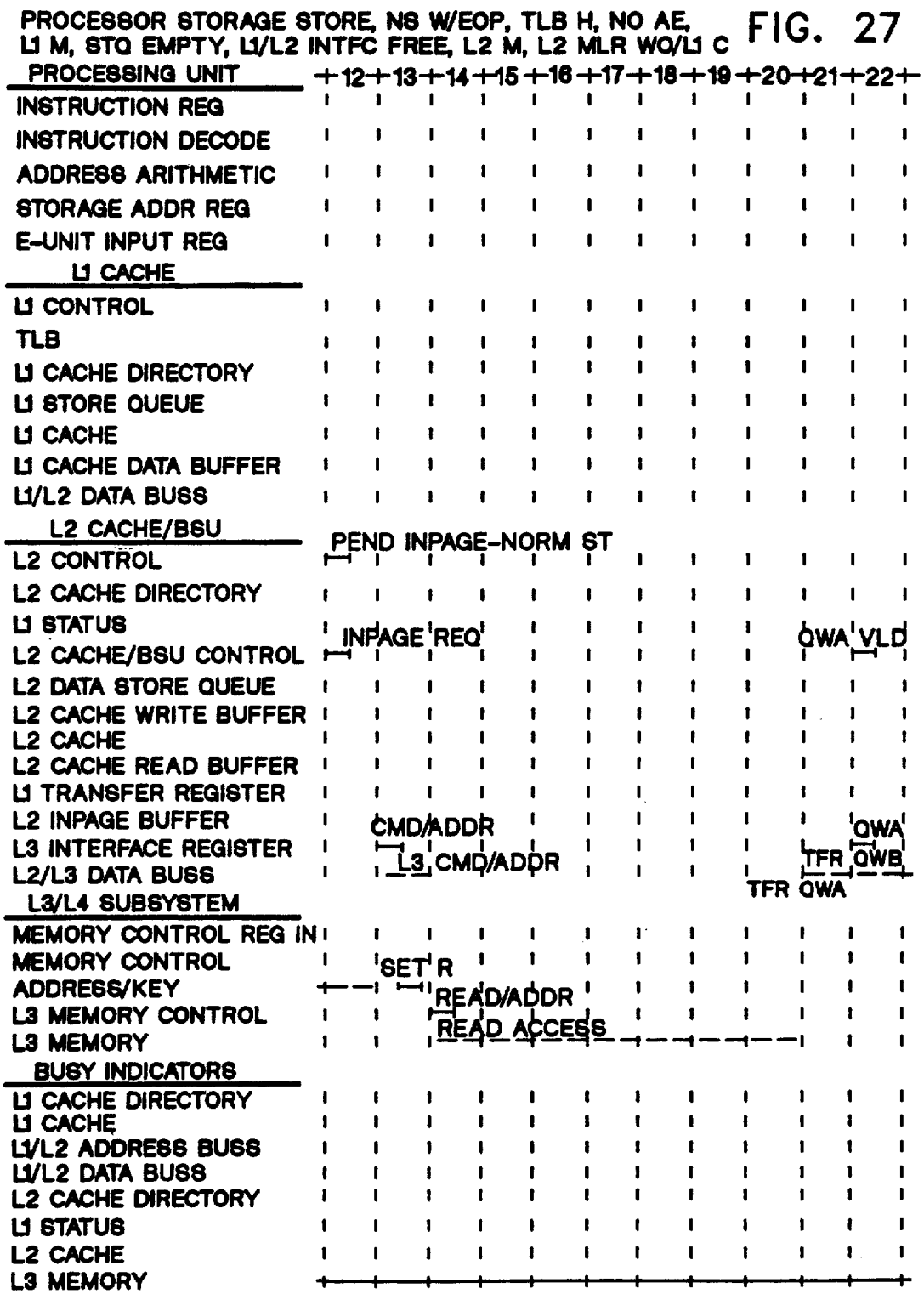
Figure 31:
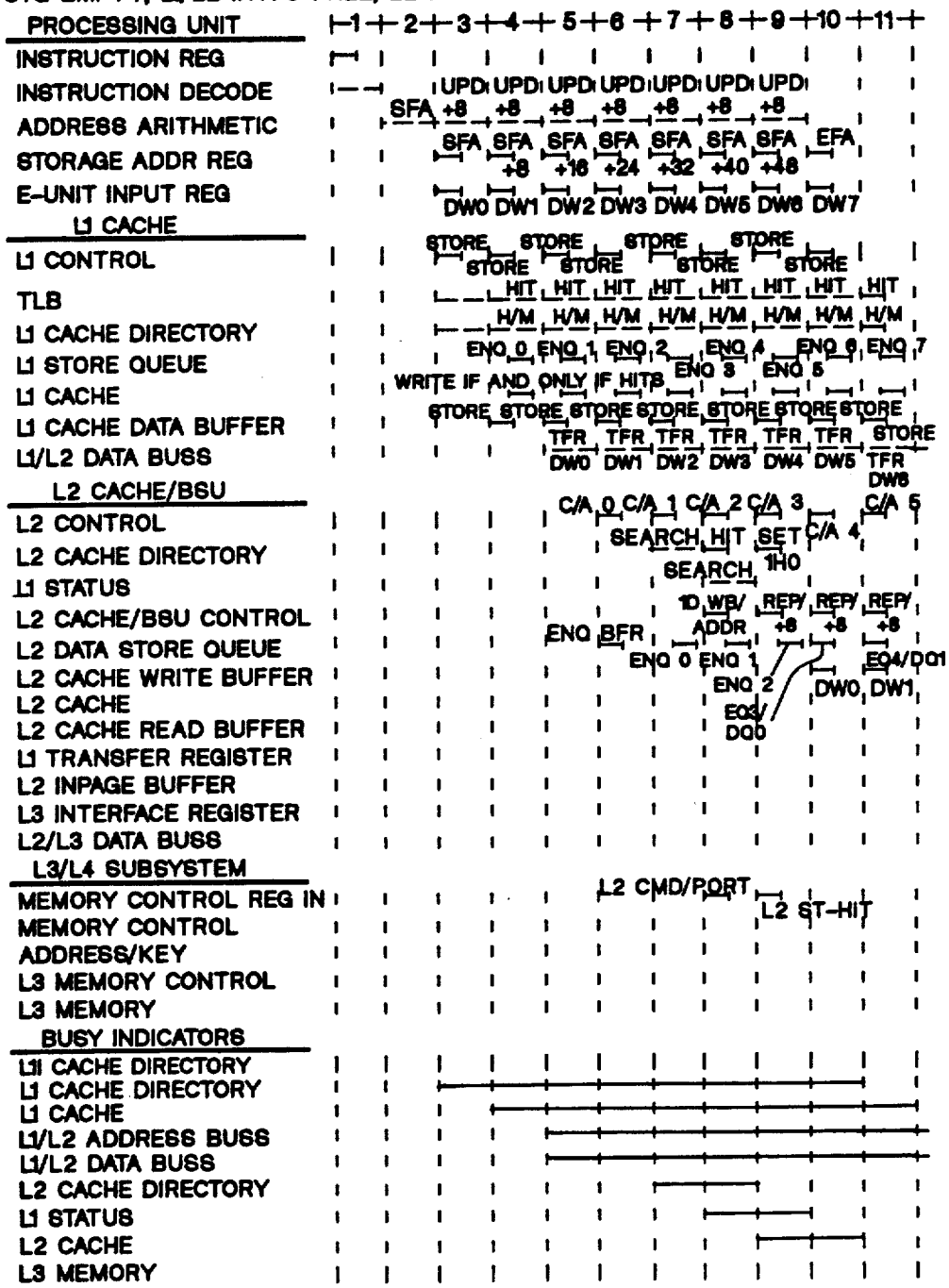
Figure 32:
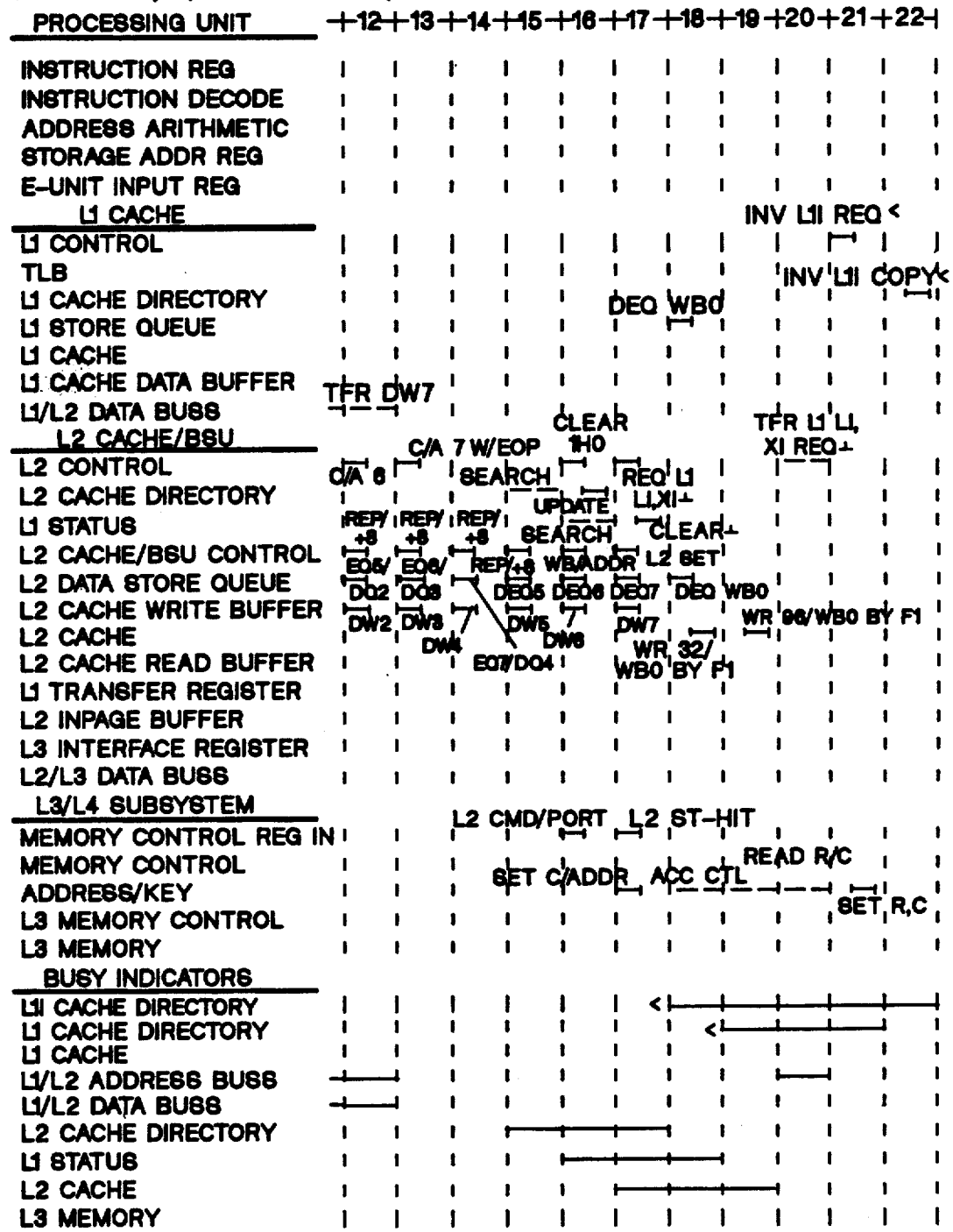
Figure 33:
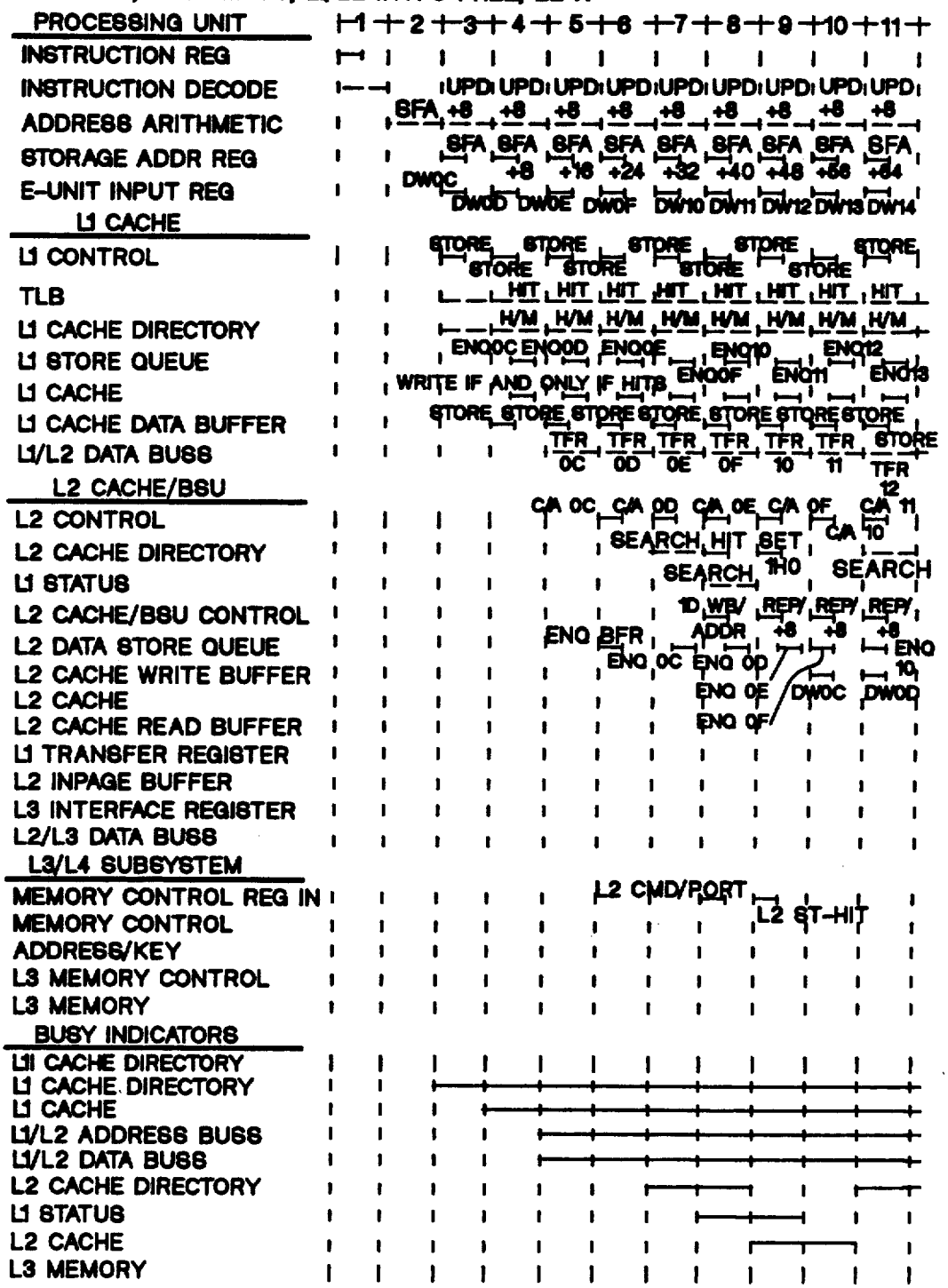
Figure 34:
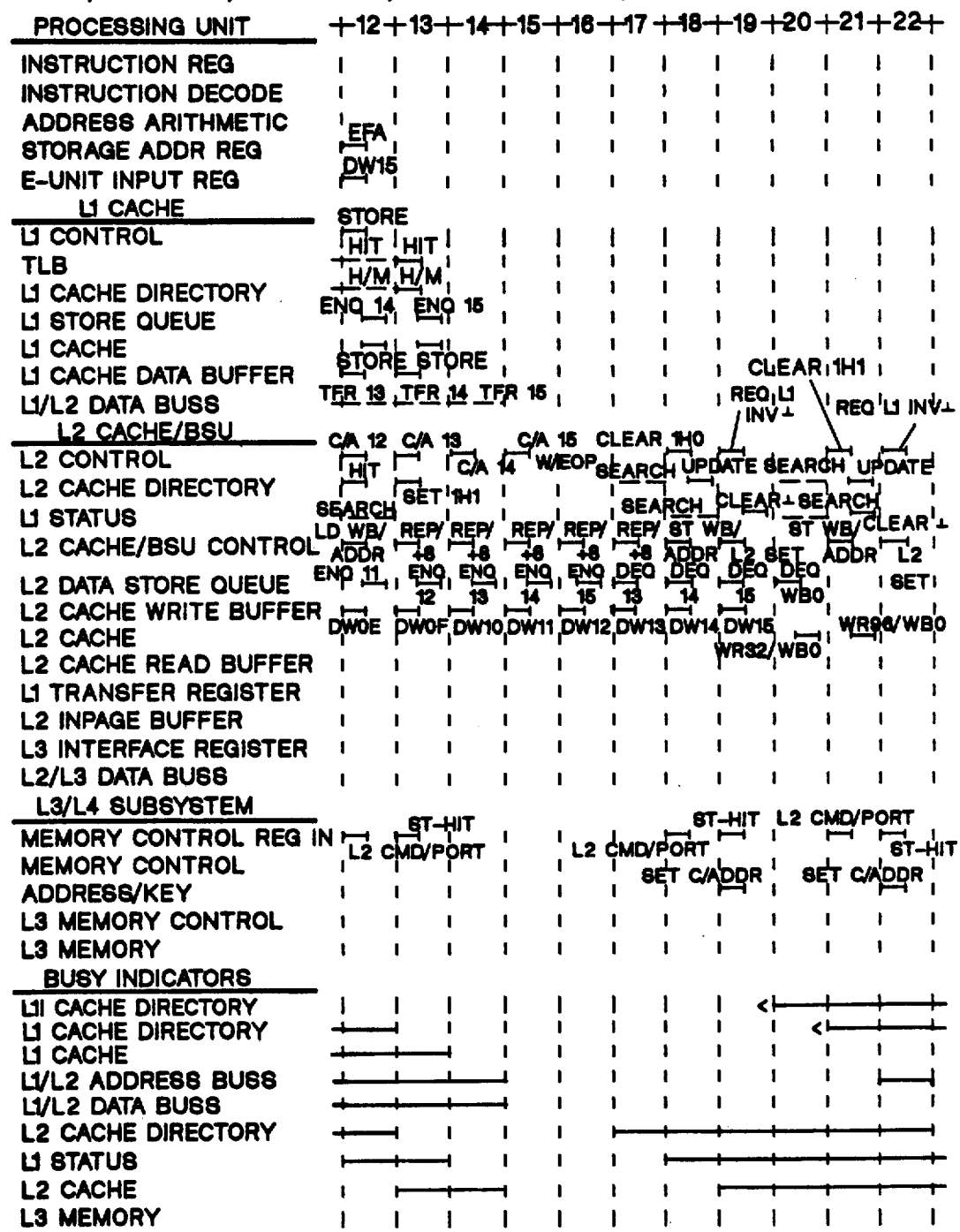
Figure 35:
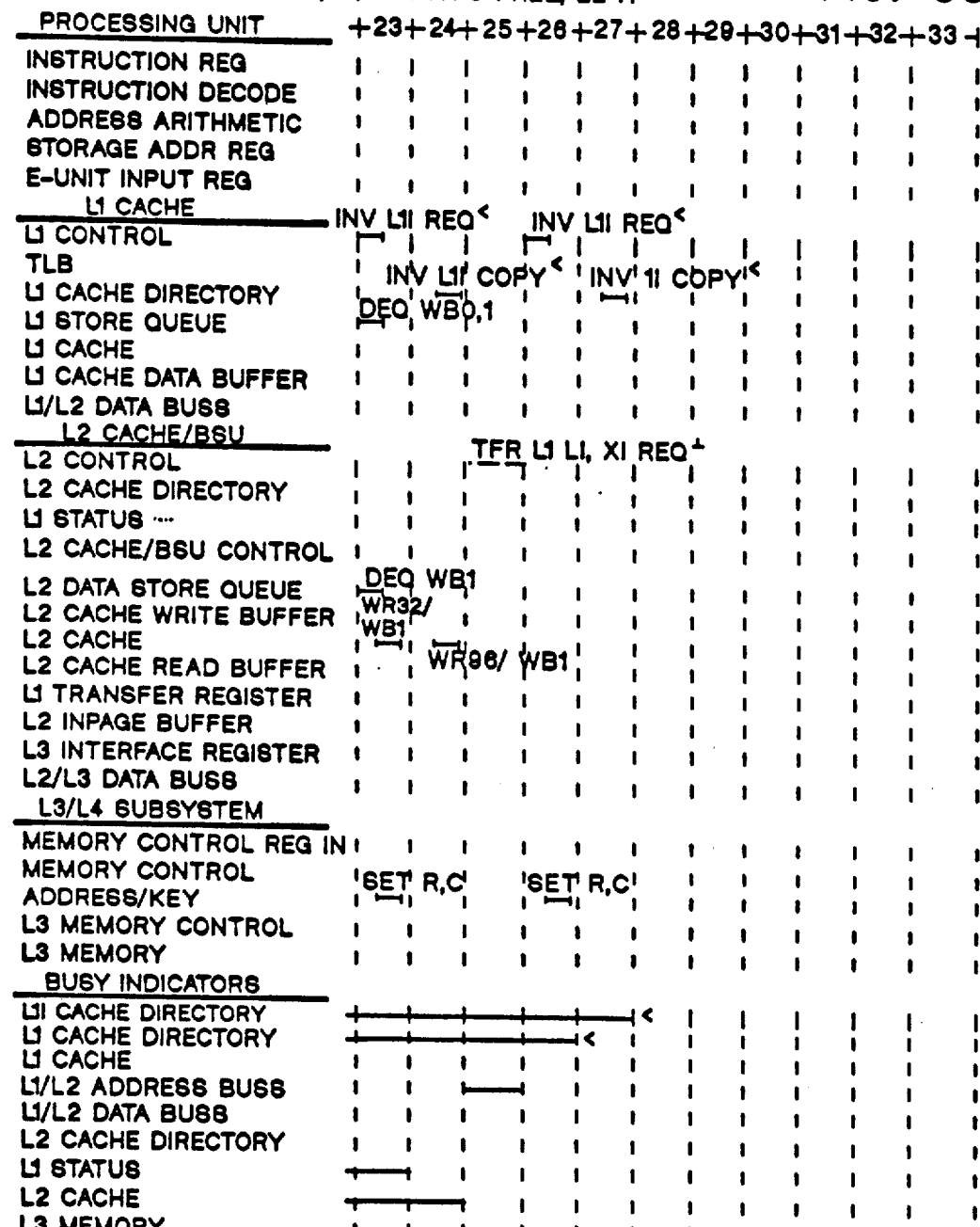
Figure 36:
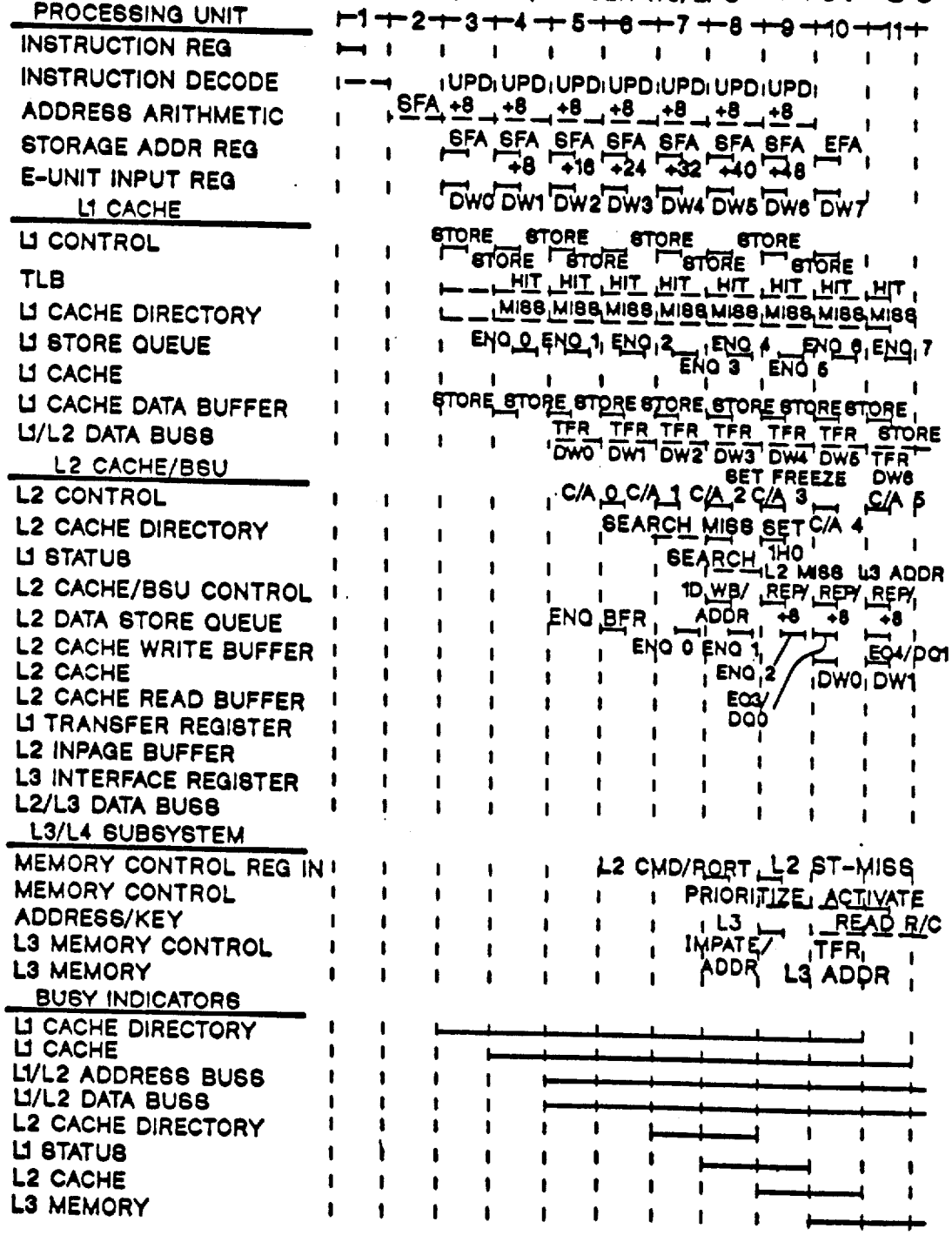
Figure 38:
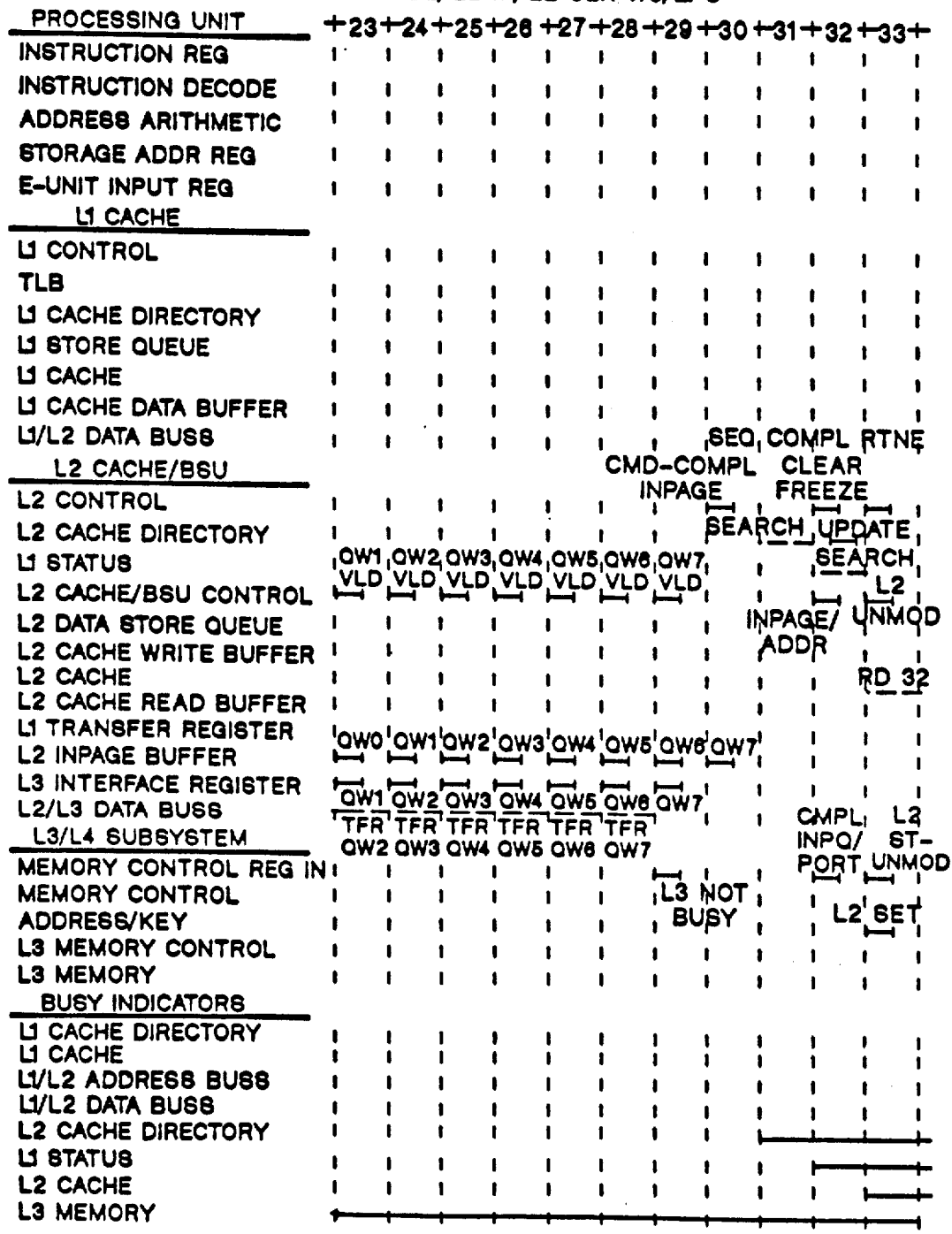
Figure 41:
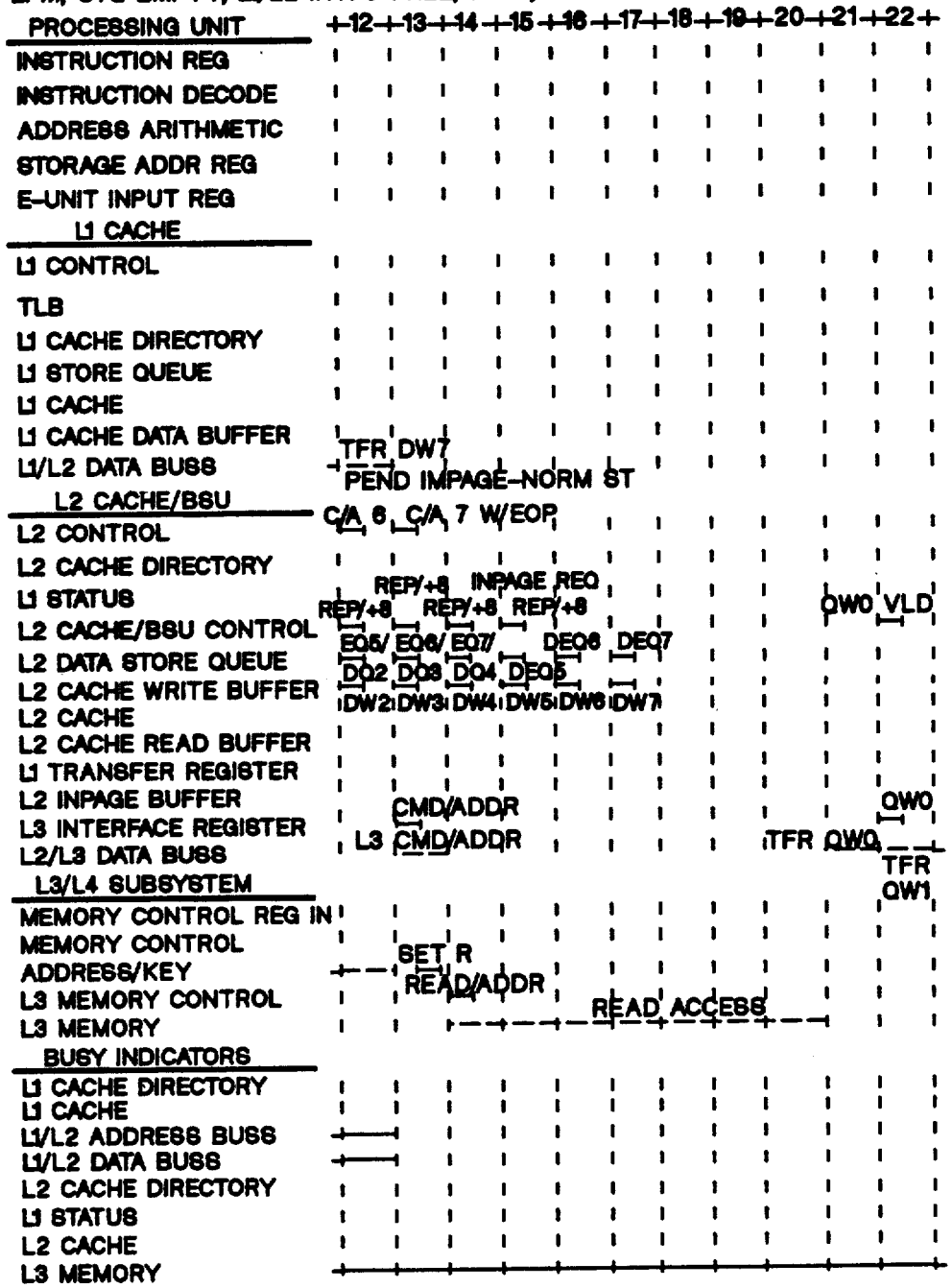
Figure 45:
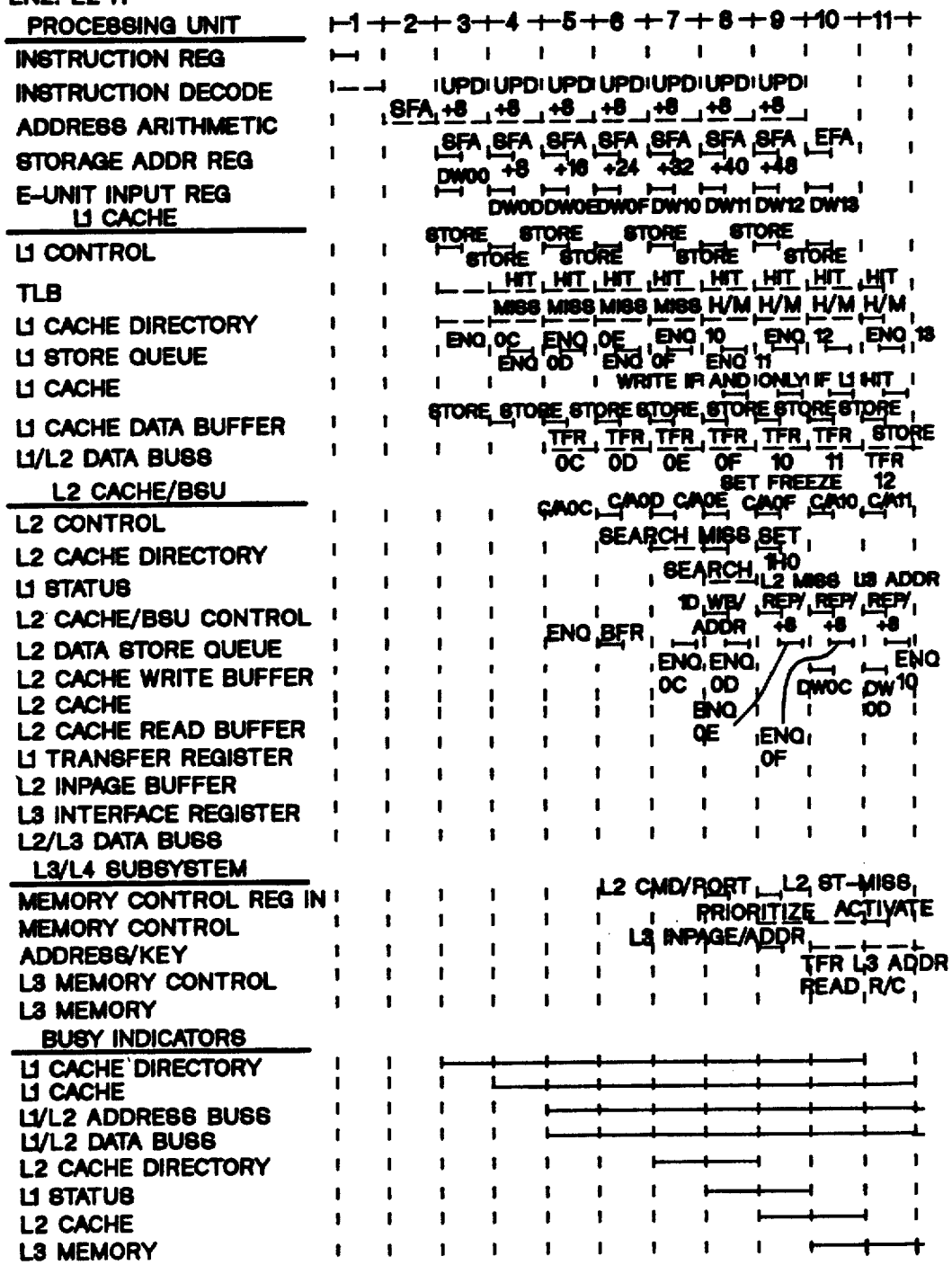
Figure 47:
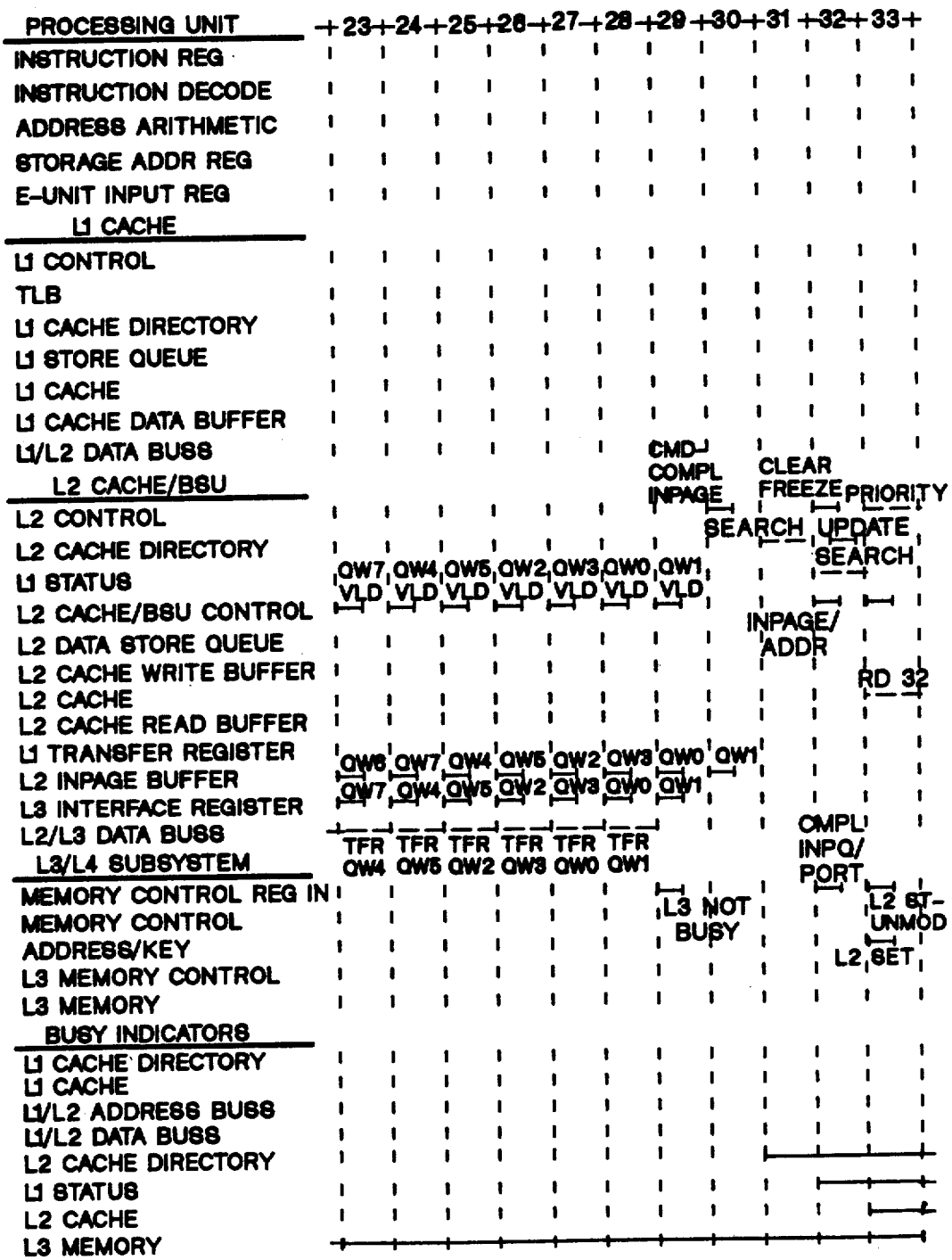
Figure 48:
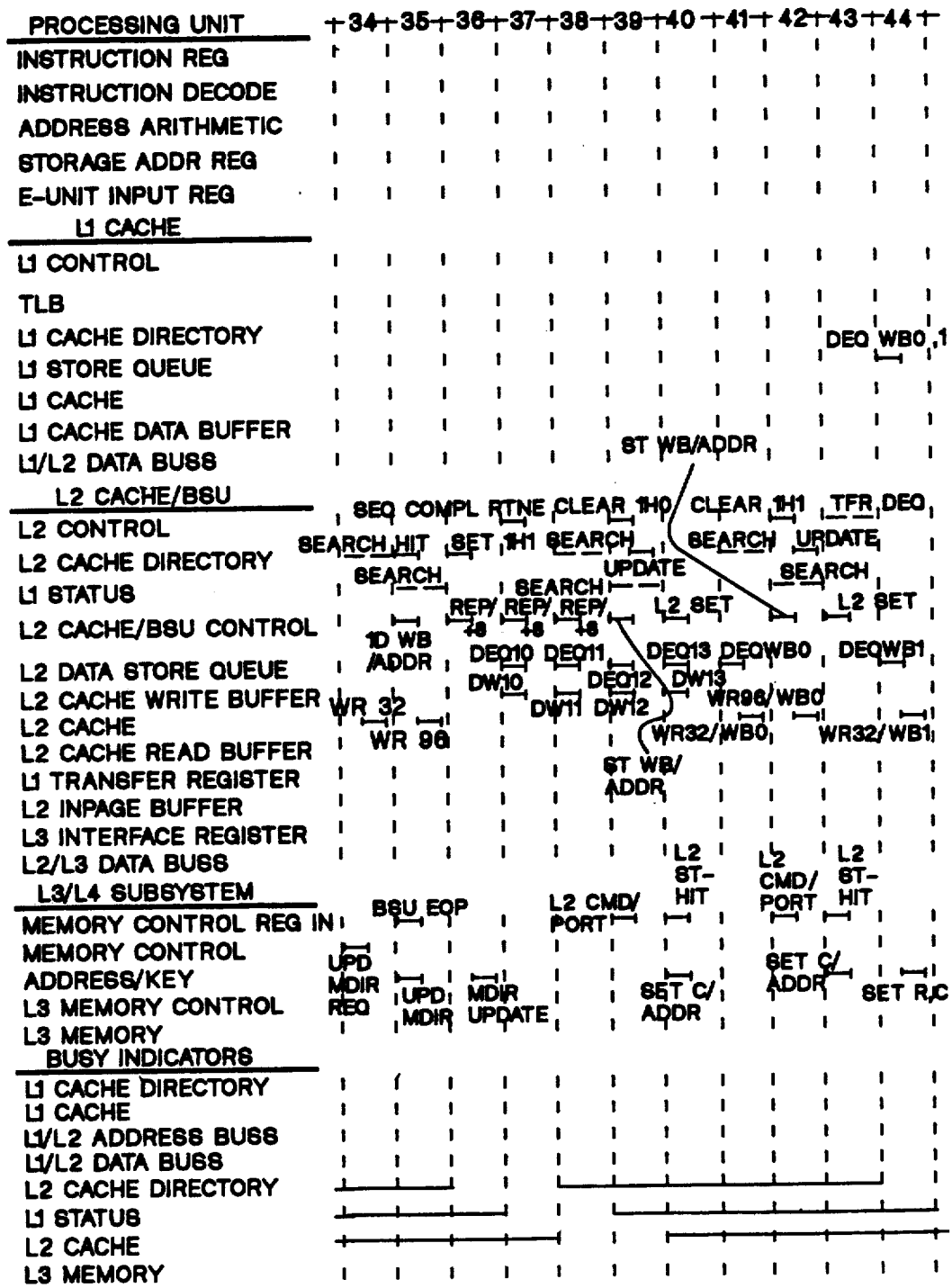

Referring to FIG. 10, a set of L2 store queue line hold registers (disposed in the SS L2WB CTLS 26a1(c), 26a2(c), and 26a3(c)) and L2 store queue write buffers (as shown in FIG. 6) is illustrated.

As shown in FIG. 6, and seen again in FIG. 10, the L2 store queue 26a1, 26a2, 26a3 DATA 26a1(c) are each connected at its output to an L2 write buffer-0 (L2WB-0) 26a1(a), 26a2(a) and 26a3(a); and to an L2 write buffer-1 (L2WB-1) 26a1(b), 26a2(b), and 26a3(b). However, as seen in FIG. 10, the L2 store queue 26a1, 26a2, 26a3 ABSOLUTE ADDRESS 26a1(a) are each connected to the storage subsystem L2 write buffer controls (SS L2WB CTLS) 26a1(c), 26a2(c), & 26a3(c), each of the write buffer controls (SS L2WB CTLS) including a set of line hold registers comprising line hold 0 register 26a1(d), 26a2(d), and 26a3(d), a line hold 1 register 26a1(e), 26a2(e), 26a3(e), and a line hold 2 register 26a1(f), 26a2(f), and 26a3(f). The line hold registers are address registers, and they are needed to support sequential store processing. Further, although not shown in FIG. 6 but seen in FIG. 10, the L2 store queue 26a1, 26a2, 26a3 store byte flags STBF 26a1(d) are each connected to a L2 write buffer store byte flag 0 (L2WB STBF 0) register 26a1(g), 26a2(g), 26a3(g), to L2 write buffer store byte flag 1 (L2WB STBF 1) register 26a1(h), 26a2(h), 26a3(h) and to L2 write buffer store byte flag 2 (L2WB STBF 2) register 26a1(i), 26a2(i), 26a3(il ).

In operation, referring to FIG. 10 in conjunction with FIG. 6, consider that a 370-XA instruction may modify to 256 bytes of storage. With an L2 cache line size of 128 bytes, this 256-byte field can span three L2 cache lines. When a sequential store is started in L2, the first line-hold register is loaded with the absolute address portion of the L2 store queue and the L2 cache directory is searched, using the absolute address, to determine if the data currently exists in L2 cache. If it does, the L2 cache set is also loaded into the line-hold register and the cache line is now pinned in L2 cache for the duration of the sequential store. Pinning simply means the L2 cache line cannot be replaced by another line for the duration of the sequential store, but it does not restrict access in any other way. If the L2 cache directory search results in a miss, the data continue to be moved into the L2 write buffer and dequeued from the store queue. Processing continues up to the end of the current cache line. If the end of the cache line is reached before the required data have been inpaged into L2 cache, processing is suspended, otherwise processing continues with the next L2 cache line. Each time another L2 cache line is stored into, the L2 cache directory is searched again, and another line-hold register is established. Once EOP is detected for the sequential store, the data are stored into L2 cache in successive cache write cycles, and the line-hold registers are reset. A final dequeue signal is transferred to L1 to release the field address registers associated with this sequential store in L1. This allows the limits of the storage field modified by the sequential store to be maintained with minimal hardware while improving concurrency at the L2 cache level. Note that the L2 cache directory is accessed a maximum of 6 times for the 256-byte storage field. This is a significant reduction in L2 cache busy time over an implementation which treats each doubleword of the field as a unique store, possibly requiring 33 cache accesses. In addition to the line-hold registers, L2 write buffers are required to handle the data portion of the L2 store queue to permit sequential store processing. As sequential store entries are dequeued from the L2 store queue, the image of the storage field is built in the L2 write buffers, address-aligned as if the data were placed into real storage. Upon receipt of EOP for the sequential store, up to three contiguous line-write cycles are taken in L2 cache, moving one to 128 bytes into cache on each write cycle under control of the store byte flags. In this way, a 256-byte field can be written into L2 cache with a maximum of 3 write operations. This is a considerable improvement to L2 cache availability. For cases of operand overlap, when an L1 inpage request is handled in L1 cache, controls detect the fact that data in the L2 write buffer is to be merged with data from L2 cache. The store byte flags associated with the L2 write buffers control which bytes are gated from the L2 write buffer and which bytes are gated from L2 cache. The result is that L1 cache receives the requested L1 cache line with its most recent modifications for the currently executing instruction. As each processor possesses a set of such facilities, the storage subsystem supports the concurrent processing of sequential store operations for each processor in the configuration. The only points of contention are the L2 cache directory required for interrogation and actual L2 write buffer storing into L2 cache.

To support efficient recovery from page faults in a virtual storage environment, microcode may issue a reset processor storage interface command. This allows the L1 and L2 store queues to clear entries associated with a partially completed 370-XA instruction. The scenario is that microcode first guarantee that all previously completed instructions' stores are written into L2 cache. The reset processor storage interface command can then be issued. Both the L1 and L2 store queues are placed into their system reset state, along with any related controls. Microcode invalidates any data in the L1 cache that this instruction may have modified. The affect of the instruction on storage has now been nullified.

In summary, the L1 and L2 store queue design of the present invention allows maximum isolation of each processor's execution within a tightly-coupled multiple processor while minimizing the utilization of the shared L2 cache buffer resource. Storage is not modified by any instruction until successful completion of the 370-XA instruction within the processor. Instructions are processed in such a way as to maximize storage availability by handling them according to result storage field length. This allows simplified storage handling in that partial results do not appear in L2 cache, the common level of storage. Therefore, lines in L2 cache do not have to be held exclusive to a particular processor during its operations. It also supports simplified page fault handling by eliminating the need for pretesting storage field addresses or requiring exclusive access to data in L2 cache to allow partial result storing. This maximizes concurrent availability to data within the shared L2 cache, further improving the performance of the overall multiple processor configuration.

DETAILED DESCRIPTION OF THE PREFERRED EMBODIMENT

A more detailed description of the functional operation of the L1 store queue and the L2 store queue of the present invention, and of store request processing in general, will be set forth in the following paragraphs with reference to FIGS. 4 through 10, and with the assistance of the time line diagrams illustrated in FIGS. 11 through 49.

1.0 Storage Routines - MP/3 Processor Storage Store Routines 1.1 Storage Store, TLB Miss Refer to FIG. 11 for a time line diagram.

The execution unit issues a processor storage store request to the L1 operand cache. The set-associative TLB search fails to yield an absolute address for the logical address presented by the request. A request for dynamic address translation is presented to the execution unit and the current storage operation is nullified. The TLB miss overrides the results of the L1 cache directory search due to the lack of a valid absolute address for comparison from the TLB. The write to the L1 cache is canceled. The L1 store queue does not enqueue the request due to the TLB miss. Any prefetched instructions which succeed the current instruction are checked for modification by the store request through logical address comparison. As a TLB miss has occurred for the L1 operand cache, no valid absolute address exists to complete the store request. The program store compare checks are blocked. The store request is not transferred to L2 cache due to the TLB miss. For a hardware-executed instruction, program execution is restarted at this instruction address if the address translation is successful. For a microinstruction store request, the microinstruction is re-executed if address translation is successful. For either case, L1 control avoids enqueuing any repeated store requests to avoid transferring duplicate store requests to the L2 store queue and commences L1 store queue enqueues with the first new store request.

1.2 Storage Store, TLB Hit, Access Exception

Refer to FIG. 12 for a time line diagram.

The execution unit issues a processor storage store request to the L1 operand cache. The set-associative TLB search yields an absolute address for the logical address presented by the request. However, an access exception, either protection or addressing, is detected as a result of the TLB access. The execution unit is notified of the access exception and the current storage operation is nullified. The access exception overrides the results of the L1 cache directory search. The write to the L1 cache is canceled. The L1 store queue does not enqueue the request due to the access exception. Any prefetched instructions which succeed the current instruction are checked for modification by the store request through logical address comparison. As an access exception has occurred, no valid absolute address exists to complete the store request. The program store compare checks are blocked. The store request is not transferred to the L2 store queue as the current program will abnormally end. Eventually the processor L2 interface will be reset by microcode as part of the processor recovery routine to purge any enqueued stores associated with this instruction.

1.3 Storage Store, Non-sequential, TLB Hit, No Access Exceptions, Delayed Store Queue Transfer, L2 Cache Busy See FIG. 13 for a time line diagram.

The execution unit issues a non-sequential processor storage store request to the L1 operand cache. The set-associative TLB search yields an absolute address, with no access exceptions, for the logical address presented by the request. If the search of the L1 cache directory finds the data in cache, an L1 hit, through equal comparison with the absolute address from the TLB, a write to the selected L1 cache set is enabled. The store request data are written into the L1 cache congruence and selected set using the store byte control flags to write only the desired bytes within the doubleword. If the directory search results in an L1 cache miss, due to a miscompare with the absolute address from the TLB, the write of the L1 cache is canceled. In either case, the store request is enqueued on the L1 store queue. The queue entry information consists of the absolute address, data, store byte flags, and store request type (non-sequential or sequential store, end-of-operation). The transfer of the processor store request to the L2 cache store queue is delayed. Any combination of three situations can delay the transfer. First, store requests must be serviced in the sequence they enter the store queue. If the L1 store queue enqueue pointer is greater than the L1 transfer pointer, due to some previous L1/L2 interface busy condition, this request cannot be transferred to L2 cache until all preceding entries are first transferred. Second, the L1 cache store queue enqueue pointer equals the L1 transfer pointer, but the L1/L2 interface is busy with data transfers to another L1 cache or a request for L1 cache line invalidation from L2. Third, the L2 store queue is currently full and unable to accept another store request from the L1 store queue. Any prefetched instructions which succeed the current instruction are checked for modification by the store request through logical address comparison. If an equal match occurs, the instruction buffers are invalidated. Eventually, the processor store request is transferred to the L2 cache. If the L2 store queue associated with this processor is empty at the time the request is received and end-of-operation is indicated with the store request, this request can be serviced immediately if selected by L2 cache priority. In any case, an entry is made on the L2 store queue for the requesting processor. The L2 cache store queue is physically divided into two portions: control and data. The absolute address and store request type are maintained in the L2 control 26k function. The associated data and store byte flags are enqueued in the L2 cache data flow function. The L2 cache priority does not select this processor store request for service.

1.4 Storage Store, Non-sequential, TLB Hit, No Access Exceptions, L2 Cache Hit

See FIGS. 14-21 for time line diagrams.

The execution unit issues a non-sequential processor storage store request to the L1 operand cache. The set-associative TLB search yields an absolute address, with no access exceptions, for the logical address presented by the request. If the search of the L1 cache directory finds the data in cache, an L1 hit, through equal comparison with the absolute address from the TLB, a write to the selected L1 cache set is enabled. The store request data are written into the L1 cache congruence and selected set using the store byte control flags to write only the desired bytes within the doubleword. If the directory search results in an L1 cache miss, due to a miscompare with the absolute address from the TLB, the write of the L1 cache is canceled. In either case, the store request is enqueued on the L1 store queue. The queue entry information consists of the absolute address, data, store byte flags, and store request type (non-sequential or sequential store, end-of-operation). If the store queue is empty prior to this request or the L1 store queue enqueue pointer equals the transfer pointer, and the L1/L2 interface is available, the store request is transferred to L2 immediately. Otherwise, the transfer is delayed until the L1 store queue transfer pointer selects this entry while the L1/L2 interface is available. Any prefetched instructions which succeed the current instruction are checked for modification by the store request through logical address comparison. If an equal match occurs, the instruction buffers are invalidated. L2 control receives the store request. If the L2 store queue is empty and end-of-operation is indicated with the store request, this request can be serviced immediately if selected by L2 cache priority. If the store queue is empty, but no end-of-operation is associated with the store request, it must wait on the store queue until end-of-operation is received before being allowed to enter L2 cache priority. If the L2 store queue for this processor is not empty, then this request must wait on the store queue until all preceding stores for this processor have completed to L2 cache. In any case, an entry is made on the L2 store queue for the requesting processor. The L2 cache store queue is physically divided into two portions: control and data. The absolute address and store request type are maintained in the L2 control 26k function. The associated data and store byte flags are enqueued in the L2 cache data flow function. The L2 cache priority selects this processor store request for service. L2 control 26k transfers a processor L2 cache store command and L2 cache congruence to L2 cache control and a processor L2 cache store command to memory control. As the L1 operand cache is a store-thru cache, an inpage to L1 cache is not required regardless of the original store request L1 cache hit/miss status. L2 control 26k dequeues the store request from the control portion of the L2 cache store queue for this processor. One of four conditions result from the L2 cache directory 26J search which yield an L2 cache hit.

Case 1

The search of the L2 cache directory 26J results in an L2 cache hit, but a freeze register with uncorrectable storage error indicator active or line-hold register with uncorrectable storage error indicator active is set for an alternate processor for the requested L2 cache line. L2 control 26k suspends this store request pending release of the freeze or line-hold with uncorrectable storage error. The store request is restored onto the control portion of the L2 cache store queue for this processor. Command buffer requests for this processor can still be serviced by L2 control 26k. No information is transferred to address/key. The L2 cache line status and cache set are transferred to L2 cache control, the cache set modifier is transferred to L2 cache, and the L2 cache line status is transferred to memory control. Locked status is forced due to the alternate processor freeze or line-hold with uncorrectable storage error conflict. The L1 status array compares are blocked due to the freeze or line-hold with uncorrectable storage error conflict. L2 control 26k blocks the transfer of instruction complete to the requesting processor's L1 cache due to the freeze or line-hold with uncorrectable storage error conflict. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 hit and locked, L2 cache control cancels the dequeue of the data store queue entry and the write of the L2 cache. Memory control receives the L2 command and L3 port identification. Upon receipt of the L2 cache line status, L2 hit and locked, the request is dropped.

Case 2

The search of the L2 cache directory 26J results in an L2 cache hit, but a lock register is set for an alternate processor for the requested doubleword. L2 control 26k suspends this store request pending release of the lock. The store request is restored onto the control portion of the L2 cache store queue for this processor. Command buffer requests for this processor can still be serviced by L2 control 26k. No information is transferred to address/key. The L2 cache line status and cache set are transferred to L2 cache control, the cache set modifier is transferred to L2 cache, and the L2 cache line status is transferred to memory control. Locked status is forced due to the alternate processor lock conflict. The L1 status array compares are blocked due to the lock conflict. L2 control 26k blocks the transfer of instruction complete to the requesting processor's L1 cache due to the lock conflict. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 hit and locked, L2 cache control cancels the dequeue of the data store queue entry and the write of the L2 cache. Memory control receives the L2 command and L3 port identification. Upon receipt of the L2 cache line status, L2 hit and locked, the request is dropped.

Case 3

The search of the L2 cache directory 26J results in an L2 cache hit, but an inpage freeze register with uncorrectable storage error indication is active for this processor. This situation occurs for a processor after an uncorrectable storage error has been reported for an L2 cache inpage due to a store request. The L2 cache line is marked invalid. The absolute address is transferred to address/key with a set reference and change bits command. The L2 cache line status and cache set are transferred to L2 cache control, the cache set modifier is transferred to L2 cache, and the L2 cache line status is transferred to memory control 26e. L2 control clears the command buffer request block latch, the freeze register, and the uncorrectable storage error indication associated with the freeze register as a result of the store request. All L1 status arrays, excluding the requesting processor's L1 operand cache status, are searched for copies of the modified L1 cache line. The low-order L2 cache congruence is used to address the L1 status arrays and the L2 cache set and high-order congruence are used as the comparand with the L1 status array outputs. If an equal match is found in the requesting processor's L1 instruction cache status array, the entry is cleared, and the L1 cache congruence and L1 cache set are transferred to the requesting processor for local-invalidation of the L1 cache copy after the request for the address buss has been granted by the L1. If any of the alternate processors' L1 status arrays yield a match the necessary entries are cleared in L1 status, and the L1 cache congruence and L1 cache sets, one for the L1 operand cache and one for the L1 instruction cache, are simultaneously transferred to the required alternate processors for cross-invalidation of the L1 cache copies after the request for the address buss has been granted by that L1. The L2 store access is not affected by the request for local-invalidation or cross-invalidation as L1 guarantees the granting of the required address interface in a fixed number of cycles. Note that no L1 copies should be found for this case as the store is taking place after an L2 cache miss inpage was serviced for the store request and an uncorrectable storage error was detected in the L3 line. If end-of-operation is associated with this store request, L2 control 26k transfers an instruction complete signal to the requesting processor's L1 cache to remove all L1 store queue entries associated with this instruction; the stores have completed into L2 cache. The dequeue from the L1 store queue occurs simultaneously with the last, or only, update to L2 cache. The dequeue from the L2 store queue occurs as each nonsequential store completes to L2 cache. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 hit and not locked, L2 cache control uses the L2 cache set to control the store into L2 cache and the write occurs under control of the store byte flags in what would be the second cycle of the processor L2 cache read sequence. Memory control receives the L2 command and L3 port identification. Upon receipt of the L2 cache line status, L2 hit and not locked, the request is dropped. Address/key receives the absolute address for reference and change bits updating. The reference and change bits for the 4KB page containing the L2 cache line updated by the store request are set to '1'b.

Case 4

The search of the L2 cache directory 26J results in an L2 cache hit. The L2 cache line is marked modified. The absolute address is transferred to address/key with the set reference and change bits command. The L2 cache line status and cache set are transferred to L2 cache control, the cache set modifier is transferred to L2 cache, and the L2 cache line status is transferred to memory control 26e. If the requesting processor holds a lock, the lock address is compared with the store request address. If a compare results, the lock is cleared; if a miscompare results, a machine check is set. All L1 status arrays, excluding the requesting processor's L1 operand cache status, are searched for copies of the modified L1 cache line. The low-order L2 cache congruence is used to address the L1 status arrays and the L2 cache set and high-order congruence are used as the comparand with the L1 status array outputs. If an equal match is found in the requesting processor's L1 instruction cache status array, the entry is cleared, and the L1 cache congruence and L1 cache set are transferred to the requesting processor for local-invalidation of the L1 cache copy after the request for the address buss has been granted by the L1. If any of the alternate processors' L1 status arrays yield a match the necessary entries are cleared in L1 status, and the L1 cache congruence and L1 cache sets, one for the L1 operand cache and one for the L1 instruction cache, are simultaneously transferred to the required alternate processors for cross-invalidation of the L1 cache copies after the request for the address buss has been granted by that L1.

The L2 store access is not affected by the request for local-invalidation or cross-invalidation as L1 guarantees the granting of the required address interface in a fixed number of cycles. If end-of-operation is associated with this store request, L2 control 26k transfers an instruction complete signal to the requesting processor's L1 cache to remove all L1 store queue entries associated with this instruction; the stores have completed into L2 cache. The dequeue from the L1 store queue occurs simultaneously with the last, or only, update to L2 cache. The dequeue from the L2 store queue occurs as each non-sequential store completes to L2 cache. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 hit and not locked, L2 cache control uses the L2 cache set to control the store into L2 cache and the write occurs under control of the store byte flags in what would be the second cycle of the processor L2 cache read sequence. Memory control receives the L2 command and L3 port identification. Upon receipt of the L2 cache line status, L2 hit and not locked, the request is dropped. Address/key receives the absolute address for reference and change bits updating. The reference and change bits for the 4KB page containing the L2 cache line updated by the store request are set to '1'b.

1.5 Storage Store, Non-sequential, TLB Hit, No Access Exceptions, L2 Cache Miss
See FIGS. 22-30 for time line diagrams.

The execution unit issues a non-sequential processor storage store request to the L1 operand cache. The set-associative TLB search yields an absolute address, with no access exceptions, for the logical address presented by the request. If the search of the L1 cache directory finds the data in cache, an L1 hit, through equal comparison with the absolute address from the TLB, a write to the selected L1 cache set is enabled. The store request data are written into the L1 cache congruence and selected set using the store byte control flags to write only the desired bytes within the doubleword. If the directory search results in an L1 cache miss, due to a miscompare with the absolute address from the TLB, the write of the L1 cache is canceled. In either case, the store request is enqueued on the L1 store queue. The queue entry information consists of the absolute address, data, store byte flags, and store request type (non-sequential or sequential store, end-of-operation). If the store queue is empty prior to this request or the L1 store queue enqueue pointer equals the transfer pointer, and the L1/L2 interface is available, the store request is transferred to L2 immediately. Otherwise, the transfer is delayed until the L1 store queue transfer pointer selects this entry while the L1/L2 interface is available. Any prefetched instructions which succeed the current instruction are checked for modification by the store request through logical address comparison. If an equal match occurs, the instruction buffers are invalidated. L2 control receives the store request. If the L2 store queue is empty and end-of-operation is indicated with the store request, this request can be serviced immediately if selected by L2 cache priority. If the store queue is empty, but no end-of-operation is associated with the store request, it must wait on the store queue until end-of-operation is received before being allowed to enter L2 cache priority. If the L2 store queue for this processor is not empty, then this request must wait on the store queue until all preceding stores for this processor have completed to L2 cache. In any case, an entry is made on the L2 store queue for the requesting processor. The L2 cache store queue is physically divided into two portions: control and data. The absolute address and store request type are maintained in the L2 control 26k function. The associated data and store byte flags are enqueued in the L2 cache data flow function. The L2 cache priority selects this processor store request for service. L2 control 26k transfers a processor L2 cache store command and L2 cache congruence to L2 cache control and a processor L2 cache store command to memory control. As the L1 operand cache is a store-thru cache, an inpage to L1 cache is not required regardless of the original store request L1 cache hit/miss status. L2 control 26k dequeues the store request from the control portion of the L2 cache store queue for this processor. One of three conditions result from the L2 cache directory 26J search which yield an L2 cache miss. As the L2 cache is a store-in cache, the L2 cache line must be inpaged from L3 processor storage prior to completion of the store request. The store request is suspended as a result of the L2 cache miss to allow other requests to be serviced in the L2 cache while the inpage for the requested L3 line occurs.

Case A

The search of the L2 cache directory 26J results in an L2 cache miss, but a previous L2 cache inpage is pending for this processor. L2 control 26k suspends this store request pending completion of the previous inpage request. The store request is restored onto the control portion of the L2 cache store queue for this processor. No further requests can be serviced for this processor in L2 cache as both the command buffers and store queue are pending completion of an L2 cache inpage. No information is transferred to address/key. The L2 cache line status and cache set are transferred to L2 cache control, the cache set modifier is transferred to L2 cache, and the L2 cache line status is transferred to memory control. Locked status is forced due to the previous inpage request. The L1 status array compares are blocked due to the L2 cache miss. L2 control 26k blocks the transfer of instruction complete to the requesting processor's L1 cache due to the L2 cache miss. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 miss and locked, L2 cache control cancels the dequeue of the store queue entry and the write of the L2 cache. Memory control receives the L2 command and L3 port identification. Upon receipt of the L2 cache line status, L2 miss and locked, the request is dropped.

Case B

The search of the L2 cache directory 26J results in an L2 cache miss, but a previous L2 cache inpage is pending for an alternate processor to the same L2 cache line. L2 control 26k suspends this store request pending completion of the previous inpage request. The store request is restored onto the control portion of the L2 cache store queue for this processor. Command buffer requests for this processor can still be serviced by L2 control 26k. No information is transferred to address-/key). The L2 cache line status and cache set are transferred to L2 cache control, the cache set modifier is transferred to L2 cache, and the L2 cache line status is transferred to memory control 26e. Locked status is forced due to the previous inpage freeze conflict. The L1 status array compares are blocked due to the L2 cache miss. L2 control 26k blocks the transfer of instruction complete to the requesting processor's L1 cache due to the L2 cache miss. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 miss and locked, L2 cache control cancels the dequeue of the store queue entry and the write of the L2 cache. Memory control receives the L2 command and L3 port identification. Upon receipt of the L2 cache line status, L2 miss and locked, the request is dropped.

Case C

The search of the L2 cache directory 26J results in an L2 cache miss. L2 control 26k suspends this store request and sets the processor inpage freeze register. The store request is restored onto the control portion of the L2 cache store queue for this processor. Command buffer requests for this processor can still be serviced by L2 control 26k. The absolute address is transferred to address/key. The L2 cache line status and cache set are transferred to L2 cache control, the cache set modifier is transferred to L2 cache, and the L2 cache line status is transferred to memory control 26e. The L1 status array compares are blocked due to the L2 cache miss. L2 control 26k blocks the transfer of instruction complete to the requesting processor's L1 cache due to the L2 cache miss. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 miss and not locked, L2 cache control cancels the dequeue of the store queue entry and the write of the L2 cache. Memory control receives the L2 command and L3 port identification. Upon receipt of the L2 cache line status, L2 miss and not locked, the request enters priority for the required L3 memory port. When all resources are available, including an inpage/outpage buffer pair, a command is transferred to BSU control to start the L3 fetch access for the processor. Memory control instructs L2 control 26k to set L2 directory status normally for the pending inpage. Address/key receives the absolute address. The reference bit for the 4KB page containing the requested L2 cache line is set to '1'b. The associated change bit is not altered as only an L2 cache inpage is in progress; the store access will be re-executed after the inpage completes. The absolute address is converted to an L3 physical address. The physical address is transferred to BSU control as soon as the interface is available as a result of the L2 cache miss. BSU control, upon receipt of the memory control 26e command and address/key L3 physical address, initiates the L3 memory port 128-byte fetch by transferring the command and address to processor storage and selecting the memory cards in the desired port. Data are transferred 16 bytes at a time across a multiplexed command/address and data interface with the L3 memory port. Eight transfers from L3 memory are required to obtain the 128-byte L2 cache line. The sequence of quadword transfers starts with the quadword containing the doubleword requested by the store access. The next three transfers contain the remainder of the L1 cache line. The final four transfers contain the remainder of the L2 cache line. While the last data transfer completes to the L2 cache inpage buffer BSU control raises the appropriate processor inpage complete to L2 control 26k. During the data transfers to L2 cache, address/key monitors the L3 uncorrectable error lines. Should an uncorrectable error be detected during the inpage process several functions are performed. With each quadword transfer to the L2 cache, an L3 uncorrectable error signal is transferred to the processor originally requesting the store access. At most, the processor receives one storage uncorrectable error indication for a given L2 cache inpage request, the first one detected by address/key. The doubleword address of the first storage uncorrectable error detected by address/key is recorded for the requesting processor. Should an uncorrectable storage error occur for any data in the L1 line accessed by the processor, an indicator is set for storage uncorrectable error handling. Finally, should an uncorrectable error occur for any data transferred to the L2 cache inpage buffer, address/key sends a signal to L2 control to alter the handling of the L2 cache inpage and subsequent store request. L2 cache priority selects the inpage complete for the processor for service. L2 control 26k transfers a write inpage buffer command and L2 cache congruence to L2 cache control and an inpage complete status reply to memory control 26e. One of two conditions result from the L2 cache directory 26J search.

Case 1

L2 control 26k selects an L2 cache line for replacement. In this case, the status of the replaced line reveals that it is unmodified; no castout is required. The L2 directory is updated to reflect the presence of the new L2 cache line. If no L3 storage uncorrectable error was detected on inpage to the L2 cache inpage buffer, the freeze register established for this L2 cache miss inpage is cleared. If an L3 storage uncorrectable error was detected on inpage to the L2 cache inpage buffer, the freeze register established for this L2 cache miss inpage is left active and the storage uncorrectable error indication associated with the freeze register is set; the command buffers for the processor which requested the inpage are blocked from entering L2 cache priority; all L1 cache indicators for this processor are set for storage uncorrectable error reporting. The selected L2 cache set is transferred to address/key and L2 cache control. The status of the replaced L2 cache line is transferred to L2 cache control and memory control 26e, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. L2 cache control receives the write inpage buffer command and prepares for an L2 line write to complete the L2 cache inpage, pending status from L2 control 26k. L2 cache control receives the L2 cache set and replaced line status. As the replaced line is unmodified, L2 cache control signals L2 cache that the inpage buffer is to be written to L2 cache. As this is a full line write and the cache sets are interleaved, the L2 cache set must be used to manipulate address bits 25 and 26 to permit the L2 cache line write. BSU control transfers end-of-operation to memory control 26e. Address/key receives the L2 cache set from L2 control 26k. The L2 mini directory update address register is set from the inpage address buffers and the L2 cache set received from L2 control. Memory control receives the status of the replaced line. As no castout is required, memory control 26e releases the resources held by the inpage request. Memory control transfers a command to address/key to update the L2 mini directory using the L2 mini directory update address register associated with this processor. Memory control then marks the current operation completed and allows the requesting processor to enter memory resource priority again. The original L2 store queue request now reenters the L2 cache service priority circuitry. The store access is attempted again, once selected for L2 cache service, and executed as if this is the first attempt to service the request within L2 control 26k.

Case 2

L2 control 26k selects an L2 cache line for replacement. In this case, the status of the replaced line reveals that it is modified; an L2 cache castout is required. The L2 directory is updated to reflect the presence of the new L2 cache line. If no L3 storage uncorrectable error was detected on inpage to the L2 cache inpage buffer, the freeze register established for this L2 cache miss inpage is cleared. If an L3 storage uncorrectable error was detected on inpage to the L2 cache inpage buffer, the freeze register established for this L2 cache miss inpage is left active and the storage uncorrectable error indication associated with the freeze register is set; the command buffers for the processor which requested the inpage are blocked from entering L2 cache priority; all L1 cache indicators for this processor are set for storage uncorrectable error reporting. The address read from the directory, along with the selected L2 cache set, are transferred to address/key. The selected L2 cache set is transferred to L2 cache control. The status of the replaced L2 cache line is transferred to L2 cache control and memory control 26e, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. L2 cache control receives the write inpage buffer command and prepares for an L2 line write to complete the L2 cache inpage, pending status from L2 control 26k. L2 cache control receives the L2 cache set and replaced line status. As the replaced line is modified, L2 cache control signals L2 cache that a full line read is required to the outpage buffer paired with the inpage buffer prior to writing the inpage buffer data to L2 cache. As these are full line accesses and the cache sets are interleaved, the L2 cache set must be used to manipulate address bits 25 and 26 to permit the L2 cache line accesses. Address/key receives the outpage address from L2 control 26k, converts it to a physical address, and holds it in the outpage address buffers along with the L2 cache set. The L2 mini directory update address register is set from the inpage address buffers and the L2 cache set received from L2 control. Address/key transfers the outpage physical address to BSU control in preparation for the L3 line write. Memory control receives the status of the replaced line. As a castout is required, memory control 26e cannot release the L3 resources until the memory update has completed. Castouts are guaranteed to occur to the same memory port used for the inpage. Memory control transfers a command to address/key to update the L2 mini directory using the L2 mini directory update address register associated with this processor. Memory control then marks the current operation completed and allows the requesting processor to enter memory resource priority again. The original L2 store queue request now reenters the L2 cache service priority circuitry. The store access is attempted again, once selected for L2 cache service, and executed as if this is the first attempt to service the request within L2 control 26k. BSU control, recognizing that the replaced L2 cache line is modified, starts the castout sequence after receiving the outpage address from address/key by transferring a full line write command and address to the selected memory port through the L2 cache data flow. Data are transferred from the outpage buffer to memory 16 bytes at a time. After the last quadword transfer to memory, BSU control transfers end-of-operation to memory control 26e. Memory control, upon receipt of end-of-operation from BSU control, releases the L3 port to permit overlapped access to the memory port.

1.6 Storage Store, Sequential, Initial L2 Line Access, TLB Hit, No Access Exceptions, L2 Cache Hit
See FIGS. 31-35 for time line diagrams.

The execution unit issues a sequential processor storage store request to the L1 operand cache. The set-associative TLB search yields an absolute address, with no access exceptions, for the logical address presented by the request. If the search of the L1 cache directory finds the data in cache, an L1 hit, through equal comparison with the absolute address from the TLB, a write to the selected L1 cache set is enabled. The store request data are written into the L1 cache congruence and selected set using the store byte control flags to write only the desired bytes within the doubleword. If the directory search results in an L1 cache miss, due to a miscompare with the absolute address from the TLB, the write of the L1 cache is canceled. In either case, the store request is enqueued on the L1 store queue. The queue entry information consists of the absolute address, data, store byte flags, and store request type (non-sequential or sequential store, end-of-operation). If the store queue is empty prior to this request or the L1 store queue enqueue pointer equals the transfer pointer, and the L1/L2 interface is available, the store request is transferred to L2 immediately. Otherwise, the transfer is delayed until the L1 store queue transfer pointer selects this entry while the L1/L2 interface is available. Any prefetched instructions which succeed the current instruction are checked for modification by the store request through logical address comparison. If an equal match occurs, the instruction buffers are invalidated. L2 control receives the store request. If the sequential store routine has not been started, then this request is the initial sequential store access as well as the initial store access to the L2 cache line. If the initial sequential store request has been serviced and a sequential operation is in progress, this represents the initial store access to a new L2 cache line in the sequential store routine. If the L2 store queue is empty, this request can be serviced immediately if selected by L2 cache priority. If the L2 store queue for this processor is not empty, then this request must wait on the store queue until all preceding stores for this processor have completed to L2 cache or the L2 cache write buffers. In either case, an entry is made on the L2 store queue for the requesting processor. The L2 cache store queue is physically divided into two portions: control and data. The absolute address and store request type are maintained in the L2 control 26k function. The associated data and store byte flags are enqueued in the L2 cache data flow function. If this store request is the start of a sequential store operation, L2 control 26k must check the L2 cache directory 26J for the presence of the line in L2 cache. If a sequential operation is in progress for this processor, comparison of address bits 24, 25, 27, and 28 with those of the previous sequential store request for this processor has detected absolute address bit 24 of this store request differs from that of the previous store request. This store request is to a different L2 cache line. As such, L2 control 26k must check the L2 cache directory 26J for the presence of this line in L2 cache. No repeat command is transferred to L2 cache control and no information is immediately transferred to address/key and memory control 26e. As this is not the first line to be accessed by the sequential store operation, L2 control 26k checks the status of the previous sequentially accessed L2 cache line. If the previous line is not resident in L2 cache, L2 control 26k holds sequential processing on the current line until the inpage completes. Otherwise, L2 control 26k can continue sequential stores to the current L2 cache line. See the description of 'Sequential, Secondary L2 Line Accesses'. The L2 cache priority selects this processor store request for service. L2 control 26k transfers a store to L2 cache write buffer command and L2 cache congruence to L2 cache control and a processor L2 cache store command to memory control 26e. As the L1 operand cache is a store-thru cache, an inpage to L1 cache is not required regardless of the original store request L1 cache hit/miss status. L2 control 26k dequeues the store request from the control portion of the L2 store queue to allow overlapped processing of subsequent sequential store requests to the same L2 cache line. L2 control 26k recognizes that this store request is the start of a new L2 cache line within the sequential store operation. If this store request is the start of a sequential store operation, L2 control 26k sets the sequential operation in-progress indicator for this processor. Store queue request absolute address bits 24, 25, 27, and 28 are saved for future reference in the sequential store routine. If an alternate processor lock conflict is detected, it is ignored as the data are destined to the L2 cache write buffers for the requesting processor, not L2 cache. If the requesting processor holds a lock, a machine check is set. One of two conditions result. from the L2 cache directory 26J search which yield an L2 cache hit.

Case 1

The search of the L2 cache directory 26J results in an L2 cache hit, but a freeze register with uncorrectable storage error indicator active or line-hold register with uncorrectable storage error indicator active is set for an alternate processor for the requested L2 cache line. L2 control 26k suspends this store request and succeeding sequential store requests pending release of the freeze or line-hold with uncorrectable storage error. The store request is restored onto the control portion of the L2 cache store queue for this processor. Command buffer requests for this processor can still be serviced by L2 control 26k. No information is transferred to address-/key. The L2 cache line status and cache set are transferred to L2 cache control, the cache set modifier is transferred to L2 cache, and the L2 cache line status is transferred to memory control 26e. Locked status is forced due to the alternate processor freeze or line-hold with uncorrectable storage error conflict. The L1 status array compares are blocked due to the sequential store operation being in progress. L2 control 26k does not transfer instruction complete to the requesting processor's L1 cache due to the sequential store operation being in progress. L2 cache control receives the store to L2 cache write buffer command and L2 cache congruence and starts the access to L2 cache. L2 cache control transfers the command to L2 data flow to dequeue the oldest entry from the L2 store queue and write into the next L2 cache write buffer. Upon receipt of the L2 cache line status, L2 hit and locked, L2 cache control cancels the dequeue of the data store queue entry and the write of the L2 cache write buffer. Memory control receives the L2 command and L3 port identification. Upon receipt of the L2 cache line status, L2 hit and locked, the request is dropped.

Case 2

The search of the L2 cache directory 26J results in an L2 cache hit. The L2 cache line is not marked modified. No information is transferred to address/key. The L2 cache line status and cache set are transferred to L2 cache control, the cache set modifier is transferred to L2 cache, and the L2 cache line status is transferred to memory control. A line-hold, comprised of absolute address bits 4:24 and the L2 cache set, is established for the L2 cache line to be modified by this store request. Absolute address bit 25 is used to record whether this store request modifies the high half-line or low half-line of the L2 cache line. Bit 25 equal to '0'b sets the high half-line modifier of the current line-hold register; bit 25 equal to '1'b sets the low half-line modifier. The L1 status array compares are blocked due to the sequential store operation being in progress. L2 control 26k does not transfer instruction complete to the requesting processor's L1 cache due to the sequential store operation being in progress. L2 cache control receives the store to L2 cache write buffer command and L2 cache congruence and starts the access to L2 cache. L2 cache control transfers the command to L2 data flow to dequeue the oldest entry from the L2 store queue and write into the next L2 cache write buffer. Upon receipt of the L2 cache line status, L2 hit and not locked, L2 cache control completes the store to the L2 cache write buffer, loading the data and store byte flags, address-aligned, into the write buffer for the requesting processor. The L2 cache congruence is saved for subsequent sequential store requests associated with this operation and L2 cache write buffer in L2 data flow. For this portion of the sequential store operation, the cache set is not required, but pipeline stages force the store queue data to be moved into the L2 cache write buffer in a manner consistent with non-sequential store requests. The data store queue entry is dequeued from the L2 store queue, but not the L1 store queue, at the time the data are written into the L2 cache write buffer. Memory control receives the L2 command and L3 port identification. Upon receipt of the L2 cache line status, L2 hit and not locked, the request is dropped.

1.7 Storage Store, Sequential, Initial L2 Line Access, TLB Hit, No Access Exceptions, L2 Cache Miss See FIGS. 36-44 for time line diagrams.

The execution unit issues a sequential processor storage store request to the L1 operand cache. The set-associative TLB search yields an absolute address, with no access exceptions, for the logical address presented by the request. If the search of the L1 cache directory finds the data in cache, an L1 hit, through equal comparison with the absolute address from the TLB, a write to the selected L1 cache set is enabled. The store request data are written into the L1 cache congruence and selected set using the store byte control flags to write only the desired bytes within the doubleword. If the directory search results in an L1 cache miss, due to a miscompare with the absolute address from the TLB, the write of the L1 cache is canceled. In either case, the store request is enqueued on the L1 store queue. The queue entry information consists of the absolute address, data, store byte flags, and store request type (non-sequential or sequential store, end-of-operation). If the store queue is empty prior to this request or the L1 store queue enqueue pointer equals the transfer pointer, and the L1/L2 interface is available, the store request is transferred to L2 immediately. Otherwise, the transfer is delayed until the L1 store queue transfer pointer selects this entry while the L1/L2 interface is available. Any prefetched instructions which succeed the current instruction are checked for modification by the store request through logical address comparison. If an equal match occurs, the instruction buffers are invalidated. L2 control receives the store request. If the sequential store routine has not been started, then this request is the initial sequential store access as well as the initial store access to the L2 cache line. If the initial sequential store request has been serviced and a sequential operation is in progress, this represents the initial store access to a new L2 cache line in the sequential store routine. If the L2 store queue is empty, this request can be serviced immediately if selected by L2 cache priority. If the L2 store queue for this processor is not empty, then this request must wait on the store queue until all preceding stores for this processor have completed to L2 cache or the L2 cache write buffers. In either case, an entry is made on the L2 store queue for the requesting processor. The L2 cache store queue is physically divided into two portions: control and data. The absolute address and store request type are maintained in the L2 control 26k function. The associated data and store byte flags are enqueued in the L2 cache data flow function. If this store request is the start of a sequential store operation, L2 control 26k must check the L2 cache directory 26J for the presence of the line in L2 cache. If a sequential operation is in progress for this processor, comparison of address bits 24, 25, 27, and 28 with those of the previous sequential store request for this processor has detected absolute address bit 24 of this store request differs from that of the previous store request. This store request is to a different L2 cache line. As such, L2 control 26k must check the L2 cache directory 26J for the presence of this line in L2 cache. No repeat command is transferred to L2 cache control and no information is immediately transferred to address/key and memory control 26e. As this is not the first line to be accessed by the sequential store operation, L2 control 26k checks the status of the previous sequentially accessed L2 cache line. If the previous line is not resident in L2 cache, L2 control 26k holds sequential processing on the current line until the inpage completes. Otherwise, L2 control 26k can continue sequential stores to the current L2 cache line. See the description of 'Sequential, Secondary L2 Line Accesses'. The L2 cache priority selects this processor store request for service. L2 control 26k transfers a store to L2 cache write buffer command and L2 cache congruence to L2 cache control and a processor L2 cache store command to memory control 26e. As the L1 operand cache is a store-thru cache, an inpage to L1 cache is not required regardless of the original store request L1 cache hit/miss status. L2 control 26k dequeues the store request from the control portion of the L2 store queue to allow overlapped processing of subsequent sequential store requests to the same L2 cache line. One of three conditions result from the L2 cache directory 26J search which yield an L2 cache miss. As the L2 cache is a store-in cache, the L2 cache line must be inpaged from L3 processor storage prior to the start of the sequential store completion routine.

Case A

The search of the L2 cache directory 26J results in an L2 cache miss, but a previous L2 cache inpage is pending for this processor. L2 control 26k suspends this store request and succeeding sequential store requests pending completion of the previous inpage request. The store request is restored onto the control portion of the L2 cache store queue for this processor. No further requests can be serviced for this processor in L2 cache as both the command buffers and the store queue are pending completion of an L2 cache inpage. No information is transferred to address/key. The L2 cache line status and cache set are transferred to L2 cache control, the cache set modifier is transferred to L2 cache, and the L2 cache line status is transferred to memory control. Locked status is forced due to the previous inpage request. The L1 status array compares are blocked due to the sequential store operation being in progress. L2 control does not transfer instruction complete to the requesting processor's L1 cache due to the sequential store operation being in progress. L2 cache control receives the store to L2 cache write buffer command and L2 cache congruence and starts the access to L2 cache. L2 cache control transfers the command to L2 data flow to dequeue the oldest entry from the L2 store queue and write into the next L2 cache write buffer. Upon receipt of the L2 cache line status, L2 miss and locked, L2 cache control cancels the dequeue of the data store queue entry and the write of the L2 cache write buffer. Memory control receives the L2 command and L3 port identification. Upon receipt of the L2 cache line status, L2 miss and locked, the request is dropped.

Case B

The search of the L2 cache directory 26J results in an L2 cache miss, but a previous L2 cache inpage is pending for an alternate processor to the same L2 cache line. L2 control 26k suspends this store request and succeeding sequential store requests pending completion of the previous inpage request. The store request is restored onto the control portion of the L2 cache store queue for this processor. Command buffer requests for this processor can still be serviced by L2 control. No information is transferred to address/key. The L2 cache line status and cache set are transferred to L2 cache control, the cache set modifier is transferred to L2 cache, and the L2 cache line status is transferred to memory control. Locked status is forced due to the previous inpage freeze conflict. The L1 status array compares are blocked due to the sequential store operation being in progress. L2 control does not transfer instruction complete to the requesting processor's L1 cache due to the sequential store operation being in progress. L2 cache control receives the store to L2 cache write buffer command and L2 cache congruence and starts the access to L2 cache. L2 cache control transfers the command to L2 data flow to dequeue the oldest entry from the L2 store queue and write into the next L2 cache write buffer. Upon receipt of the L2 cache line status, L2 miss and locked, L2 cache control cancels the dequeue of the data store queue entry and the write of the L2 cache write buffer. Memory control receives the L2 command and L3 port identification. Upon receipt of the L2 cache line status, L2 miss and locked, the request is dropped.

Case C

The search of the L2 cache directory 26J results in an L2 cache miss. To permit sequential store processing to overlap the servicing of the L2 cache miss, L2 control 26k does not suspend this store request, but does set the processor inpage freeze register. Both command buffer requests, and sequential store requests for the current L2 cache line, can be serviced by L2 control 26k for this processor. The absolute address is transferred to address/key. The L2 cache line status and cache set are transferred to L2 cache control, the cache set modifier is transferred to L2 cache, and the L2 cache line status is transferred to memory control 26e. If this store request is the start of a sequential store operation, L2 control 26k sets the sequential operation in-progress indicator for this processor. Store queue request absolute address bits 24, 25, 27, and 28 are saved for future reference in the sequential store routine. A line-hold, comprised of absolute address bits 4:24 and the L2 cache set, is established for the L2 cache line to be modified by this store request. Absolute address bit 25 is used to record whether this store request modifies the high half-line or low half-line of the L2 cache line. Bit 25 equal to '0'b sets the high half-line modifier of the current line-hold register; bit 25 equal to '1'b sets the low half-line modifier. The L1 status array compares are blocked due to the sequential store operation being in progress. L2 control 26k does not transfer instruction complete to the requesting processor's L1 cache due to the sequential store operation being in progress. L2 cache control receives the store to L2 cache write buffer command and L2 cache congruence and starts the access to L2 cache. L2 cache control transfers the command to L2 data flow to dequeue the oldest entry from the L2 store queue and write into the next L2 cache write buffer. Upon receipt of the L2 cache line status, L2 miss and not locked, L2 cache control completes the store to the L2 cache write buffer, loading the data and store byte flags, address-aligned, into the write buffer for the requesting processor. The L2 cache congruence is saved for subsequent sequential store requests associated with this operation and L2 cache write buffer in L2 data flow. For this portion of the sequential store operation, the cache set is not required, but pipeline stages force the store queue data to be moved into the L2 cache write buffer in a manner consistent with non-sequential store requests. The data store queue entry is dequeued from the L2 store queue, but not the L1 store queue, at the time the data are written into the L2 cache write buffer Memory control receives the L2 command and L3 port identification. Upon receipt of the L2 cache line status, L2 miss and not locked, the request enters priority for the required L3 memory port. When all resources are available, including an inpage/outpage buffer pair, a command is transferred to BSU control to start the L3 fetch access for the processor. Memory control instructs L2 control to set L2 directory status normally for the pending inpage. Address/key receives the absolute address. The reference bit for the 4KB page containing the requested L2 cache line is set to '1'b. The associated change bit is not altered as only an L2 cache inpage is in progress; the store access will be executed during the sequential store completion routine. The absolute address is converted to an L3 physical address. The physical address is transferred to BSU control as soon as the interface is available as a result of the L2 cache miss. BSU control, upon receipt of the memory control 26e command and address/key L3 physical address, initiates the L3 memory port 128-byte fetch by transferring the command and address to processor storage and selecting the memory cards in the desired port. Data are transferred 16 bytes at a time across a multiplexed command/address and data interface with the L3 memory port. Eight transfers from L3 memory are required to obtain the 128-byte L2 cache line. The sequence of quadword transfers starts with the quadword containing the doubleword requested by the store access. The next three transfers contain the remainder of the L1 cache line. The final four transfers contain the remainder of the L2 cache line. While the last data transfer completes to the L2 cache inpage buffer BSU control raises the appropriate processor inpage complete to L2 control 26k. During the data transfers to L2 cache, address/key monitors the L3 uncorrectable error lines. Should an uncorrectable error be detected during the inpage process several functions are performed. With each quadword transfer to the L2 cache, an L3 uncorrectable error signal is transferred to the processor originally requesting the store access. At most, the processor receives one storage uncorrectable error indication for a given L2 cache inpage request, the first one detected by address/key. The doubleword address of the first storage uncorrectable error detected by address/key is recorded for the requesting processor. Should an uncorrectable storage error occur for any data in the L1 line accessed by the processor, an indicator is set for storage uncorrectable error handling. Finally, should an uncorrectable error occur for any data transferred to the L2 cache inpage buffer, address/key sends a signal to L2 control 26k to alter the handling of the L2 cache inpage and subsequent sequential store completion routine. L2 cache priority selects the inpage complete for the processor for service. L2 control 26k transfers a write inpage buffer command and L2 cache congruence to L2 cache control and an inpage complete status reply to memory control 26e. One of two conditions result from the L2 cache directory 26J search.

Case 1

L2 control 26k selects an L2 cache line for replacement. In this case, the status of the replaced line reveals that it is unmodified; no castout is required. The L2 directory is updated to reflect the presence of the new L2 cache line. The freeze register established for this L2 cache miss inpage is cleared. If an L3 storage uncorrectable error was detected on inpage to the L2 cache inpage buffer, the uncorrectable storage error indicator associated with the line-hold register related to this L2 cache miss inpage is set; all L1 cache indicators for this processor are set for storage uncorrectable error reporting. The selected L2 cache set is transferred to address-/key and L2 cache control. The status of the replaced L2 cache line is transferred to L2 cache control and memory control 26e, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. L2 cache control receives the write inpage buffer command and prepares for an L2 line write to complete the L2 cache inpage, pending status from L2 control 26k. L2 cache control receives the L2 cache set and replaced line status. As the replaced line is unmodified, L2 cache control signals L2 cache that the inpage buffer is to be written to L2 cache. As this is a full line write and the cache sets are interleaved, the L2 cache set must be used to manipulate address bits 25 and 26 to permit the L2 cache line write. BSU control transfers end-of-operation to memory control 26e. Address/key receives the L2 cache set from L2 control 26k. The L2 mini directory update address register is set from the inpage address buffers and the L2 cache set received from L2 control. Memory control receives the status of the replaced line. As no castout is required, memory control 26e releases the resources held by the inpage request. Memory control transfers a command to address/key to update the L2 mini directory using the L2 mini directory update address register associated with this processor. Memory control then marks the current operation completed and allows the requesting processor to enter memory resource priority again.

Case 2

L2 control 26k selects an L2 cache line for replacement. In this case, the status of the replaced line reveals that it is modified; an L2 cache castout is required. The L2 directory is updated to reflect the presence of the new L2 cache line. The freeze register established for this L2 cache miss inpage is cleared. If an L3 storage uncorrectable error was detected on inpage to the L2 cache inpage buffer, the uncorrectable storage error indicator associated with the line-hold register related to this L2 cache miss inpage is set; all L1 cache indicators for this processor are set for storage uncorrectable error reporting. The address read from the directory, along with the selected L2 cache set, are transferred to address/key. The selected L2 cache set is transferred to L2 cache control. The status of the replaced L2 cache line is transferred to L2 cache control and memory control 26e, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. L2 cache control receives the write inpage buffer command and prepares for an L2 line write to complete the L2 cache inpage, pending status from L2 control 26k. L2 cache control receives the L2 cache set and replaced line status. As the replaced line is modified, L2 cache control signals L2 cache that a full line read is required to the outpage buffer paired with the inpage buffer prior to writing the inpage buffer data to L2 cache. As these are full line accesses and the cache sets are interleaved, the L2 cache set must be used to manipulate address bits 25 and 26 to permit the L2 cache line accesses. Address/key receives the outpage address from L2 control 26k, converts it to a physical address, and holds it in the outpage address buffers along with the L2 cache set. The L2 mini directory update address register is set from the inpage address buffers and the L2 cache set received from L2 control. Address/key transfers the outpage physical address to BSU control in preparation for the L3 line write. Memory control receives the status of the replaced line. As a castout is required, memory control 26e cannot release the L3 resources until the memory update has completed. Castouts are guaranteed to occur to the same memory port used for the inpage. Memory control transfers a command to address/key to update the L2 mini directory using the L2 mini directory update address register associated with this processor. Memory control then marks the current operation completed and allows the requesting processor to enter memory resource priority again. BSU control, recognizing that the replaced L2 cache line is modified, starts the castout sequence after receiving the outpage address from address/key by transferring a full line write command and address to the selected memory port through the L2 cache data flow. Data are transferred from the outpage buffer to memory 16 bytes at a time. After the last quadword transfer to memory, BSU control transfers end-of-operation to memory control 26e. Memory control, upon receipt of end-of-operation from BSU control, releases the L3 port to permit overlapped access to the memory port.

1.8 Storage Store, Sequential, Secondary L2 Line Access, TLB Hit, No Access Exceptions See FIGS. 45-49 for time line diagrams.

The execution unit issues a sequential processor storage store request to the L1 operand cache. The set-associative TLB search yields an absolute address, with no access exceptions, for the logical address presented by the request. If the search of the L1 cache directory finds the data in cache, an L1 hit, through equal comparison with the absolute address from the TLB, a write to the selected L1 cache set is enabled. The store request data are written into the L1 cache congruence and selected set using the store byte control flags to write only the desired bytes within the doubleword. If the directory search results in an L1 cache miss, due to a miscompare with the absolute address from the TLB, the write of the L1 cache is canceled. In either case, the store request is enqueued on the L1 store queue. The queue entry information consists of the absolute address, data, store byte flags, and store request type (non-sequential or sequential store, end-of-operation). If the L1 store queue enqueue pointer equals the transfer pointer and the L1/L2 interface is available, the store request is transferred to L2 immediately. Otherwise, the transfer is delayed until the L1 store queue transfer pointer selects this entry while the L1/L2 interface is available. Any prefetched instructions which succeed the current instruction are checked for modification by the store request through logical address comparison. If an equal match occurs, the instruction buffers are invalidated. L2 control 26k receives the store request. If the initial sequential store request has been serviced and a sequential operation is in progress, this and succeeding store requests are given special consideration. If the L2 store queue is empty, this request can be serviced immediately by a special sequential store operation sequencer exclusive to this processor. If the L2 store queue for this processor is not empty, then this request must wait on the store queue until all preceding stores for this processor have completed to the L2 cache write buffers. In either case, an entry is made on the L2 store queue for the requesting processor. The L2 cache store queue is physically divided into two portions: control and data. The absolute address and store request type are maintained in the L2 control 26k function. The associated data and store byte flags are enqueued in the L2 cache data flow function. L2 control 26k, recognizing that a sequential operation is in progress for this processor, compares address bits 24, 25, 27, and 28 with those of the previous sequential store request for this processor. Absolute address bit 24 of this store request matches that of the previous store request. This store request is to the same L2 cache line. As such, this store queue request can be serviced regardless of whether the L2 cache line presently exists in L2 cache as the L2 cache and its directory are not involved in the dequeue. The store queue request is serviced and the request is dequeued from the control portion of the L2 cache store queue for this processor. If absolute address bit 25 equals '1'b, the low half-line modifier of the current line-hold register is set to '1'b, indicating that this half-line is modified. L2 control transfers one of three commands, on an interface specifically allocated for this processor, to L2 cache control based on the difference between address bits 27 and 28 of this sequential store request and those of the previous store request. The command is repeat with no address increment if the difference is '00'b, repeat and increment by 8 if the difference is '01'b, and repeat and increment by 16 if the difference is '10'b. Store queue request absolute address bits 24, 25, 27, and 28 are saved for future reference in the sequential store routine and the store queue entry is dequeued, allowing the next entry to be serviced in the following cycle. L2 control 26k transfers no information to address/key or memory control 26e. L2 cache control transfers the command to L2 data flow to dequeue the oldest entry from the L2 store queue using the most recently supplied L2 cache congruence for this processor, with the address adjusted as specified by L2 control 26k. The data and store byte flags are written, address-aligned, into the L2 cache write buffers for the requesting processor. For this portion of the sequential store operation, the cache set is not required, but pipeline stages force the store queue data to be moved into the L2 cache write buffer in a manner consistent with non-sequential store requests. The data store queue entry is dequeued from the L2 store queue, but not the L1 store queue, at the time the data are written into the L2 cache write buffer.

1.9 Storage Store, Sequential, Completion Routine, L2

Cache Hit

The sequential store completion routine is a series of commands generated by L2 control 26k which cause the L2 cache write buffers for a processor to be written to L2 cache. This is normally started by the receipt of end-of-operation for the instruction executing the sequential stores. End-of-operation can be associated with the last sequential store request of a sequential operation or it may be transferred later, as a separate end-of-operation storage command for this processor. In either case, once detected by L2 control 26k for a sequential store operation, the sequential operation sequencer for this processor starts the completion routine. The sequential operation sequencer checks all active line-holds against the locks of the alternate processors and verifies that all required L2 cache lines are resident in cache. If any lock conflicts exist or any L2 cache miss is outstanding for the sequential store operation, the sequential operation completion routine is held pending. If no lock conflicts exist and the required lines are resident in L2 cache, the sequential operation completion routine enters L2 control 26k priority. The L2 cache priority selects this sequential store operation completion request for service. Recognizing the number of active line-holds, L2 control 26k holds the L2 cache exclusive to this request for a contiguous number of cycles necessary to complete all L2 cache line writes associated with the line-hold registers. This routine finishes the sequential operation by storing all valid L2 cache write buffer contents to L2 cache with consecutive store L2 cache write buffer to L2 cache commands. The following sequence is executed up to three times, depending on the number of valid line-hold registers associated with the sequential store operation. L2 control 26k transfers a store L2 cache write buffer to L2 cache command and the L2 cache congruence, taken from the line-hold register, to L2 cache control. L2 control transfers an L2 cache store command to memory control. One of two conditions result from the L2 cache directory search which yield an L2 cache hit.

Case 1

The search of the L2 cache directory 26J results in an L2 cache hit, but the uncorrectable storage error indicator associated with the line-hold register is active. This situation occurs for a processor after an uncorrectable storage error has been reported for an L2 cache inpage due to a sequential store request. The L2 cache line is marked invalid. The absolute address is transferred to address/key with a set reference and change bits command. The L2 cache line status and cache set are transferred to L2 cache control, the cache set modifier is transferred to L2 cache, and the L2 cache line status is transferred to memory control. The line-hold register associated with this L2 cache line of the sequential store operation is cleared and the corresponding uncorrectable storage error indicator is reset. All L1 status arrays, excluding the requesting processor's L1 operand cache status, are searched for copies of the modified L2 cache half-lines under control of the half-line modifiers from the associated line-hold register. The low-order L2 cache congruence is used to address the L1 status arrays and the L2 cache set and high-order congruence are used as the comparand with the L1 status array outputs. If an equal match is found in the requesting processor's L1 instruction cache status array, the necessary entries are cleared, and the L1 cache congruence and L1 cache sets are transferred to the requesting processor for local-invalidation of the L1 instruction cache copies after the request for the address buss has been granted by the L1. If any of the alternate processors' L1 status arrays yield a match the necessary entries are cleared in L1 status, and the L1 cache congruence and L1 cache sets, two for the L1 operand cache and two for the L1 instruction cache, are simultaneously transferred to the required alternate processors for cross-invalidation of the L1 cache copies after the request for the address buss has been granted by that L1. The L2 store access is not affected by the request for local-invalidation or cross-invalidation as L1 guarantees the granting of the required address interface in a fixed number of cycles. L2 control 26k transfers an instruction complete signal to the requesting processor's L1 cache to remove all entries associated with the sequential store with the last store L2 cache write buffer to L2 cache command in the completion routine; all associated stores have completed into L2 cache. The dequeue from the L1 store queue and the release of the L2 cache write buffers occur simultaneously with the final update of the L2 cache. L2 cache control receives the store L2 cache write buffer to L2 cache command and L2 cache congruence and starts the access to L2 cache. L2 cache control transfers the command to L2 data flow to store the required L2 cache write buffer contents into L2 cache. Upon receipt of the L2 cache line status, L2 hit and not locked, L2 cache control uses the L2 cache set to control the store into L2 cache, manipulating address bits 25 and 26 to accomplish the full line write. The write occurs under control of the L2 cache write buffer store byte flags in two cycles: the update to quadwords zero and one (32 bytes) occurs in the first cycle; in the second cycle, the remaining quadwords (96 bytes) in the L2 cache line are updated. Memory control receives the L2 command and L3 port identification. Upon receipt of the L2 cache line status, L2 hit and not locked, the request is dropped. Address/key receives the absolute address for reference and change bits updating. The reference and change bits for the 4KB page containing the L2 cache line updated by the store request are set to '1'b.

Case 2

The search of the L2 cache directory 26J results in an L2 cache hit. The L2 cache line is marked modified. The absolute address is transferred to address/key with a set reference and change bits command. The L2 cache line status and cache set are transferred to L2 cache control, the cache set modifier is transferred to L2 cache, and the L2 cache line status is transferred to memory control 26e. The line-hold register associated with this L2 cache line of the sequential store operation is cleared. All L1 status arrays, excluding the requesting processor's L1 operand cache status, are searched for copies of the modified L2 cache half-lines under control of the half-line modifiers from the associated line-hold register. The low-order L2 cache congruence is used to address the L1 status arrays and the L2 cache set and high-order congruence are used as the comparand with the L1 status array outputs. If an equal match is found in the requesting processor's L1 instruction cache status array, the necessary entries are cleared, and the L1 cache congruence and L1 cache sets are transferred to the requesting processor for local-invalidation of the L1 instruction cache copies after the request for the address buss has been granted by the L1. If any of the alternate processors' L1 status arrays yield a match the necessary entries are cleared in L1 status, and the L1 cache congruence and L1 cache sets, two for the L1 operand cache and two for the L1 instruction cache, are simultaneously transferred to the required alternate processors for cross-invalidation of the L1 cache copies after the request for the address buss has been granted by that L1. The L2 store access is not affected by the request for local-invalidation or cross-invalidation as L1 guarantees the granting of the required address interface in a fixed number of cycles. L2 control 26k transfers an instruction complete signal to the requesting processor's L1 cache to remove all entries associated with the sequential store with the last store L2 cache write buffer to L2 cache command in the completion routine; all associated stores have completed into L2 cache. The dequeue from the L1 store queue and the release of the L2 cache write buffers occur simultaneously with the final update of the L2 cache. L2 cache control receives the store L2 cache write buffer to L2 cache command and L2 cache congruence and starts the access to L2 cache. L2 cache control transfers the command to L2 data flow to store the required L2 cache write buffer contents into L2 cache. Upon receipt of the L2 cache line status, L2 hit and not locked, L2 cache control uses the L2 cache set to control the store into L2 cache, manipulating address bits 25 and 26 to accomplish the full line write. The write occurs under control of the L2 cache write buffer store byte flags in two cycles: the update to quadwords zero and one (32 bytes) occurs in the first cycle; in the second cycle, the remaining quadwords (96 bytes) in the L2 cache line are updated. Memory control receives the L2 command and L3 port identification. Upon receipt of the L2 cache line status, L2 hit and not locked, the request is dropped. Address/key receives the absolute address for reference and change bits updating. The reference and change bits for the 4KB page containing the L2 cache line updated by the store request are set to '1'b.

The invention being thus described, it should be obvious that the same may be varied in many ways. Such variations are not to be regarded as a departure from the spirit and scope of the invention, all all such modifications as world be obvious to one skilled in the art are intended to be included within the scope of the following claims.

I claim:

1. In a multiprocessor system having a plurality of processors including a first processor and at least one second processor, a first level cache connected to each processor, a single second level cache connected to each first level cache and shared by the processors, and a third level main memory connected to the second level cache, a system for queuing and buffering data and/or instructions, comprising:

a first level store queue means associated with each processor and having an input connected to its corresponding processor and connected to an input of its corresponding first level cache for receiving said data and/or instructions from said its corresponding processor intended for potential storage in said its corresponding first level cache and for queuing said data and/or instructions therein simultaneously with in its corresponding first level cache, each of the first level store queue means having outputs; and a plurality of second level store queue means each of which is associated with a first level store queue means and interconnected between the output of such associated first level store queue means and an input of the single second level cache for receiving said data and/or instructions from said first level store queue means and for queuing said data and/or instructions therein prior to storage of said data and/or instruction in said second level cache, said first and second level store queues temporarily holding data and/or instructions to prevent the first processor from delaying its execution of additional instructions due to the second level cache being being busy with a store operation associated with a second processor.

2. In a multiprocessor system having a plurality of processors including a first processor and at least one second processor, a first level cache connected to each processor, a single second level cache connected to each first level cache and shared by the processors, and a third level main memory connected to the second level cache, a system for queuing and buffering data and/or instructions, comprising:

a first level store queue means associated with each processor and having an input connected to its corresponding processor and connected to an input of its corresponding first level cache for receiving said data and/or instructions from said its corresponding processor intended for potential storage in said its corresponding first level cache and for queuing said data and/or instructions therein, each of the first level store queue means having outputs;

a plurality of second level store queue means each of which is associated with a first level store queue means and interconnected between the output of such associated first level store queue means and an input of the single second level cache for receiving said data and/or instructions from said first level store queue means and for queuing said data and/or instructions therein prior to storage of said data and/or instruction in said second level cache; and wherein each said second level store queue means comprise a queue means connected to the output of its first level store queue means for receiving said data and/or instructions from said its respective first level store queue means and initially storing said data and/or instructions therein; and write buffer and control means connected to an output of said queue means for receiving said data and/or instructions stored in said queue means and for secondarily storing at least some of said data and/or instructions therein, said at least some of said data and/or instructions stored in said write buffer and control means being stored in said second level cache when said second level cache is not busy and allows the storage of said data and/or instructions therein.

3. The system of claim 2, wherein said at least some of said data and/or instructions are stored sequentially in said second level cache from said write buffer and control means.

4. The system of claim 3, wherein certain of said data and/or instructions are allowed write access to said second level cache directly from said queue means.

5. The system of claim 2, further comprising:

addressing means interconnected between each of said second level store queue means and the single shared second level cache for addressing said second level cache, said data and/or instructions stored in a said second level store queue means being stored in said single second level cache in response to the addressing thereof by said addressing means; and buffer means connected to an output of said second level cache for storing said data and/or instructions therein when said data and/or instructions are read out of said second level cache, said data and/or instructions stored in said buffer means of one processor invalidating corresponding obsolete entries of said data and/or instructions in the first level caches of other processors, the invalidation being accomplished before any of said other processors have access to said corresponding obsolete entries of said data and/or instructions.

6. The system of claim 2, wherein each of the first level store queue means comprise an address field means for storing an absolute address.

7. In a multiprocessor system having a plurality of processors including a first processor and at least one second processor, a first level cache connected to each processor, a single second level cache connected to each first level cache and shared by the processors, and a third level main memory connected to the second level cache, a system for queuing and buffering data and/or instructions, comprising:

a first level store queue means associated with each processor and having an input connected to its corresponding processor and connected to an input of its corresponding first level cache for receiving said data and/or instructions from said its corresponding processor intended for potential storage in said its corresponding first level cache and for queuing said data and/or instructions therein, each of the first level store queue means having outputs and address field means for storing an absolute address;

a plurality of second level store queue means each of which is associated with a first level store queue means and interconnected between the output of such associated first level store queue means and an input of the single second level cache for receiving said data and/or instructions from said first level store queue means and for queuing said data and/or instructions therein prior to storage of said data and/or instruction in said second level cache;

starting field absolute address register means connected to the address field means of each of said first level store queue means for storing a starting absolute address therein representing an initial absolute address associated with a first of said data and/or instructions to be stored in said first level store queue means; and ending field absolute address register means connected to the address field means of each of said first level store queue means for storing an ending absolute address therein representing the last absolute address associated with a final one of said data and/or instructions to be stored in said first level store queue means.

8. The system of claim 5, wherein each of said queue means of each said second level store queue means comprise:

an address field means for storing an absolute address of said data and/or instructions within said second level cache, a data field means for storing said data and/or instructions, and store byte flag field means for storing store byte flags indicative of specific locations at said absolute address within said second level cache wherein said data and/or instructions is stored.

9. The system of claim 8, wherein each said write buffer and control means further comprises:

control means including a plurality of line hold register means connected to the address field means of each of said queue means for storing the absolute address of said data and/or instructions within sad second level cache;

a plurality of second level write buffer means interconnected between the data field means of each of said queue means and the shared single second level cache for storing said data and/or instructions therein; and a plurality of store byte flag register means connected to the store byte flag field means of each of said queue means for storing the store byte flags therein indicative of specific locations at said absolute address within said second level cache wherein the obsolete entry of said data and/or instructions is stored.

10. The system of claim 9, wherein:

a directory associated with each of said first level caches of said other processors and with the single second level cache is interrogated using the absolute address stored in one of said line hold register means of said one processor, the corresponding obsolete entries of said data and/or instructions stored in the first level caches of said other processors are invalidated if said absolute address in said one of said line hold register means of said one processor is found in the directories of said first level caches associated with said other processors, and the corresponding obsolete entry of said data and/or instructions stored in the single second level cache is invalidated if said absolute address in said one of said line hold register means of said one processor is found in said directory of said second level cache.

11. The system of claim 9, wherein said data and/or instructions stored in a said second level write buffer means over-writes the data and/or instructions stored in the specific locations at the absolute address of said second level cache wherein the corresponding obsolete entry of said data and/or instructions is stored, the specific locations being determined and identified in accordance with the store byte flags stored in said store byte flag register means.

12. In a multiprocessor system including a first processor and at least one second processor where each processor includes an execution unit and a translation lookaside buffer (TLB), a first level cache (L1 cache) connected to each processor, a first level cache directory (L1 cache directory) associated with each said L1 cache, a first level store queue (L1 store queue) connected to each processor and to its said L1 cache, and a second level store queue (L2 store queue) connected to each said L1 store queue, a method of operating said multiprocessor system, comprising the steps of:

(a) issuing a first storage request by said execution unit of said first processor, said first storage request including a logical address and a new set of data, said new set of data being associated with a sequential store operation;

(b) locating an absolute address in said TLB using said logical address in said first storage request;

(c) using said absolute address, searching said L1 cache directory to determine if corresponding data is located at said absolute address of said L1 cache;

(d) if said corresponding data is found in said L1 cache, writing said new set of data into said L1 cache at said absolute address and writing said new set of data into said L1 store queue;

(e) if said corresponding data is not found in said L1 cache, writing said new set of data into said L1 store queue; and (f) writing said new set of data from said L1 store queue into said L2 store queue; whereby, upon completion of step (a), said first processor may issue a second storage request including a further new set of data and repeat steps (a) through (e) to write said further new set of data into said L1 store queue, said further new set of data being associated with said sequential store operation.

13. The method of claim 12, wherein said multiprocessor system further includes at least two second level write buffers (L2 write buffers) connected to each said L2 store queue, and wherein said method further comprises the step of:

(g) writing said new set of data associated with said sequential store operation from said L2 store queue associated with said first processor into one of the L2 write buffers, whereby, upon completion of step (g), said further new set of data may be written from said L1 store queue into said L2 store queue.

14. The method of claim 13, wherein said multiprocessor system further includes a single second level cache (L2 cache) connected to the L2 write buffers of each processor and shared by each processor, a directory associated with said L2 cache (L2 cache directory), and a second level control (L2 control) including an arbitrating means for receiving requests from the processors to access said L2 cache, and wherein said method further comprises the steps of:

(h) using said arbitrating means in said L2 control, requesting access to said 1,2 cache;

(i) when said access to said L2 cache is granted, searching said L2 cache directory using said absolute address to determine if corresponding obsolete entries of said new set of data are present in said L2 cache; and (j) if an L2 cache hit occurs, writing said new set of data from said one of the L2 write buffers into a location of said L2 cache defined by said absolute address;

whereby, said further new set of data may be written from said L2 store queue into another of the L2 write buffers.

15. The method of claim 14, wherein said multiprocessor system further includes a third level main memory (L3 memory) connected to said L2 cache, and wherein said method further comprises the steps of:

(k) if an L2 cache miss occurs, during the writing of said further new set of data from said L2 store queue into said another of the L2 write buffers, inpaging said corresponding obsolete entries of said new set of data from said L3 memory into a location of said L2 cache defined by said absolute address; and (l) following step (k), writing said new set of data from said one of the L2 write buffers into said location of said L2 cache defined by said absolute address.

* * * * *